US010306080B2

(12) United States Patent
Uchibori et al.

(10) Patent No.: US 10,306,080 B2
(45) Date of Patent: May 28, 2019

(54) INFORMATION PROCESSING SYSTEM, INFORMATION PROCESSING APPARATUS, AND PROGRAM

(71) Applicants: Hiroki Uchibori, Tokyo (JP); Kazunori Sugimura, Kanagawa (JP); Ei Matsuda, Tokyo (JP)

(72) Inventors: Hiroki Uchibori, Tokyo (JP); Kazunori Sugimura, Kanagawa (JP); Ei Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/786,912

(22) Filed: Oct. 18, 2017

(65) Prior Publication Data

US 2018/0109688 A1    Apr. 19, 2018

(30) Foreign Application Priority Data

Oct. 19, 2016  (JP) .................................. 2016-205228
May 1, 2017   (JP) .................................. 2017-091432

(51) Int. Cl.
*H04N 1/00*    (2006.01)
*H04L 29/06*   (2006.01)

(52) U.S. Cl.
CPC ....... *H04N 1/00233* (2013.01); *H04L 63/102* (2013.01); *H04L 63/104* (2013.01); *H04L 63/107* (2013.01); *H04N 1/00244* (2013.01); *H04N 1/00411* (2013.01); *H04N 1/00413* (2013.01); *H04N 1/00511* (2013.01); *H04N 1/00925* (2013.01)

(58) Field of Classification Search
None
See application file for complete search history.

(56) References Cited

U.S. PATENT DOCUMENTS

| 8,904,549 | B2  | 12/2014 | Mogaki |
| 9,661,171 | B2  | 5/2017  | Saitoh |
| 2015/0081834 | A1 | 3/2015 | Naito |
| 2015/0212761 | A1* | 7/2015 | Onose .................. G06F 3/1204 358/1.15 |

(Continued)

FOREIGN PATENT DOCUMENTS

| JP | 2015-084516 | 4/2015 |
| JP | 2016-110644 | 6/2016 |
| JP | 5930847     | 6/2016 |

*Primary Examiner* — Frantz Bataille
(74) *Attorney, Agent, or Firm* — IPUSA, PLLC

(57) ABSTRACT

An information processing system sending setup information related to a setup of an apparatus to the apparatus includes the apparatus including a receiving unit configured to receive user information of a user of the apparatus, and a first communication unit configured to send the user information and the apparatus information related to the apparatus to an information processing apparatus, and the information processing apparatus including a second communication unit configured to receive the user information and the apparatus information, and a setup information determining unit configured to determine the setup information of the apparatus used by the user based on the apparatus information and the user information, wherein the second communication unit sends the setup information determined by the setup information determining unit to the apparatus.

18 Claims, 33 Drawing Sheets

(56) References Cited

U.S. PATENT DOCUMENTS

| | | |
|---|---|---|
| 2015/0350344 A1 | 12/2015 | Sugimura et al. |
| 2016/0241724 A1 | 8/2016 | Sugimura et al. |
| 2016/0259933 A1 | 9/2016 | Sugimura et al. |
| 2016/0266977 A1 | 9/2016 | Hayashi et al. |
| 2016/0274945 A1 | 9/2016 | Namihira et al. |
| 2017/0054865 A1 | 2/2017 | Min et al. |
| 2017/0083697 A1 | 3/2017 | Hayashi et al. |
| 2017/0099297 A1* | 4/2017 | Armer .................. H04L 63/105 |
| 2017/0109194 A1 | 4/2017 | Namihira et al. |

* cited by examiner

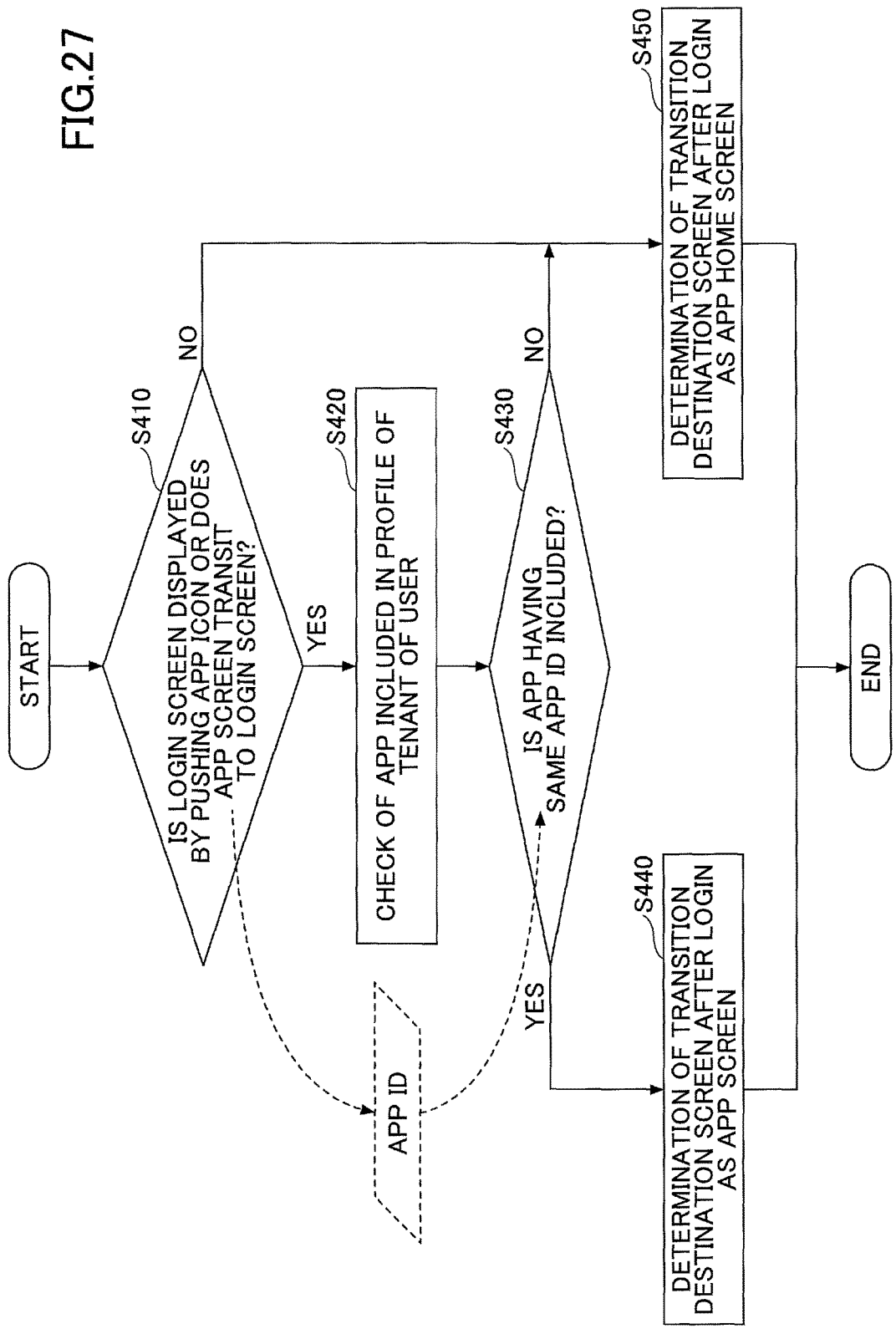

INFORMATION PROCESSING SYSTEM, INFORMATION PROCESSING APPARATUS, AND PROGRAM

BACKGROUND OF THE INVENTION

1. Field of the Invention

The present invention relates to an information processing system, an information processing apparatus, and a program.

2. Description of the Related Art

When a cloud server cooperates with various apparatuses, there is an effect of improving convenience for a user or the like. For example, the apparatus such as a multifunction peripheral (a MFP) sends image data obtained by scanning to a cloud server. Then, the cloud server is enabled to process the image data in conformity with a profile which is previously set (for example, a storage to an online storage).

A group such as a company or a department, which uses a resource of a cloud serves, is called a tenant. The cloud server is used in units of the tenant. The apparatus is registered each tenant, and the registered apparatus can use the resource of the cloud server. Meanwhile, the user operating the apparatus is registered for each tenant. When the user logs into the cloud server through the apparatus, the apparatus registered in the cloud server can be used (step See, for example, Patent Document 1). Patent Document 1 discloses a cloud system, in which a profile can be set for each user.

Patent Document 1: Japanese Laid-Open Patent Publication No. 2015-84516

In consideration of the above object, the present invention is to provide an information processing system for providing appropriate setup information to the apparatus used by the user.

SUMMARY OF THE INVENTION

It is a general object of at least one embodiment of the present invention to provide an information processing system that substantially obviates one or more problems caused by the limitations and disadvantages of the related art.

Provided is an information processing system sending setup information related to a setup of an apparatus to the apparatus including the apparatus including a receiving unit configured to receive user information of a user of the apparatus, and a first communication unit configured to send the user information and the apparatus information related to the apparatus to an information processing apparatus, and the information processing apparatus including a second communication unit configured to receive the user information and the apparatus information, and a setup information determining unit configured to determine the setup information of the apparatus used by the user based on the apparatus information and the user information, wherein the second communication unit sends the setup information determined by the setup information determining unit to the apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 9 illustrates an example of an explanation of an app home screen or the like.

FIG. 27 is an example of a flow chart for explaining a procedure that a screen transition destination control unit determines a transition destination screen.

DETAILED DESCRIPTION OF THE PREFERRED EMBODIMENTS

A description is given below, with reference to the FIG. 1 through FIG. 27 of embodiments of the present invention. Where the same reference symbols are attached to the same parts, repeated description of the parts is omitted.

Figure 1:
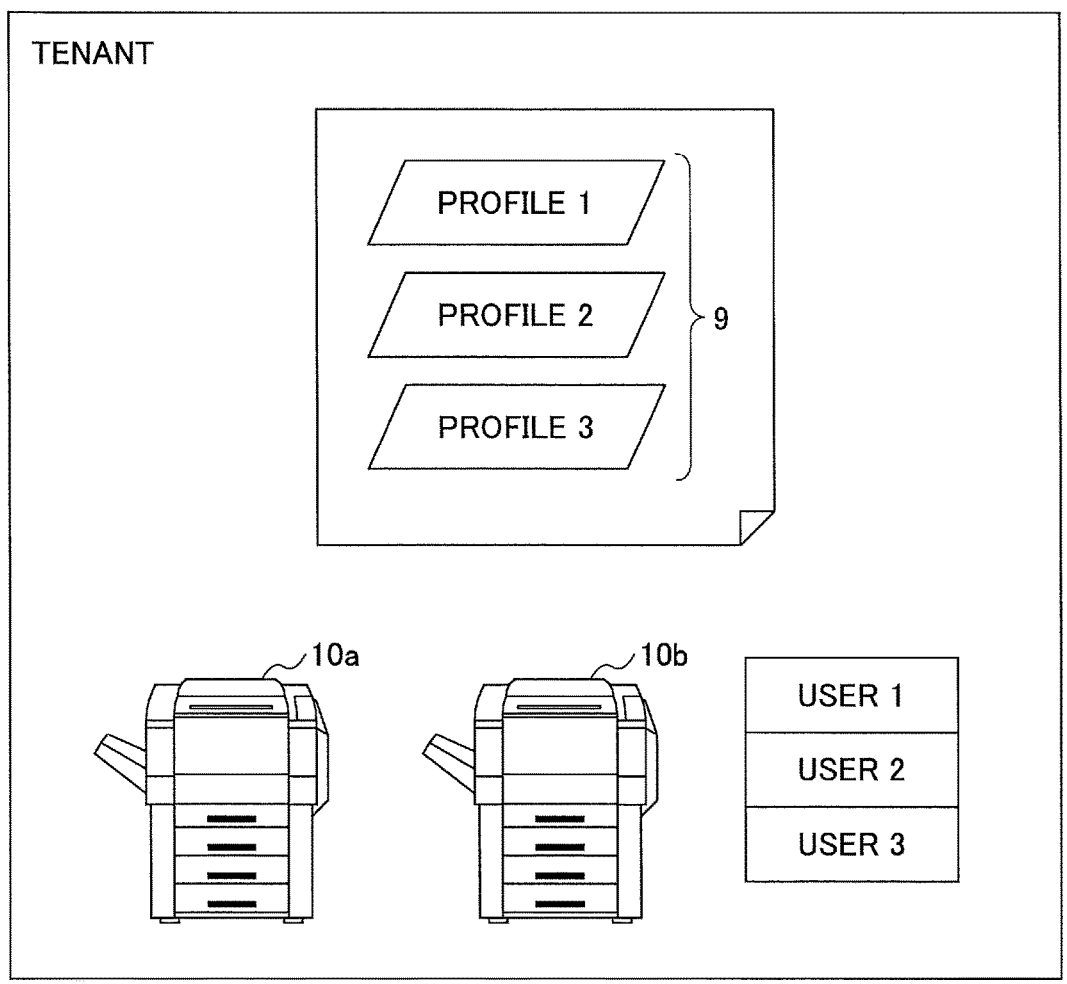
FIG. 1 schematically illustrates an example of a relationship among a tenant, a MFP as an example of an apparatus, and a user.

FIG. 1 schematically illustrates an example of a relationship among a tenant, a multifunction peripheral (MFP) 10 as an example of an apparatus, and a user. In order to distinguish the multifunction peripheral 10, multifunction peripherals 10a and 10b are illustrated. As illustrated, the MFPs 10a and 10b and the users 1 to 3 are registered in the tenant. Description is given for the user 1. One of the effects exerted by a registration of the MFPs 10a and 10b is that the user can use the MFPs 10a and 10b by logging in a tenant from either one of the MFPs 10a and 10b and the user can use a profile 9 such as a profile 1, which is ordinarily used by the user 1 from either one of the multifunction peripherals 10a and 10b. The profiles 1 to 3 is setup information related to a setup of an operation of the MFP 10. In a case where the user 1 registers the profile 1 in a cloud server, regardless of whether the user 1 uses the multifunction peripheral 10a or the multifunction peripheral 10b, the multifunction peripheral 10a or 10b can be used by the same setup based on the profile 1.

Figure 2:
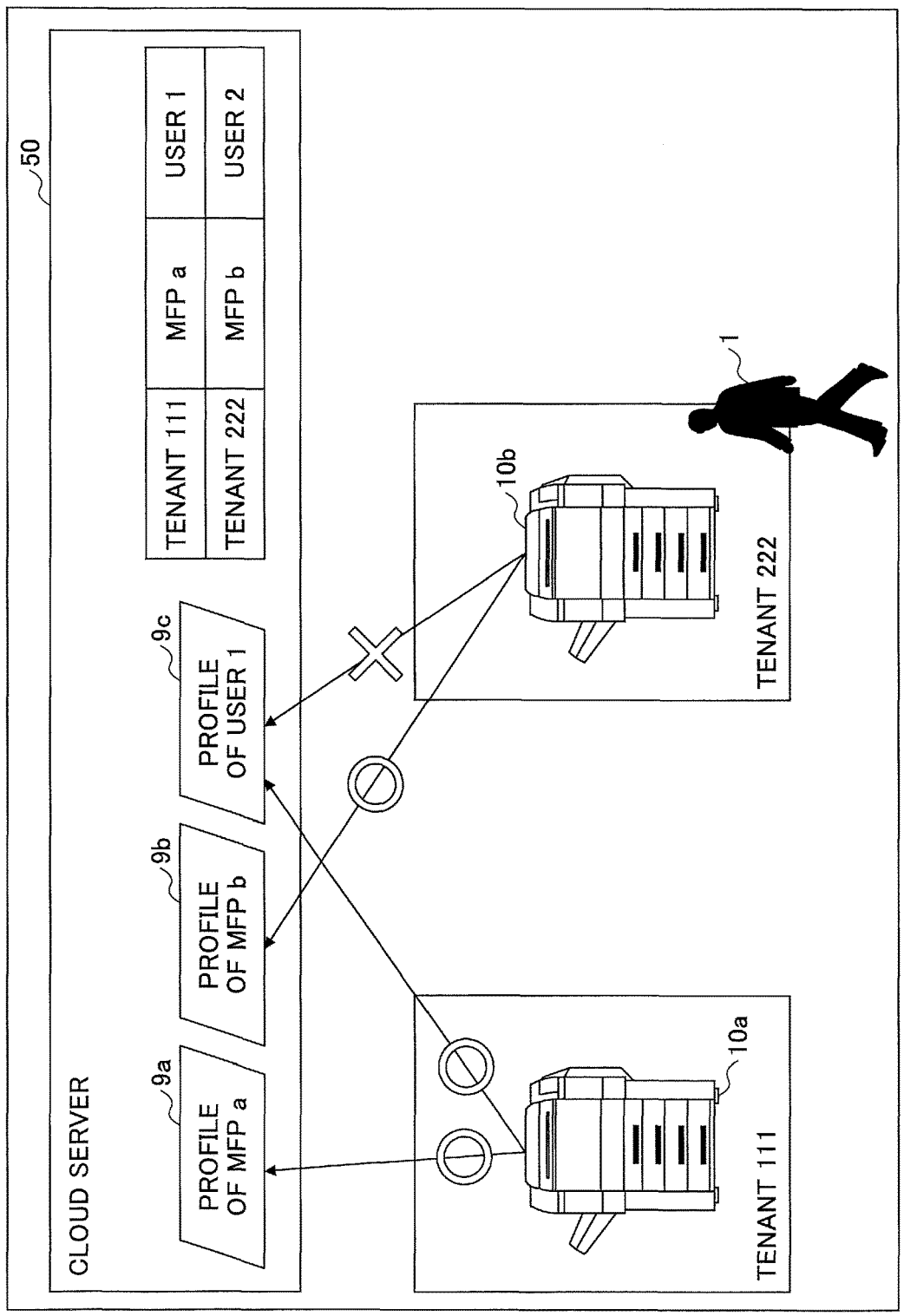
FIG. 2 illustrates an example of a relationship between the user and the tenant.

However, in a case where a tenant, in which the MFP 10 is registered, is different from a tenant, in which the user is registered, in a conventional cloud server, there is a problem that the user cannot use the profile, which is ordinarily used. Referring to FIG. 2, description is given. FIG. 2 illustrates an example of a relationship between the user and the tenant. A tenant 111 and a tenant 222 are registered in a cloud server 50. A MFP 10a and the user 1 are registered in the tenant 111. A MFP 10b and the user 2 are registered in a tenant 222.

In a case where the user 1 logs into the cloud server 50 from the tenant 111, the user 1 sets a profile 9c ordinarily used by the user 1 to a MFP 10a. Thus, the MFP 10a becomes usable. Meanwhile, after the user 1 logs into the cloud server 50 through the multifunction peripheral 10b of the tenant 222, the user 1 is not registered in the tenant 222. Therefore, the user 1 cannot use the profile 9c.

Embodiments of the present invention are explained with reference to drawings.

First Embodiment

Outline of the Information Processing System of the First Embodiment

Figure 3:
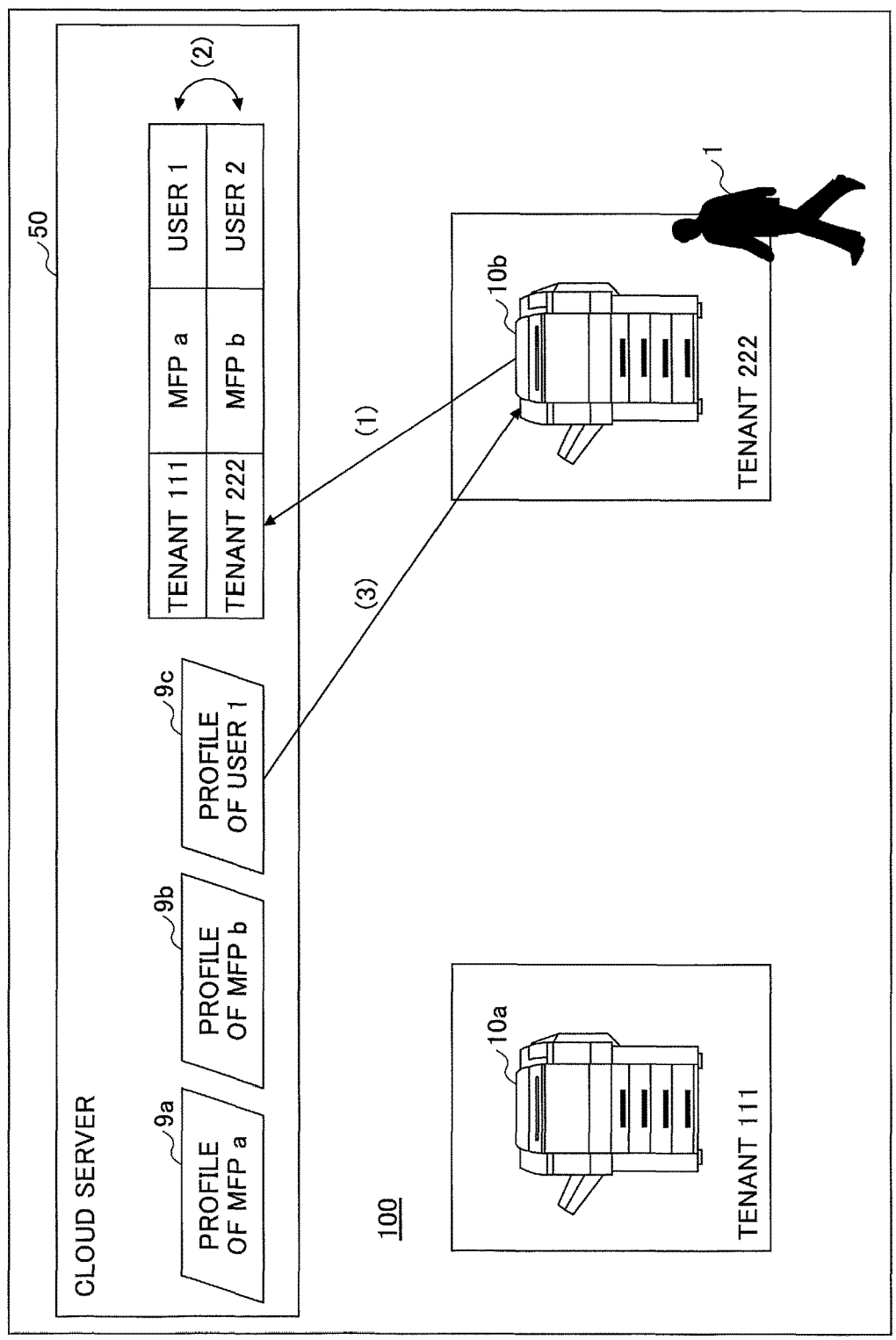
FIG. 3 illustrates an example of an outline of an information processing system of an embodiment.

FIG. 3 illustrates an example of an outline of an information processing system 100 of the first embodiment. A user 1 is registered in a tenant 111, into which a multifunction peripheral 10a is registered. Further, the multifunction peripheral 10a uses a profile 9a as a profile of an initial setup, and the user ordinarily uses a profile 9c. In a case where the user 1 logs into a cloud server 50 through the multifunction peripheral 1, a profile 9c is set to the multifunction peripheral 10a so that the multifunction peripheral 10a can be used.

Described next is a case where the user 1 uses a multifunction peripheral 10b that is registered in a tenant 222.

(1) At first, the user 1 logs into the cloud server 50 through the multifunction peripheral 10b. With this, the cloud server 50 specifies the multifunction peripheral 10b and the user 1.

(2) The multifunction peripheral 10b is registered in the tenant 222, and the user 1 is registered in the tenant 111. Therefore, the cloud server 50 determines that the tenant, in which the user 1 is registered, differs from the tenant, in which the multifunction peripheral 10b is registered.

(3) The cloud server 50 sends the profile 9c of the user 1 registered in tenant 111 to the multifunction peripheral 10b under a predetermined condition. With this, the multifunction peripheral 10b is operated based on the profile 9c. Therefore, the user 1 can use the multifunction peripheral 10b by using the same setup as that in using the multifunction peripheral 10a installed in the tenant 111.

Terminology

For example, a resource recited in the claims corresponds to hardware and software. For example, the resource recited in the claims corresponds to a function provided by the hardware and the software.

For example, a group recited in the claims corresponds to a group of persons or matters, which have a common point common to the group. For example, when persons and/or things belonging to a certain company, business place, branch, department, affiliate company, class, room, or floor, these persons and/or things belong to the same group. Within the embodiment, an apparatus and a user are registered using a unit of gathering of the persons, for example. For example, the number of the person or the thing belonging to the group nay be one. For example, a group using a resource of the information processing system is conventionally called a tenant.

For example, the setup information relates to a setup of the multifunction peripheral. For example, according to the setup information, the multifunction peripheral is permitted or prohibited to do a possible operation. For example, the setup information may include parameters of various processes performed by the multifunction peripheral. For example, the setup information corresponds to a profile in the embodiments.

Example of System Structure

Figure 4:
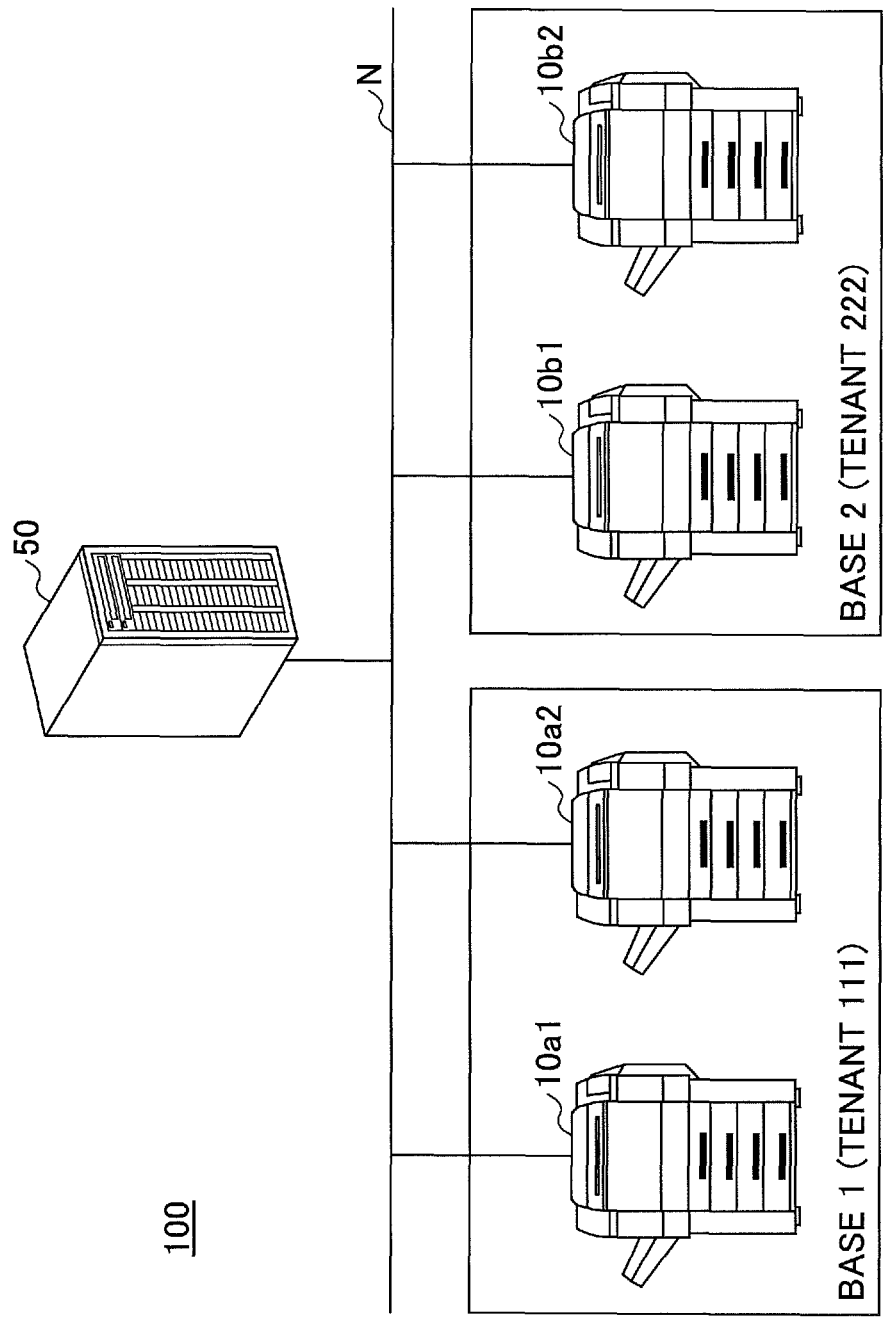
FIG. 4 illustrates an example of an outline structure of the information processing system.

FIG. 4 illustrates an example of an outline structure of an information processing system 100. The information processing system 100 includes a cloud server 50 which is communicable through a network and multiple multifunction peripherals 10 (when the multiple multifunction peripherals are distinguished, the multiple multifunction peripherals 10a1, 10a2, 10b1, and 10b2). The multifunction peripherals 10 may not communicate each other. Here, "communicable" means that a function of communicating between the cloud server 50 and the multiple multifunction peripheral 10 is provided, and the communication may not be actually performed between the cloud server 50 and the multiple multifunction peripheral 10.

The multifunction peripherals 10a1 and 10a2 are located in a base 1. The multifunction peripherals 10b1 and 10b2 are located in a base 2. For example, in a case where the base 1 is a head office, the base 2 is a business place or a branch. Further, in a case where the base 1 is a department 1, the base 2 is a department 2. Furthermore, in a case where the base 1 is a company 1, the base 2 is a company 2 (a company closely related to the company 1 such as an affiliate company). As such, a person comes and goes between the base 1 and the base 2.

As an example, the multifunction peripherals 10a1 and 10a2 are registered in the tenant 111 of the cloud server 50, and the multifunction peripherals 10b1 and 10b2 are registered in the tenant 222 of the cloud server 50. However, it is sufficient to register at least one multifunction peripheral 10 in each tenant. The example illustrated in FIG. 4 is only an example.

The multifunction peripheral 10 is an example of the apparatus recited in the claims. The multifunction peripheral 10 includes a word "multi", which represents multiple functions of printing, fax transmission, scanning of an original manuscript, copying, and so on. However, the apparatus may not have these multiple functions. It is sufficient for the apparatus to have at least one function. The multifunction peripheral 10 may be the apparatus called a multi-function peripheral (MFP), a copy machine, a copier, an image forming machine 10, or an office apparatus.

Further, the multifunction peripheral 10 may be replaced by a projector, a head up display (HUD), an electronic whiteboard, a digital signage, or the like. Said differently, the apparatus of the embodiment may be an apparatus in which a user can use the profile 9.

The cloud server 50 is an example of the information processing apparatus. It is preferable that the cloud server can deal with cloud computing. Cloud computing is a mode of using the information processing apparatus, in which a resource on the network can be used without specifically getting conscious of a hardware resource. In this case, the cloud server 50 may not be integrally provided as a single device accommodated in a single casing. The cloud server 50 may be formed by dynamically connect or disconnect a hardware resource depending on a load. Further, the cloud server 50 may be built in a virtual environment inside a single information processing apparatus or separately structured into multiple information processing apparatuses.

Although the cloud server 50 is provided in the Internet, the cloud server may be provided in any place as long as the cloud server is connected to the network. For example, the cloud server may exist in the base 1 or the base 2.

A network N is built by a large area network (LAN) built in a base where the multifunction peripheral 10 is installed, a provider network of a provider of connecting the LAN with the internet, a line served by a telecommunications carrier, or the like. In a case where the network N includes multiple LANs, the network N is called a wide area network (WAN) or the Internet. The network may be built so as to be wired or wireless or a combination of wired and wireless. In a case where the multifunction peripheral 10 has a function of connecting with a portable phone network such as 3G, long term evolution (LTE), and 4G, the network N is the portable telephone network and a provider network.

Hardware Structure

Figure 5:
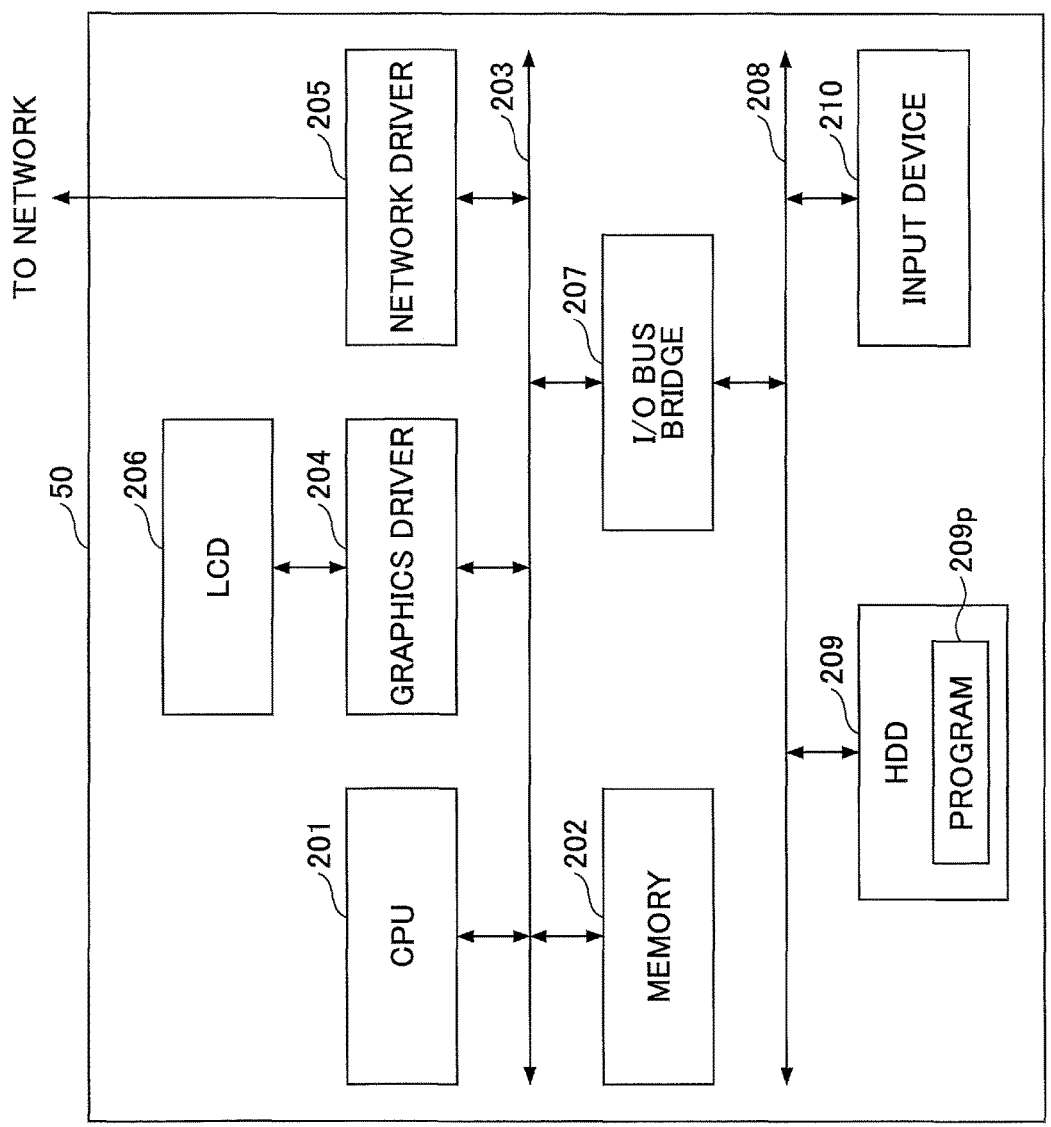
FIG. 5 schematically illustrates an example of a schematic hardware structure of a cloud server.

FIG. 5 schematically illustrates an example of a schematic hardware structure of the cloud server 5. The cloud server 50 includes a central processing unit (CPU) 201 and a memory 202 enabling a high speed access to data used by the CPU 201. The CPU 201 and the memory 202 are connected with another device or another driver in the cloud server 50 through a system bus 203. The another device or another driver is, for example, a graphics driver 204 or a network driver (NIC) 205.

The graphics driver 204 is connected to a liquid crystal display (LCD) (a display device) and monitors a processed result obtained by the CPU 201. Further, the network driver 205 connects the cloud server 50 with the network N at a transport layer and a physical layer to establish a session with the multifunction peripheral 10.

An input and output (I/O) bus bridge 207 is further connected with the system bus 203. On the downstream side of the I/O bus bridge, a memory device such as a hard disk drive (HDD) 290 is connected through an I/O bus using Integrated Drive Electronics (IDE), Advanced Technology Attachment (ATA), Advanced Technology Attachment Packet Interface (ATAPI), serial ATA, Small Computer System Interface (step SCSI), Universal Serial Bus (USB). The HDD 209 stores a program 209p for controlling the entire cloud server 50. The HDD 209 may be a Solid State Drive (step SSD).

Further, an input device 210 such as a keyboard and a mouse (called a pointing device) is connected with the I/O bus 208 to receive an input and a command by an operator such as a system administrator.

The hardware structure of the cloud server 50 illustrated in FIG. 5 may not be integrated in a single casing. FIG. 5 illustrates hardware elements preferably included in the cloud server 50. Further, a physical structure of the cloud server 50 of the embodiment may not be fixedly determinant in order to deal with cloud computing and may be built by dynamically connect or cut the hardware resource in response to the load.

[[Hardware Structure of the Multifunction Peripheral 10]]

Figure 6:
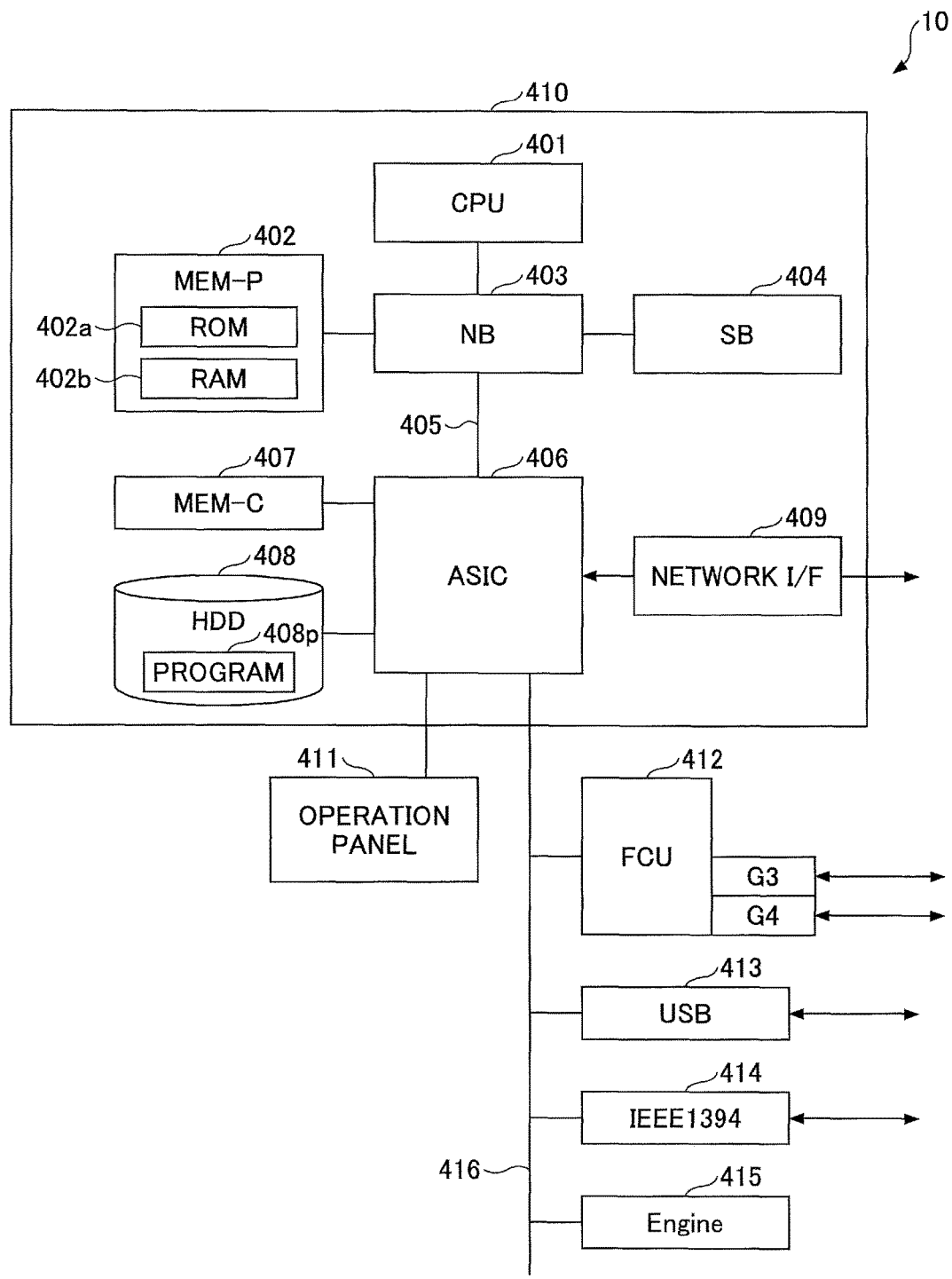
FIG. 6 is an example of a block diagram schematically illustrating a hardware structure of the MFP.

FIG. 6 is an example of a block diagram schematically illustrating a hardware structure of the multifunction peripheral 10. The multifunction peripheral 10 has a structure that a controller 410 and an engine part (Engine) 415 are connected using a Peripheral Component Interface (PCI) bus 416.

The controller 410 controls the entire multifunction peripheral 10, drawing, communicating, and an input from an operation panel 411. The engine part 415 is a printer engine connectable to a PCI bus 416 or the like. For example, the engine part 415 is a black and white plotter, a 1-drum color plotter, a 4-drum color plotter, a scanner, or a facsimile (FAX) unit.

This engine part 415 includes an image processing part performing error diffusion and gamma conversion in addition to the engine part such as the plotter.

The controller 410 includes a CPU 401, a north bridge (NB) 403, a system memory (MEM-P) 402, a south bridge (step SB) 404, a local memory (MEM-C) 407, an Application Specific Integrated Circuit (ASIC) 406, and a hard disk drive (HDD) 408. An Accelerated Graphics Port (AGP) 405 connects the NB 403 with the ASIC 406.

The MEM-P 402 further includes a Read Only Memory (ROM) 402a and a Random Access Memory (RAM) 402b.

The CPU 401 performs an entire control of the multifunction peripheral 10 and includes a chip set made up of the NB 403, the MEM-P 402, and the SB 404, and is connected with another apparatus through this chip set.

The NB 403 is a bridge for connecting the CPU 401, the MEM-P 402, the SB 404, and the AGP bus 405, and includes a memory controller for controlling to read from and write into the MEM-P 402, a protocol control information (PCI) master, and an AGP target.

The MEM-P 402 is a system memory used as a storing memory for storing a program and data, a deploying memory for deploying the programmed the data, a drawing memory for drawing in the printer, or the like and includes a ROM 402a and a RAM 402b.

The ROM 402a is a read only memory used as a storing memory for storing the program and the data. The RAM 402b is a writeable and readable memory used as a deploying memory for deploying the program and the data and a drawing memory for drawing in the printer.

The SB 404 is a bridge for connecting the NB 403, the PCI device, and a peripheral device. This SB 404 is connected with the NB 403 through the PCI bus. The network I/F 409 or the like is connected with the PCI bus. The ASIC 406 is an Integrated Circuit (IC) that includes the hardware element for the image processing and is provided for the purpose of image processing. The ASIC 406 plays a role of a bridge of mutually connecting the AGP bus 405, the PCI bus 416, the HDD 408, and the MEM-C 407.

This ASIC 406 includes a PCI target, an AGP master, an arbiter (ARB) that is a core of the ASIC 406, a memory controller for controlling the MEM-C 407, multiple Direct Memory Access Controllers (DMACs) for rotating the image data using a hardware logic and so on, and a PCI unit of transferring data through the PCI bus from and to the engine part 415.

The network I/F 409 is a communication device for communicating with the cloud server 50 and so on through the network N. For example, the network I/F 409 is a Network Interface Card (NIC).

A Facsimile Control Unit (FCU) 412, a USB (Universal Serial Bus (USB) 413, an Institute of Electrical and Electronics Engineers 1394 (IEEE1394) interface 414 are connected to the ASIC 406 through the PCI bus.

The operation panel 411 is directly connected to the ASIC 406. The MEM-C 407 is a local memory used as a copying image buffer and a code buffer. The HDD 408 is a storage to accumulate image data, a program, font data, and a form.

Further, the HDD 408 stores a license file of an application executed by the multifunction peripheral 10. The AGP bus 405 is a bus interface for a graphic accelerator card proposed to make a graphic process at a high rate. When the AGP bus directly accesses the MEM-P 402 at a high throughput, the graphic accelerator card can be processed at a high rate.

Function of the Information Processing System

Figure 7A:
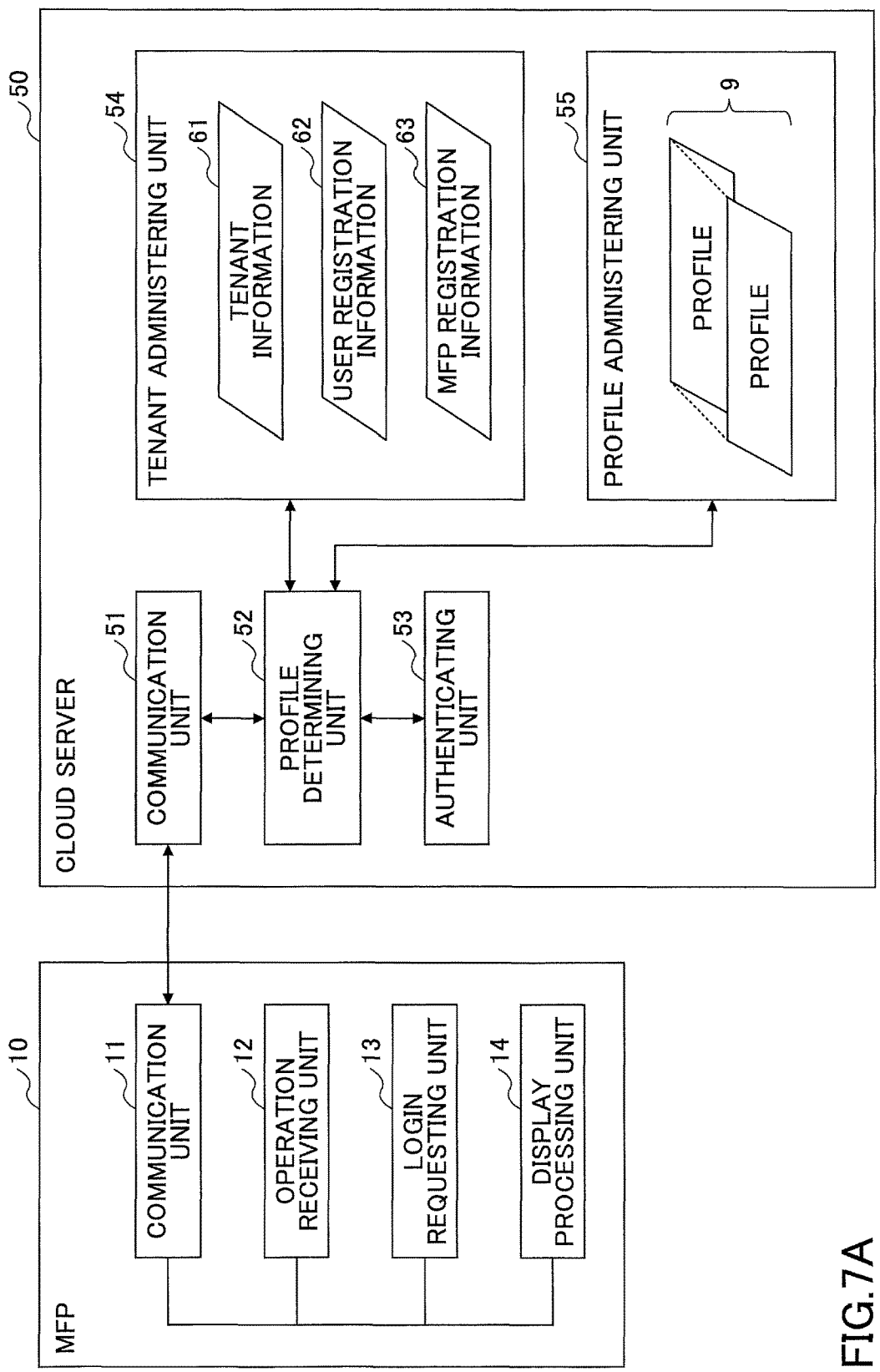
FIG. 7A is an example of a functional block diagram for explaining function of the information processing system of the embodiment.

FIG. 7A is an example of a functional block diagram for explaining the function of the information processing system 100. Hereinafter, the functions of the cloud server 50 and the multifunction peripheral 10 are described.

[[Multifunction Peripheral 10]]

The multifunction peripheral 10 includes a communication unit 11, an operation receiving unit 12, a login requesting unit 13, and a display processing unit 14. These various functions are implemented by the CPU 401 when the program 408p deployed from the HDD 408 to the MEM-P 402 illustrated in FIG. 6. This program 408p may be delivered from a server for delivering a program or may be stored in a portable recording medium such as a universal serial bus (USB) memory and an optical recording medium and distributed.

The communication unit 11 is substantialized when the CPU 401 illustrated in FIG. 6 executes a program 408p and controls the network I/F 409 so that the communication unit 11 sends and receives various information to and from the cloud server 50.

The operation receiving unit 12 is substantialized when the CPU 401 illustrated in FIG. 6 executes the program 408p and controls the operation panel 411 so that the operation receiving unit 12 receives various operations by the user for the multifunction peripheral 10. Within the embodiment, an input of user information mainly necessary for a login is received. User information is to specify the user and is, for example, a user ID. The ID is an abbreviation of "identification" and means an identifier or identification information. The ID is one of a name, a sign, a character string, and a number, which are used to uniquely distinguish a specific object and a combination of at least two of the name, the sign, the character string, and the number. The ID described below is similarly determined. At a time of authentication, the operation receiving unit 12 receives an input of the user ID and a password. An IC card carried by the user may be read by an IC card reader and writer.

The display processing unit 14 is substantialized by the CPU 401 illustrated in FIG. 6 when the CPU 401 executes the program 408p to control the operation panel 411. The display processing unit 14 displays a screen including various information on the operation panel 411. Within the embodiment, an app view of applications (apps) is displayed based on a profile 9 sent from the cloud server 50.

[[Cloud Server 50]]

The cloud server 50 includes a communication unit 51, a profile determining unit 52, an authenticating unit 53, a tenant administering unit 54, and a profile administering unit 55. These various functions are implemented by the CPU 201 when the program 209p deployed from the HDD 209 to the memory 202 illustrated in FIG. 5 is executed in the CPU 201. This program 209p may be delivered from a server for delivering the program or may be stored in the portable recording medium such as the universal serial bus (USB) memory and an optical recording medium and distributed.

The communication unit 51 is substantialized when the CPU 201 illustrated in FIG. 5 executes a program 209p and controls the network driver 205 so that the communication unit 51 sends and receives various information to and from the multifunction peripheral 10.

The profile determining unit 52 is substantialized when the CPU 201 illustrated in FIG. 5 executes a program 209p to check a predetermined condition and determine the profile 9 to be sent to the multifunction peripheral 10.

The authenticating unit 53 is substantialized when the CPU 201 illustrated in FIG. 5 executes the program 209p to authenticate the user.

The tenant administering unit 54 is substantialized when the CPU 201 illustrated in FIG. 5 executes the program 209p or by the memory 202 to administer the tenant, the user, and the multifunction peripheral 10. Specifically, the tenant administering unit 54 includes a tenant information 61, user registration information 62, and MFP registration information 63, and sends information acquired from the tenant administering unit 54 out to the profile determining unit 52.

The profile administering unit 55 is substantialized when the CPU 201 illustrated in FIG. 5 executes the program 209p or by the memory 202 to administer the profile 9. Specifically, the profile 9 is administered for each multifunction peripheral 10 or each user.

TABLE 1

| ITEM NAME | SETUP VALUE EXAMPLE |
| --- | --- |
| TENANT ID | 111 |
| TENANT NAME | XYZ |
| TENANT OPEN RANGE | 222 |
| | 333 |
| TENANT CONNECTION RANGE | 222 |
| | 333 |
| | 444 |
| | 555 |

Table 1 represents an example of the tenant information 61. The tenant information 61 includes items of a tenant ID, a tenant name, a tenant open range, a tenant connection range. The tenant ID is information (an example of group identification information) for specifying the tenant. The tenant name is a name or a nominal designation, by which the user distinguishes the tenant.

The tenant open range corresponds to a tenant identifier of another tenant which can access the tenant of oneself. The word "access" means a transmission and an acquisition of information by means of communications. An example of the information transmitted in the access is the profile 9 of the embodiment. Therefore, the tenant open range corresponds to tenant ID of another tenant which can provide the profile to the tenant of oneself. For example, the tenant having the tenant ID of "222" can provide the profile 9 to the tenant of oneself having the tenant ID of "111". The tenant open range is an example of first request permission information.

Meanwhile, the tenant connection range corresponds to the tenant ID (the tenant ID of the another tenant, to which the tenant of oneself can provide the profile) of the another tenant, to which the tenant of oneself can access. The tenant connection range is an example of second request permission information. For example, the tenant of oneself having the tenant ID of "111" can provide the profile 9 to the tenant having the tenant ID of "222". In a case where the user registered in the tenant 111 uses the multifunction peripheral 10 registered in the tenant 222, it is sufficient that the tenant open range exists. However, there is a probability that an app of acquiring external information is set depending on the profile having the tenant ID of 111, for example. Therefore, an administrator or the like may wish to previously limit the operation of the multifunction peripheral 10 based on the profile. Then, because the tenant, to which the tenant of oneself can provide the profile, is set to be in the tenant connection range, it is possible to prevent the multifunction peripheral 10 in the another tenant from operating beyond the scope of the assumption using the profile provided by the tenant of oneself.

Therefore, there may be a case where a contradiction exists between a tenant open range and a tenant connection range. For example, even if the tenant ID of 222 is set to the tenant open range, the tenant ID of 111 may not be registered in the tenant connection range of the tenant. Within the embodiment, this point is considered to determine the profile 9 to be provided to the multifunction peripheral 10.

Both of the tenant open range and the tenant connection range are a white list. However, the tenant open range and the tenant connection range may be expressed by a black list, in which a tenant ID to be banned to open or connect is registered. Further, the tenant open range and the tenant connection range may have multiple setup values. The tenant open range and the tenant connection range may have no setup value.

TABLE 2

| TENANT ID | USER ID |
| --- | --- |
| 111 | user101 |
| 111 | user102 |
| 111 | user103 |
| 222 | user201 |
| 222 | user202 |
| 333 | user301 |
| 333 | user302 |
| 444 | user401 |

The user registration information 62 is schematically illustrated in Table 2. The tenant ID and the user ID are associated in the user registration information 62. With this, the cloud server 50 can specify the tenant in which the user is registered. The operation receiving unit 12 of the multifunction peripheral 12 receives this operation.

TABLE 3

| TENANT ID | APPARATUS INFORMATION |
| --- | --- |
| 111 | machine101 |
| 111 | machine102 |
| 222 | machine201 |
| 333 | machine301 |
| 333 | machine302 |
| 333 | machine303 |

The multifunction peripheral (MFP) registration information 63 is schematically illustrated in Table 3. The tenant ID and apparatus information are associated in the MFP registration information 63. The apparatus information is information of specifying the multifunction peripheral 10. The apparatus information may be referred to as an apparatus ID or apparatus identification information. With this, the cloud server 50 can specify the tenant, in which the multifunction peripheral 10 is registered. The MFP registration information 63 is an example of an apparatus information memory unit.

Figure 7B:
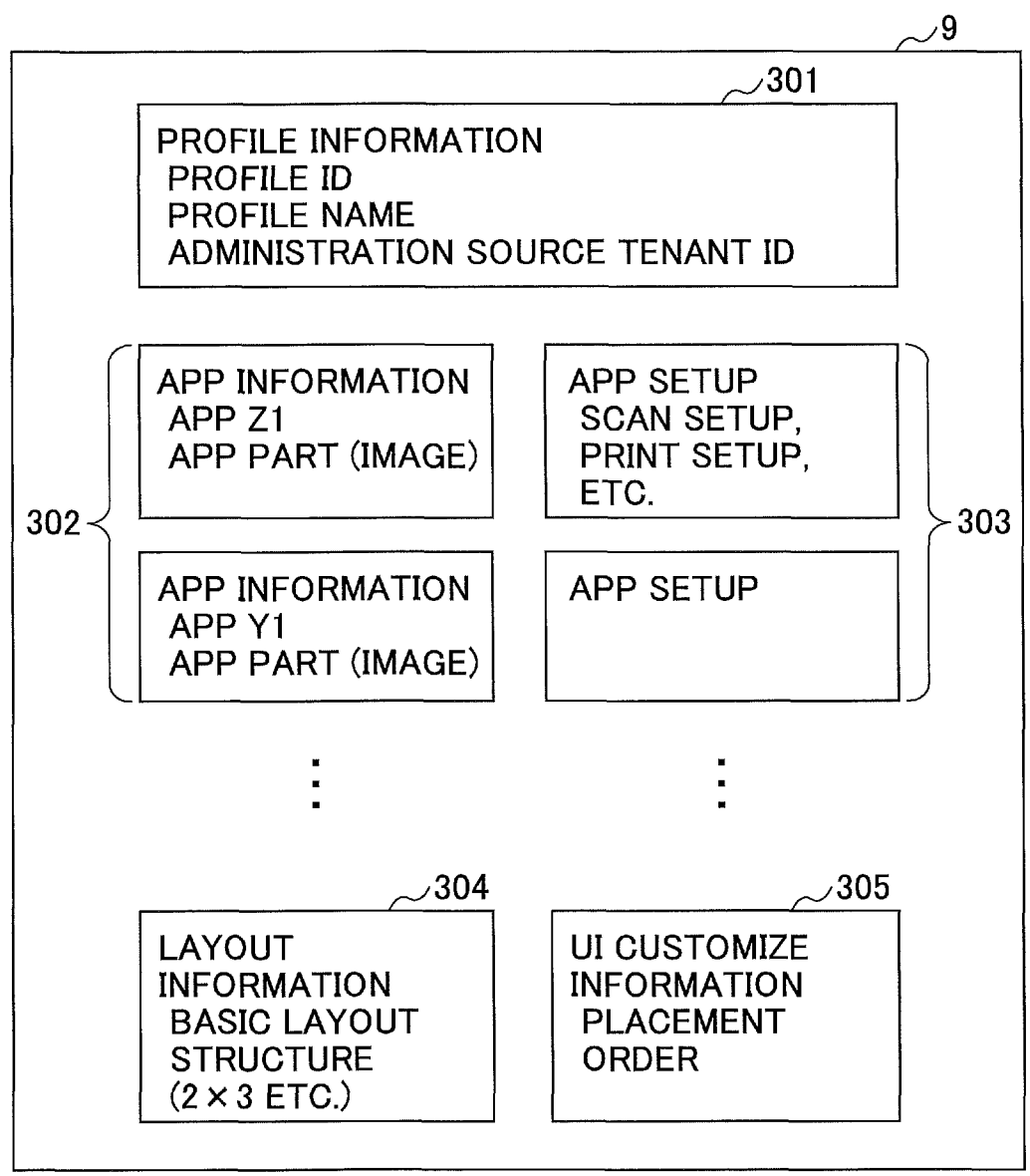
FIG. 7B illustrates an example of a data structure of a profile.

FIG. 7B illustrates an example of a data structure of the profile 9. Each one profile 9 includes profile information 301, at least one app information 302, at least one app setup 303, layout information 304, and user interface (UI) customize information 305. Profile information 301 is bibliographic information of the profile 9 and includes a profile ID, a profile name, and an administration source tenant ID. The profile ID is information for specifying the profile 9. The profile name is a name or a nominal designation of the profile 9. The administration source tenant ID designates a tenant administering the tenant. There is a case where multiple profiles are registered in one tenant. This is because the administrator creates several profiles so that one of the profiles is caused to be used by the multifunction peripheral 10 or the user. Alternatively, this is because the profile 9 is created for each user. Accordingly, in a case where there are multiple profiles 9 of the same administration source tenant ID, a default profile 9 is previously determined. Instead, the user ID or the like is associated the profile 9. In the default profile 9, a predetermined mark such as (*) is attached to the profile ID. Alternatively, the profile 9 having the newest profile ID is determined as the default.

The app information 302 is information of the app included in the profile 9. The "app Z1" of the app information 302 identifies as the app. The "app screen 521 part" is a part of a user interface which the app display on the multifunction peripheral 10.

The app setup 303 is information relater to a setup of the app. Each app setup 303 is associated with each app information 302. In a case where the app is a scan app, a scan setup (monochrome/color, resolution, density, or the like) is registered. In a case where the app is a print app, a print setup (paper size, monochrome/color, double side, aggregation, finishing, or the like) is registered. The app setup 303 includes an individual setup for each user.

The layout information 304 has a basic layout structure of the user interface. The "2×3" means that icons of the app are arranged in 2 rows×3 columns. A placement order of the UI customize information 305 is a piaais a placement order of the app in a user interface set by the user.

Operation Procedure

Figure 8:
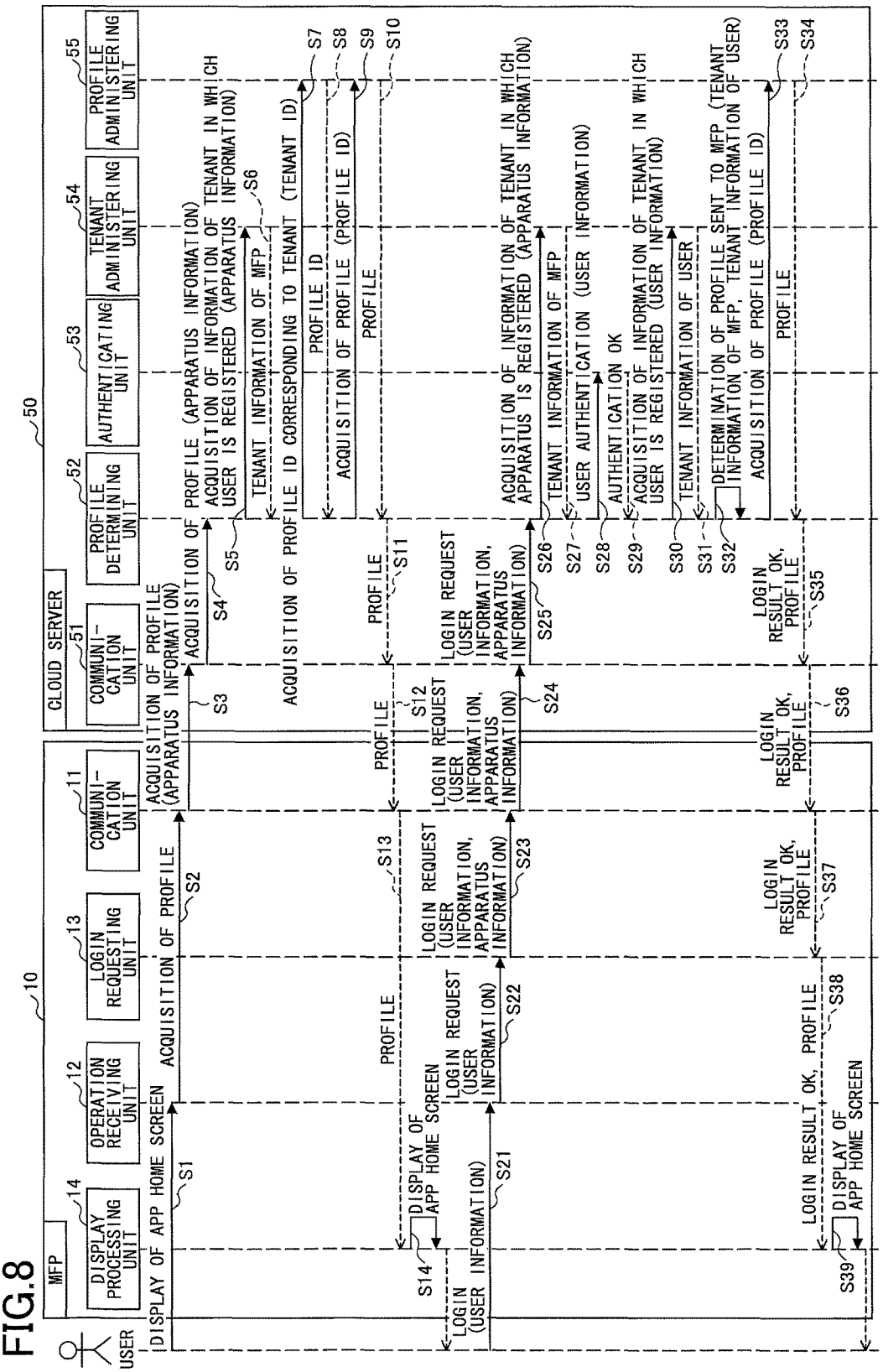
FIG. 8 is an example of a sequence diagram illustrating a login to the cloud server using a MFP of a tenant, in which oneself is not registered, and the profile of oneself is used in the MFP.
Figure 9:
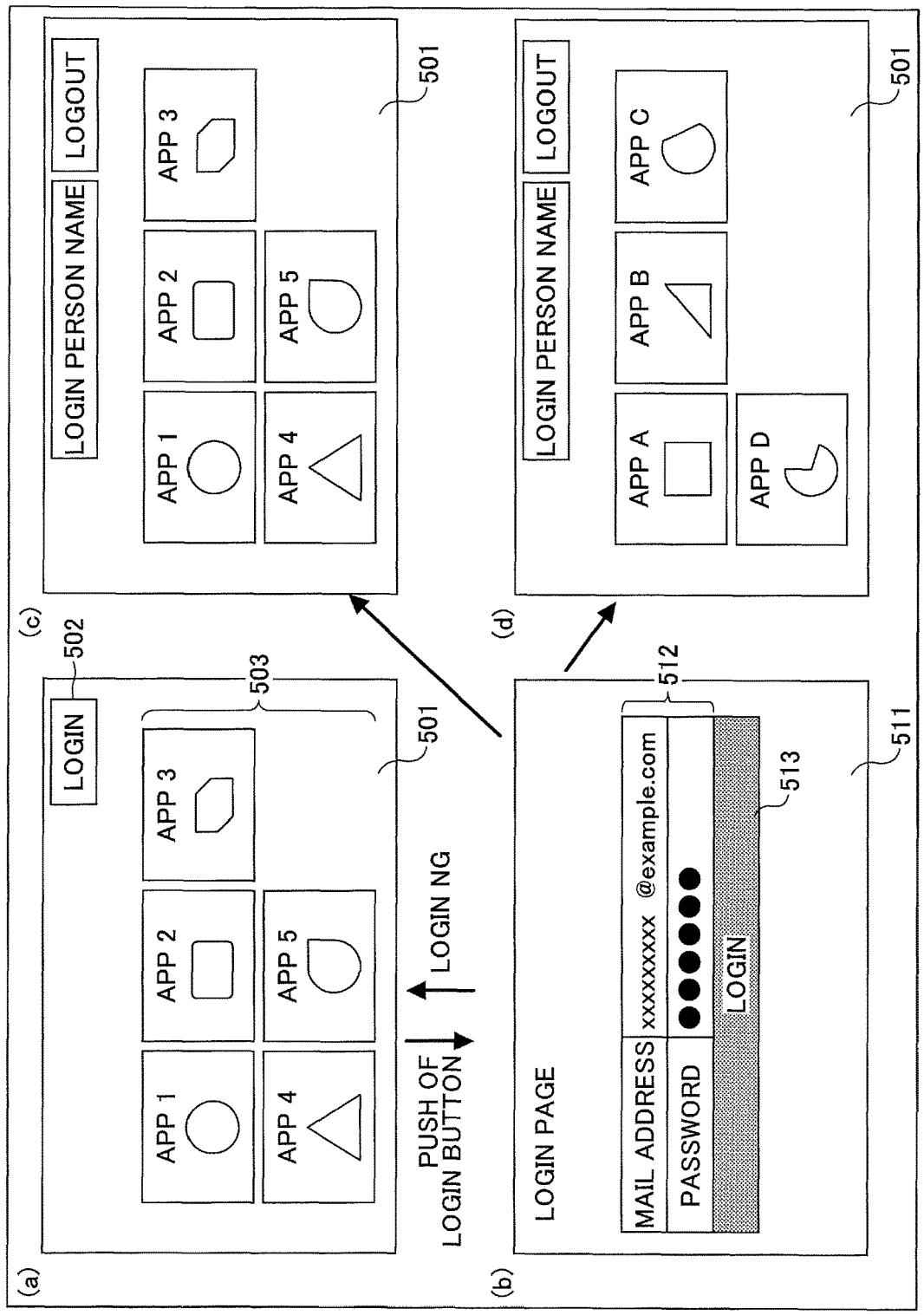

FIG. 8 is an example of a sequence diagram illustrating a login to the cloud server 50 using the multifunction peripheral 10 of the tenant, in which oneself is not registered, and the profile 9 of oneself is used in the multifunction peripheral 10. Referring to FIG. 9, an example of a screen is described. FIG. 9 illustrates a transition example of the screen displayed on the operation panel.

The user conducts an operation of displaying the app home screen on the multifunction peripheral 10 (step S1). The user conducts an operation of displaying the app home screen 501 on the multifunction peripheral 10.

When the operation receiving unit 12 receives this operation, the operation receiving unit 12 requests the communication unit 11 to acquire the profile 9 (step S2).

The communication unit 11 of the multifunction peripheral 10 sends the acquisition request to acquire the profile 9 to the cloud server 50 (step S3). The acquisition request includes the apparatus information of the multifunction peripheral 10.

When the communication unit 51 of the cloud server 50 receives the acquisition request to acquire the profile 9, the communication unit 51 sends out the acquisition request to acquire the profile 9 to the profile determining unit 52 while designating the apparatus information (step S4).

The profile determining unit 52 requests the tenant administering unit 54 to send the tenant information 61 of the tenant, in which the multifunction peripheral 10 is registered in step S5.

The tenant administering unit 54 acquires the tenant ID associated with the apparatus information with reference to the MFP registration information 63 (step S6). Next, the tenant administering unit 54 acquires the tenant information 61, in which this tenant ID is registered, and sends out the acquired tenant information 61 to the profile determining unit 52.

Next, the profile determining unit 52 requests the profile administering unit 55 to send the profile ID of the profile 9 corresponding to the tenant ID by designating the tenant ID of the tenant information 61 acquired in step S6.

The profile administering unit 55 specifies the profile 9 using the designated tenant ID as the administration source tenant ID and acquires the profile ID from this profile 9 (step S8). The profile administering unit 55 sends the profile ID to the profile determining unit 52. In a case where the number of the profiles 9 having the same administration source tenant ID is multiple, all the profile IDs are sent.

The profile determining unit 52 requests the profile administering unit 55 to send the profile 9 by designating the profile ID (step S9). In a case where multiple profile IDs are sent out of the profile administering unit 55, the profile determining unit 52 specifies a default profile ID and thereafter requests the profile administering unit 55 to send the profile 9 while designating the profile ID.

The profile administering unit 55 sends the profile 9 specified by the profile ID to the profile determining unit 52 (step S10).

The profile determining unit 52 sends the acquired profile 9 to the communication unit 51 (step S11).

The communication unit 51 of the cloud server 50 receives the profile 9 and sends the profile 9 to the multifunction peripheral 10 (step S12).

The communication unit 11 of the multifunction peripheral 10 receives the profile 9 and sends the profile 9 to the display processing unit 14 (step S13).

The display processing unit 14 displays an app home screen based on the profile 9 on the operation panel (step S14). Referring to FIG. 9, (a) illustrates an example of the app home screen. This app home screen is based on the profile 9 of the multifunction peripheral 10. The display processing unit 14 caches the profile 9 to use the profile 9. With this, the image forming apparatus may not acquire the profile 9 from the cloud server 50 at every screen transition. The "caching" is to store data in a memory device such as an HDD 209.

Next, the user logs into the cloud server 50 to set the profile 9 ordinarily used by the user to the multifunction peripheral 10.

The user conducts operations of inputting the user ID and the password to log in using a login screen (step S21). FIG. 9(b) illustrates an example of the login screen. The user inputs the user ID and the password in the login screen.

The operation receiving unit 12 of the multifunction peripheral 10 receives this operation and sends a login request including the user ID and the password to the login requesting unit 13 (step S22).

The login requesting unit 13 sends the login request including the user ID, the password, and the apparatus information to the communication unit 11 (step S23).

The communication unit 11 sends a login request including the user ID, the password, and the apparatus information to the cloud server 50 (step S24).

The communication unit 51 of the cloud server 50 receives the login request and sends the login request and the apparatus information to the profile determining unit 52 (step S25).

The profile determining unit 52 designates the apparatus information and requests the tenant administering unit 54 to send the tenant information 61 of the tenant, in which the user is registered, in step S26. The apparatus information is sent from another multifunction peripheral 10 to the cloud server 50. Therefore, at the time of the login, the tenant information 61 is specified based on the apparatus information anew.

The tenant administering unit 54 acquires the tenant ID associated with the apparatus information with reference to the MFP registration information 63 (step S27). Next, the tenant administering unit 54 acquires the tenant information 61, in which this tenant ID is registered, and sends out the acquired tenant information 61 to the profile determining unit 52.

Next, the profile determining unit 52 requests the authenticating unit 53 to authenticate not only user ID and the password but also the user (step S28).

The authenticating unit 53 uses the user ID and the password to authenticate the user (step S29). Specifically, it is determined whether a set of the user ID and the password is registered in the authenticating unit 53. If the set of the user ID and the password is registered in the authenticating unit 53, it is determined that the authentication is successful (OK). If the set of the user ID and the password is not registered in the authenticating unit 53, it is determined that the authentication is unsuccessful (NG).

If it is determined that the authentication is successful, the profile determining unit 52 designates the user ID and acquires the tenant information of the tenant information 61, in which the user is registered, from the tenant administering unit 54 (step S30).

The tenant administering unit 54 acquires the tenant ID from the user registration information 62, and thereafter sends out the tenant information 61 of the tenant ID to the profile determining unit (step S31).

Figure 10:
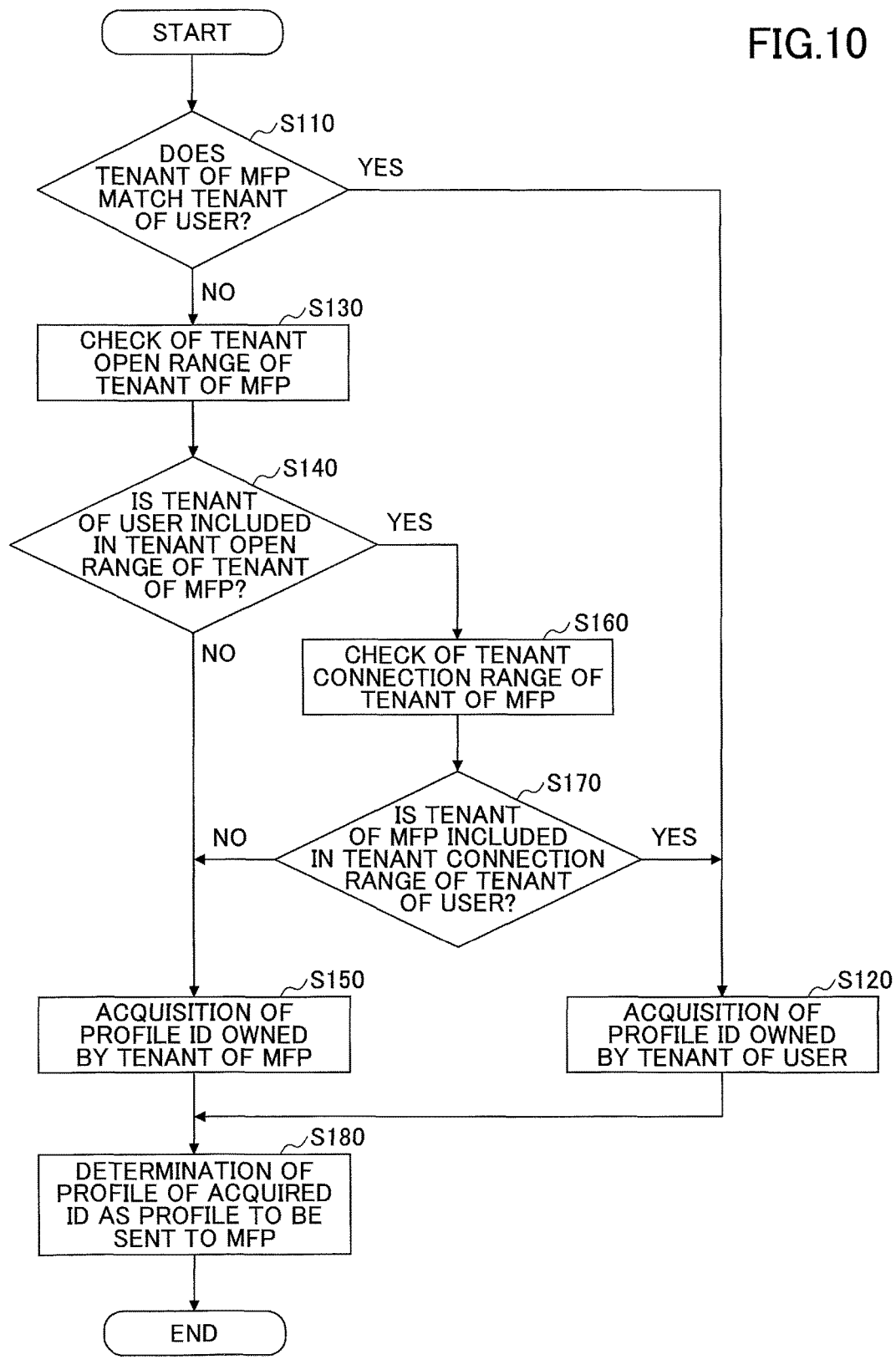
FIG. 10 is an example of a flowchart for explaining a procedure of determining a profile ID based on tenant information of the MFP and tenant information of the user.

The profile determining unit 52 determines the profile 9 sent to the multifunction peripheral 10 in response to whether the tenant, in which the multifunction peripheral 10 is registered, and the tenant, in which the user is registered, are the same (step S32). Referring to FIG. 10, a procedure of this determination is explained.

The profile determining unit 52 requests the profile administering unit 55 to send the profile 9 by designating the profile ID (step S33).

The profile administering unit 55 sends the profile 9 specified by the profile ID to the profile determining unit 52 (step S34).

The profile determining unit 52 sends the acquired profile 9 and a login result to the communication unit 51 (step S35).

The communication unit 51 of the cloud server 50 sends the profile 9 and the login result to the acquisition request to acquire the profile 9 to the multifunction peripheral 10 (step S36).

The communication unit 11 of the multifunction peripheral 10 receives the profile 9 and the login result, and sends out the profile 9 and the login result to the login requesting unit 13 (step S37).

The login requesting unit 13 sends the profile 9 and the login result out to the display processing unit 14 (step S38).

The display processing unit 14 displays the app home screen based on the profile 9 on the operation panel (step S39). Referring to FIG. 9, (c) and (d) illustrate app home screens after the login. There are two types of the app home screen displayed after the login, namely (c) and (d) in FIG. 9. Two types of the app home screen will be described in detail later.

[[Transition of Screen]]

The screens in FIG. 9 are described. Referring to FIG. 9, (a) is the app home screen 501, on which an icon 503 for launching an app operable in the multifunction peripheral 10 and a login button 502. When a login button 502 is pushed, a login screen 511 in (b) of FIG. 9 is displayed. Although the user can launch the app without the login, an app setup for the user is not reflected.

The login screen 511 in (b) of FIG. 9 includes the user ID, an input column 512 for the password, and a login request button 513. The login request button 513 is provided to cause the multifunction peripheral 10 to send the user ID and the password. As an example of the user ID, a mail address is input in (b) of FIG. 9. The user ID may be information of specifying the user.

In a case where the login is OK, the app home screen 501 in (c) or (d) of FIG. 9 is displayed. Referring to FIG. 9, (c) illustrates the app home screen 501 in a case where the tenant, in which the user is registered, and the tenant, in which the multifunction peripheral 10 is registered, are the same from among the app home screens after the login. In a case where the tenant is the same, the profile 9 is also the same. Therefore, the outer appearance of the app home screen 501 does not different from the outer appearance before the login illustrated in (a).

Referring to FIG. 9, (d) illustrates the app home screen 501 in a case where the tenant, in which the user is registered, and the tenant, in which the multifunction peripheral 10 is registered, are different from among the app home screens after the login. Because the app home screen 501 is displayed based on the profile 9 of the user, the outer appearance of the app home screen 501 changes from that illustrated in (a) of FIG. 9.

In a case where the login is NG, the app home screen 501 being the same as that illustrated in (a) of FIG. 9 is displayed.

[[Determination of the Profile ID]]

FIG. 10 is an example of a flowchart for explaining a procedure of determining a profile ID based on tenant information 61 of the multifunction peripheral 10 and tenant information 61 of the user.

At first, the profile determining unit 52 determines whether the tenant ID of the multifunction peripheral 10 matches the tenant ID of the user (step S110).

When the tenant ID of the multifunction peripheral 10 matches the tenant ID of the user (YES in step S110), any one of the tenant IDs can be similarly used to determine the profile ID. Therefore, the profile ID is determined so that the tenant ID of the user is the administration source tenant ID (step S120).

When the tenant ID of the multifunction peripheral 10 does not match the tenant ID of the user (NO in step S110), a tenant open range of the tenant information 61 of the multifunction peripheral 10 is referred to (step S130).

Then, the profile determining unit 52 determines whether the tenant ID of the tenant of the user is included in the tenant open range of the tenant of the multifunction peripheral 10 (step S140). Said differently, it is determined whether the tenant of the multifunction peripheral 10 permits that the profile is acquired from the tenant of the user.

When the determination in step S140 is NO, the profile 9 of the user cannot be referred to. Therefore, the profile determining unit 52 determines the profile ID, in which the tenant ID of the multifunction peripheral 10 is the administration source tenant ID (step S150).

When the determination in step S140 is YES, the tenant connection range of the tenant of the user is referred to (step S160).

Then, the profile determining unit 52 determines whether the tenant ID of the tenant of the multifunction peripheral 10 is included in the tenant connection range of the tenant (step S170). Said differently, it is determined whether the tenant of the user permits to provide the profile to the tenant of the multifunction peripheral 10.

When the determination in step S70 is NO, the profile 9 of the user cannot be acquired. Therefore, the profile determining unit 52 determines the profile ID, in which the tenant ID of the multifunction peripheral 10 is the administration source tenant ID (step S150).

When the determination in step S170 is YES, the tenant of the multifunction peripheral 10 can acquire the profile 9 of the user from the tenant of the user, and the tenant of the user permits the tenant of the multifunction peripheral 10 to provide with the profile 9 of the user. Therefore, the profile determining unit 52 determines the profile ID, in which the tenant ID of the user is the administration source tenant ID (step S120).

Next, the profile determining unit 52 determines that the profile 9 of the determined profile 9 as the profile 9 to be sent to the multifunction peripheral 10 (step S180).

In the process illustrated in FIG. 10, the cloud server can control so that the profile 9 administered by the tenant, in which the user is registered, is always sent to the multifunction peripheral 10. In this case, when the tenant ID of the multifunction peripheral 10 does not match the tenant ID of the user (NO in step S110), the profile determining unit 52 determines whether there is a setup of giving a priority to the profile 9 administered by a tenant, in which the user is registered. When there is the setup of giving the priority to the profile 9, the process of step S120 is conducted. With this, even in a case where the tenant ID of the multifunction peripheral 10 does not match the tenant ID of the user, the profile 9 administered by the tenant, in which the user is registered, is always sent to the multifunction peripheral 10. In this case, the user is always enabled to use the same profile 9 without any limitation. For example, in the multifunction peripheral 10 installed in a public area such as a convenience store, the user can always use the same app home screen.

Case where Authentication of User is NG

In a case where authentication of the user is NG (unsuccessful), the cloud server 50 may not provide the profile 9 administered by the tenant, in which the user is registered. Therefore, the profile 9 administered by the tenant, in which the multifunction peripheral 10 is registered as follows, is provided.

Figure 11:
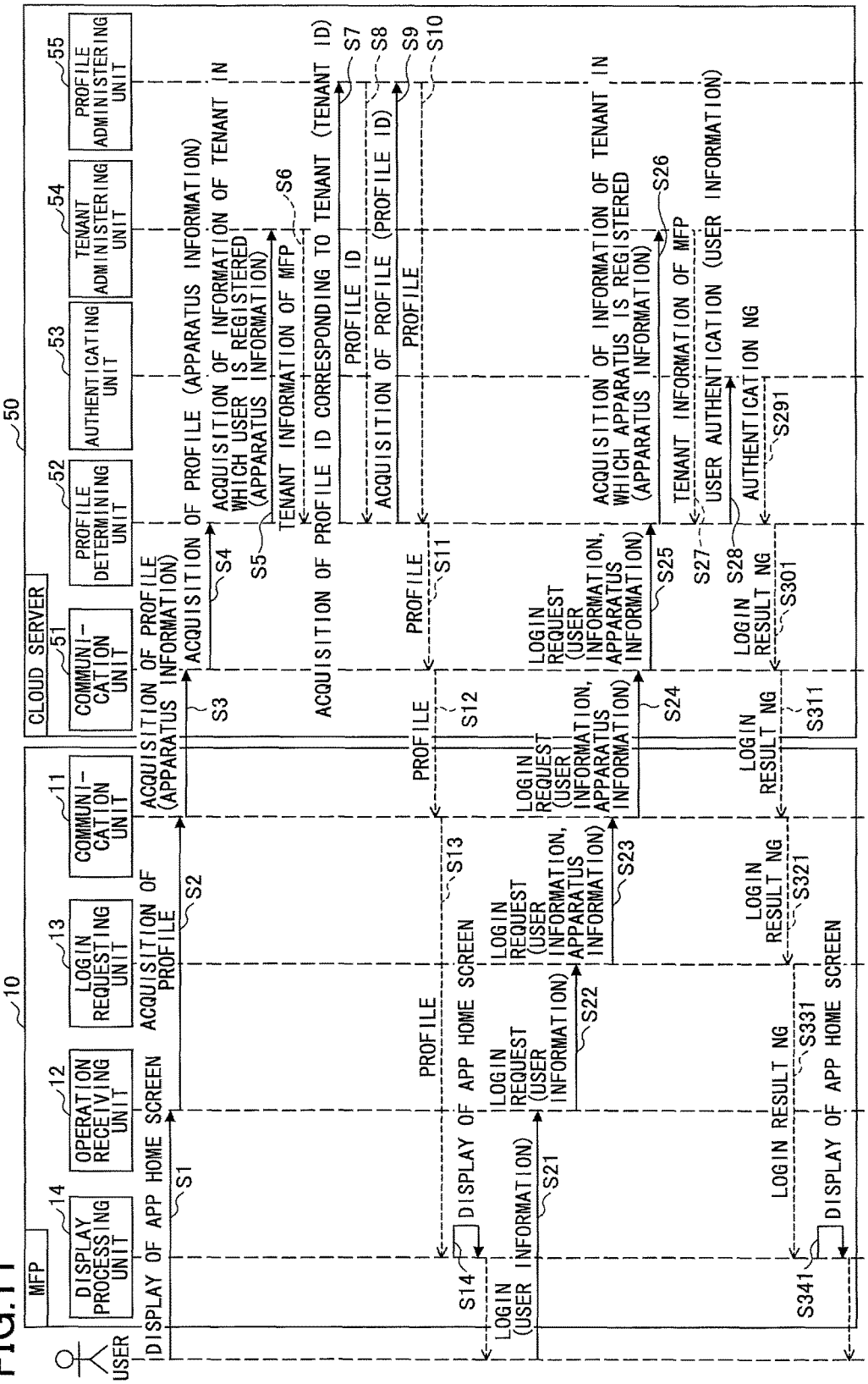
FIG. 11 is an example of a sequence diagram illustrating a login to the cloud server using the MFP of the tenant, in which oneself is not registered, and the profile of oneself is used in the MFP.

FIG. 11 is an example of a sequence diagram illustrating a login to the cloud server 50 using the multifunction peripheral 10 of the tenant, in which oneself is not registered, and the profile 9 of oneself is used in the multifunction peripheral 10. Referring to FIG. 11, a difference from FIG. 8 is mainly described.

The processes of steps S1 to S14 and steps S21 to S28 are similar to FIG. 8.

The authenticating unit 53 uses the user ID and the password to authenticate the user (step S291). Here, because a set of the user ID and the password is not registered in the authenticating unit 53, the authentication is unsuccessful (NG).

Because the authentication is unsuccessful (NG), the profile determining unit 52 sends out the login result (NG) to the communication unit 51 (step S301).

The communication unit 51 of the cloud server 50 sends the login result (NG) to the multifunction peripheral 10 (step S311).

The communication unit 11 of the multifunction peripheral 10 receives the login result (NG) and sends out the login result (NG) to the login requesting unit 13 (step S321).

The login requesting unit 13 sends out the login result (NG) to the display processing unit 14 (step S331).

The display processing unit 14 displays the app home screen based on the profile 9 cached in step S14 on the operation panel because the login result is NG (step S341). Therefore, the app home screen illustrated in (c) of FIG. 9 is displayed. As described, in a case where the login is not possible, the user can use the multifunction peripheral 10.

As described, the information processing system 100 can set the profile 9 administered by the tenant, in which the user is registered, to the multifunction peripheral 10 in a case where the tenant, in which the multifunction peripheral 10 is registered, differs from the tenant, in which the user is registered. The user can use the multifunction peripheral 10 in an environment the same as an ordinary environment.

Second Embodiment

The process of the first embodiment enables the user to use the profile 9 ordinarily used by the user in the multifunction peripheral 10 registered in the tenant, in which the user is not registered.

However, when the user uses the app by logging in the cloud server 50 from the multifunction peripheral 10 of the tenant, in which the user is not registered, an inconvenience related to billing or the like occurs. Said differently, in a case where the user prints using the multifunction peripheral 10 of another tenant in pull printing, for example, a cost related to printing is billed to the tenant, in which the user is not registered. Depending on the app, there is a case where the multifunction peripheral 10 accesses an external server. However, there may exist a tenant, which does not wish to permit an access to the external server in consideration of security.

Further, for the tenant of oneself, in which the user is registered, it is wished to limit that the user of the tenant of oneself arbitrarily use the multifunction peripheral 10 that is registered in another tenant.

Within the second embodiment, described is the information processing system 100 of limiting a usable function in a case where the user of another tenant uses the multifunction peripheral 10 of the tenant of oneself and a case where the user of the tenant of oneself uses the multifunction peripheral 10 of another tenant.

The user of the tenant of oneself represents a certain user registered in a certain tenant, and the user of another tenant represents a user who is not registered in the tenant of oneself.

In the information processing system 100 of the second embodiment, a usable function of the multifunction peripheral 10 of the tenant of oneself usable by the user of another tenant is registered in the tenant information 61. Further, a function of another tenant usable by the user of the tenant of oneself is registered in the tenant information 61. With this, it is possible to display only an app permitted to use in the tenant information 61 from among the apps designated by the profile 9. Thus, it is possible to limit the function usable by the user.

Function

Figure 12:
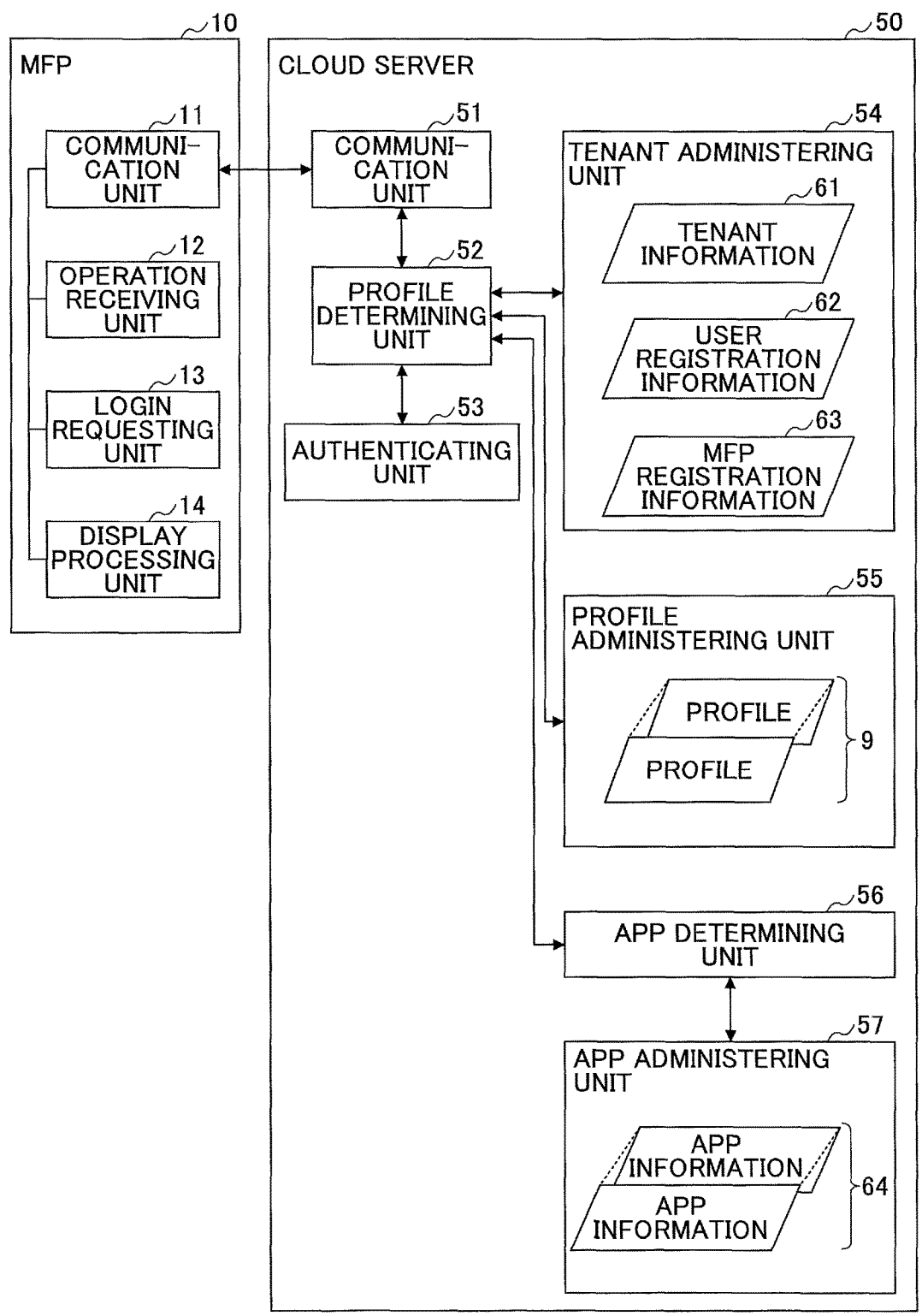
FIG. 12 an example of a functional block diagram for explaining the function of the information processing system.

FIG. 12 is logs into an example of a functional block diagram for explaining the function of the information processing system 100. Referring to FIG. 12, the structural elements having the same reference symbols as FIG. 7A perform similar functions. Therefore, only major structural elements of the second embodiment may be described.

[[Cloud Server 50]]

Within the second embodiment, the cloud server 50 includes an app determining unit 56 and an app administering unit 57 in addition to FIG. 7A. The app determining unit 56 is substantialized when the CPU 201 illustrated in FIG. 5 executes a program 209p and determines an app to be displayed on the multifunction peripheral 10.

The app administering unit 57 is substantialized when the CPU 201 illustrated in FIG. 5 executes the program 209p or by the memory 202 to administer the app. Specifically, there is app information, in which functions of the multifunction peripheral 10 used by the apps are registered by each of the apps.

Further, within the second embodiment, the tenant information 61 administered by the tenant administering unit 54 is different from the first embodiment.

TABLE 4

| ITEM NAME | SETUP VALUE EXAMPLE |
|---|---|
| TENANT ID | 111 |
| TENANT NAME | TENANT 1 |
| TENANT OPEN RANGE | 222 |
| | 333 |
| AVAILABLE FUNCTION OF TENANT OPEN RANGE | PRINT, SCAN |
| TENANT CONNECTION RANGE | 222 |
| | 333 |
| | 444 |
| | 555 |
| AVAILABLE FUNCTION OF TENANT CONNECTION RANGE | SCAN, OCR, EXTERNAL SERVICE CONNECTION |

Table 4 represents an example of the tenant information 61. In comparison with Table 1, the tenant information 61 of Table 4 includes an available function of tenant open range and an available function of tenant connection range. The available function of tenant open range is a function which can be used at a time when the user of another tenant logs into the multifunction peripheral 10 of the tenant of oneself (an example of first permission function information). When the user of a tenant A logs into the multifunction peripheral 10 of a tenant B, the available function of tenant open range is specified by the tenant ID associated with the multifunction peripheral 10 of the tenant B. Thus, a function usable by the user of the tenant A is limited.

The available function of tenant connection range is a function which can be used at a time when the user of the tenant of oneself logs into the multifunction peripheral 10 of another tenant (an example of second permission function information). When the user of the tenant A logs into the multifunction peripheral 10 of the tenant B, the available function of tenant connection range is specified by the tenant ID associated with the user ID. Thus, a function usable by the user of the tenant A is limited.

The available function of tenant open range and the available function of tenant connection range may have multiple setup values. The available function of tenant open range and the available function of tenant connection range may not have a setup value at all.

Although both the available function of tenant open range and the available function of tenant connection range are white lists, both the available function of tenant open range and the available function of tenant connection range may be a black list, in which a function of an open or a connection is prohibited.

The external service connection of the available function of tenant connection range is a function of uploading image data (step Scan data) obtained by scanning to the external storage, and/or a function of acquiring (and subsequently printing) data from the external storage service. The service name of the external storage service is, for example, google drive ("google drive" is a registered trademark) and drop box ("google drive" is a registered trademark).

TABLE 5

| ITEM NAME | SETUP VALUE EXAMPLE |
|---|---|
| APP ID | 123 |
| APP NAME | COPY APP |
| USE FUNCTION | COPY |
| | SCAN |

TABLE 6

| ITEM NAME | SETUP VALUE EXAMPLE |
|---|---|
| APP ID | 456 |
| APP NAME | Scan to folder |
| USE FUNCTION | SCAN |
| | EXTERNAL SERVICE CONNECTION |

Tables 5 and 6 represent examples of app information. Table 5 represents the app information of the copy app as an example. Table 6 represents the app information of Scan to folder as an example. The "Scan to folder" is the app, by which image data of an original manuscript read using the function of scanning by the multifunction peripheral 10 is sent to and stored in a predetermined folder.

The app information includes items and setup values of an app ID, an app name, and a use function. The app ID is information for specifying the app. The app name is the name or the nominal designation of the app. The use function is a function used by the app. For example, the app called Copy uses functions of copy and scan. The app called Scan to folder uses functions of scan and external service connection. When the user uses the app, a use of the use function may be permitted. Therefore, in a case where the use function is included in an available function of tenant open range or an available function of tenant connection range, the user can use the app.

A setup value of the use function may be plural. Therefore, in a case where the user uses the app, all the use functions may be included in the available function of the tenant open range or the available function of the tenant connection range.

Operation Procedure

Figure 13:
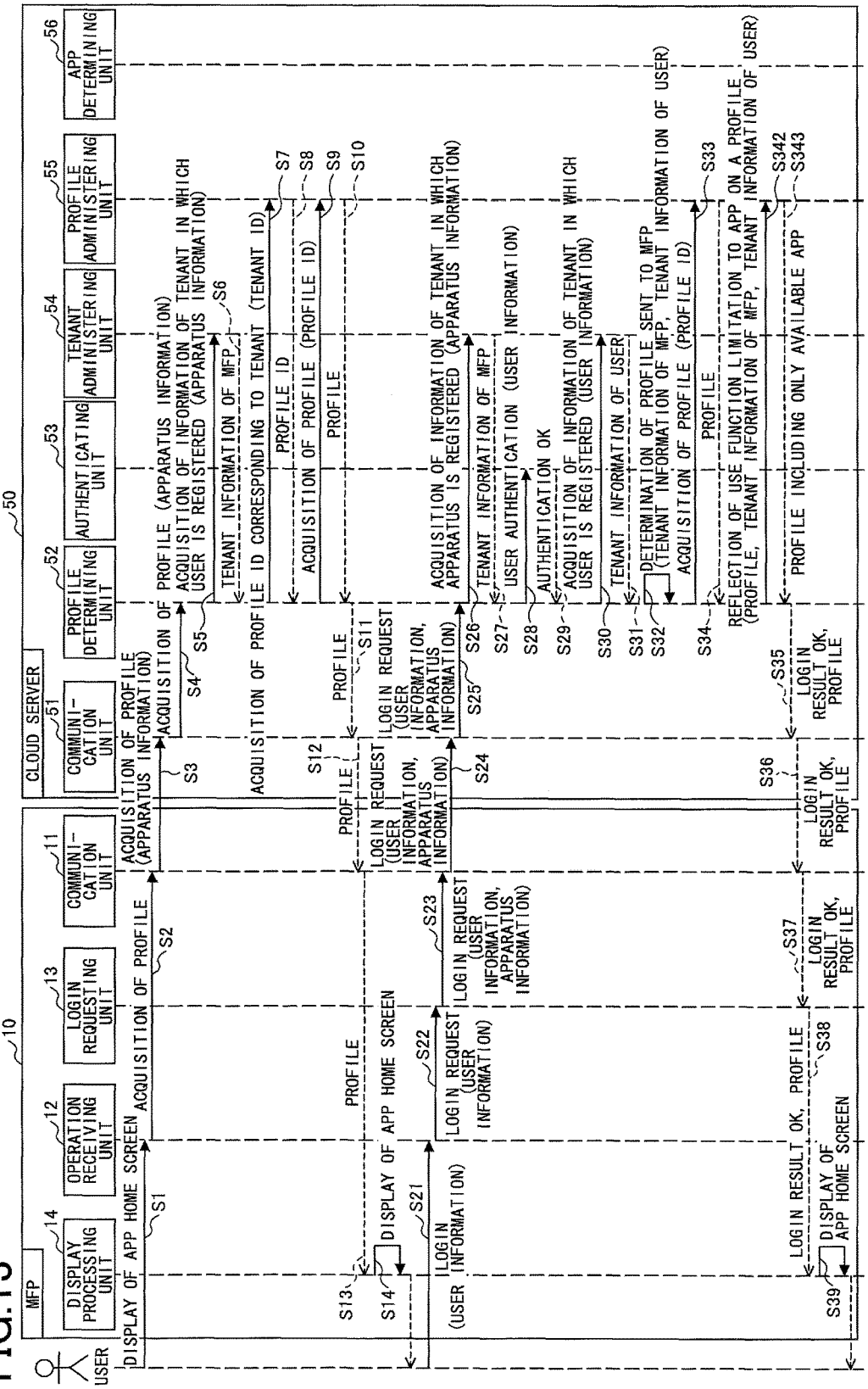
FIG. 13 is an example of the sequence diagram illustrating the login to the cloud server using the MFP of the tenant, in which the oneself is not registered, and the profile of oneself is used in the MFP (step Second Embodiment).

FIG. 13 is an example of a sequence diagram illustrating a login to the cloud server 50 using the multifunction peripheral 10 of the tenant, in which oneself is not registered, and the profile 9 of oneself is used in the multifunction peripheral 10. Referring to FIG. 13, a difference from FIG. 8 is mainly described.

Processes of steps S1 to S14 and steps S21 to S34 may be similar to the steps in FIG. 8. The profile determining unit 52 acquired the profile 9 reflects a use function limitation to the profile 9 (step S342). The profile determining unit 52 sends out the profile 9, the tenant information 61 of the multifunction peripheral 10, and the tenant information 61 of the user. The process in the app determining unit 56 is described later with reference to FIG. 14.

The app determining unit 56 sends out the profile 9 including only the available app after reflecting the use limitation to the profile determining unit 52 (step S343). Subsequent processes of steps S35 to S39 may be similar to those in FIG. 8.

[[Reflection of Use Limitation]]

Figure 14:
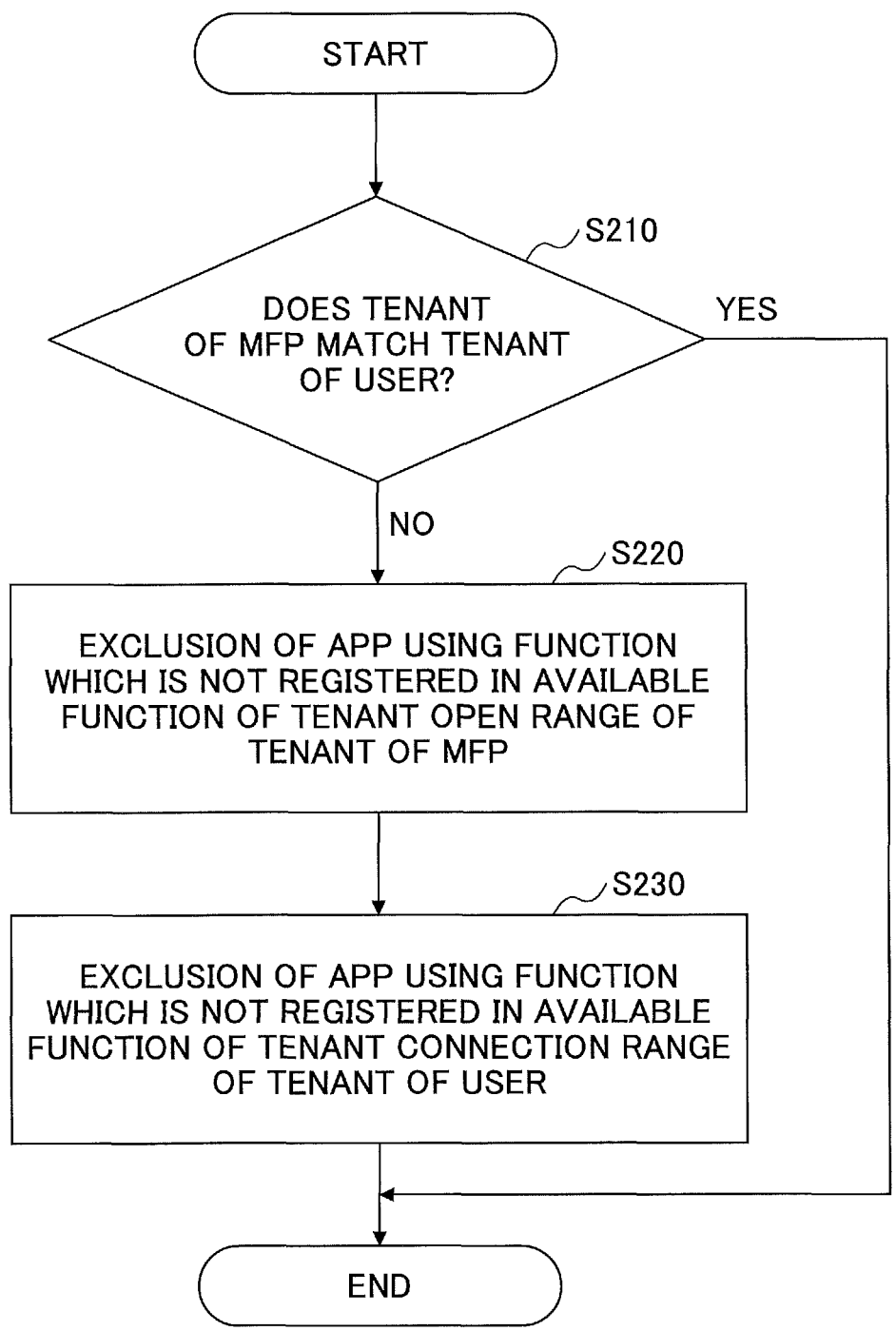
FIG. 14 is an example of a flowchart illustrating a procedure that an app determining unit limits an application (app) usable by the user.
Figure 15:
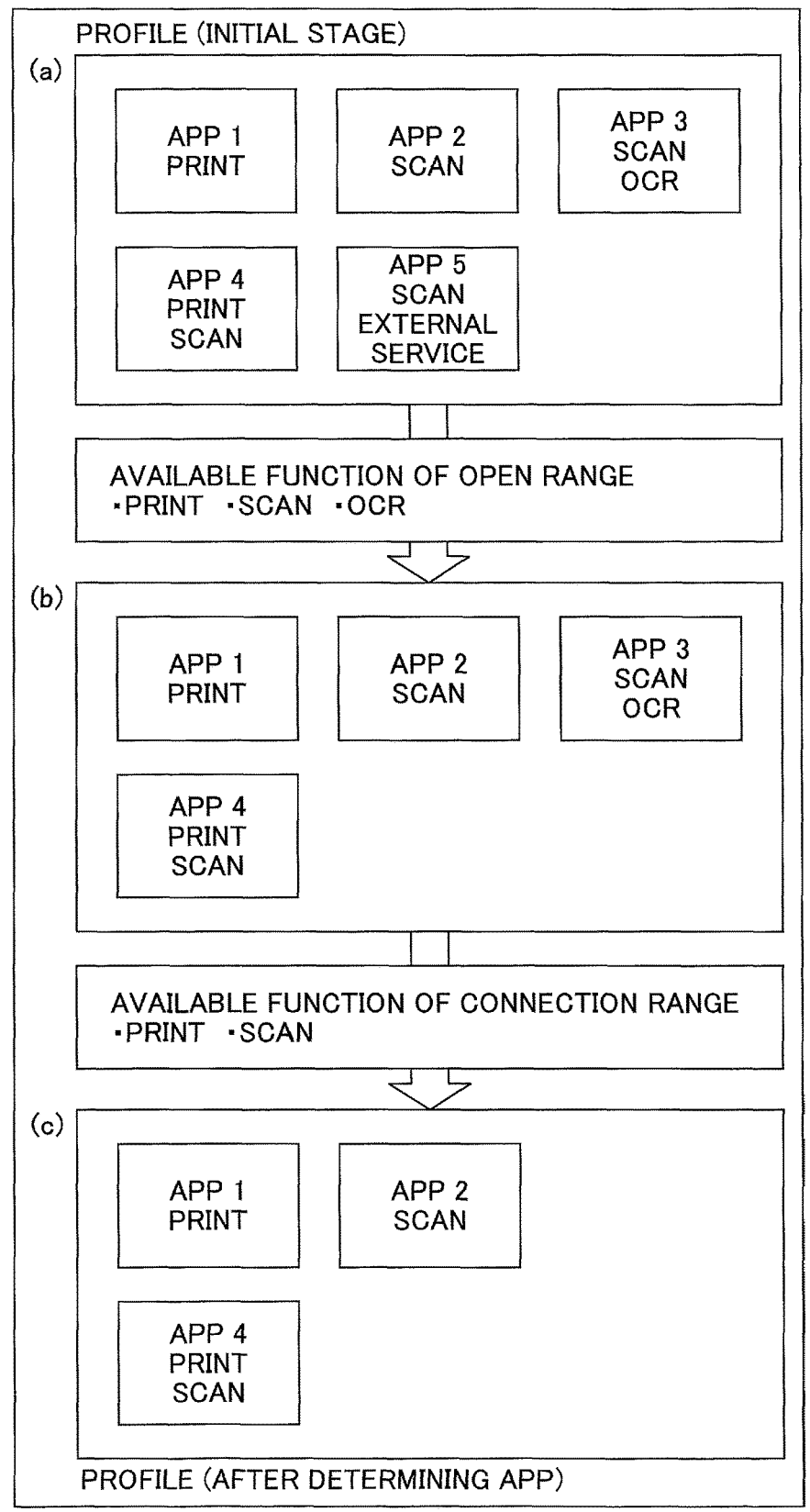
FIG. 15 is an example of explaining a flow of an excluding process of the app using a use limitation.

FIG. 14 is an example of a flowchart illustrating a procedure that the app determining unit 56 limits an app usable by the user. By the process illustrated in FIG. 14, an app which does not operate using the available function is omitted from among the apps registered in the profile 9 determined in step S34 of FIG. 13. FIG. 15 explains the use limitation using specific apps.

The app determining unit 56 refers to the tenant information 61 of the multifunction peripheral 10 and the tenant information 61 of the user and determines whether the tenant ID of the multifunction peripheral 10 matches the tenant ID of the user (step S210).

In the case where the tenant ID of the multifunction peripheral 10 matches the tenant ID of the user (YES in Step S210), the available app is not limited. Therefore, the app determining unit 56 does not omit the app registered in the profile 9.

In the case where the tenant ID of the multifunction peripheral 10 does not match the tenant ID of the user (NO in Step S210), an app using a function not registered (a function other than the registered function) in the available function of the tenant open range of the tenant information 61 is omitted from the apps registered in the profile 9 (step S220). Specifically, the app determining unit 56 reads out the available function of the tenant open range from the tenant information 61 of the multifunction peripheral 10. Next, all the app registered in the profile 9 are read out. The app determining unit 56 acquires the use function used by each app from the app information administered by the app administering unit 57. Then, the use function used by the app registered in the profile 9 is specified. It is determined whether the use function is registered in the available function of the tenant open range. Because the app which is not registered is not available, such an app is omitted from the profile 9 by the app determining unit 56.

Next, the app determining unit 56 conducts a process similar to the above for the available function of the tenant connection range. Said differently, the app determining unit 56 omits the app using the function not registered (the function other than the registered function) in the available function of the tenant connection range of the tenant information 61 from the apps registered in the profile 9 (step S230). Specifically, the app determining unit 56 reads out the available function of the tenant connection range from the tenant information 61 of the user. Next, all the apps not omitted in step S220 are read out. The app determining unit 56 acquires the use function used by each app from the app information 56 administered by the app administering unit 57. Then, the use function used by the app not omitted in step S220 is specified. It is determined whether the use function is registered in the available function of the tenant connection range. Because the app which is not registered is not available, such an app is omitted from the profile 9 by the app determining unit 56.

Whichever a step S220 or a step S230 may be determined earlier.

Even in a case where the tenant of the multifunction peripheral 10 is determined to match the tenant of the user in step S210, the app determining unit may limit the use any way. For example, an app other than the app having the function permitted by the tenant of the multifunction peripheral 10 is omitted from the profile. With this, in a case where the user of the tenant of oneself uses the multifunction peripheral 10 of the tenant of oneself, the use can be limited. For example, the function which is not temporarily used by the tenant of oneself may be subjected to the use limitation.

[[Screen Example]]

FIG. 15 is an example of explaining a flow of an excluding process of the app using the use limitation. Referring to FIG. 15, (a) illustrates a view of apps registered in the profile. Said differently, (a) illustrates at least one app (print, scan, scan OCR, print scan, and scan external service) in an initial stage before omitting the app.

The available function of the tenant open range of the tenant information 61 of the multifunction peripheral 10 is print, scan, and OCR. Among these, because there is not a function (an external service connection) required by an app called the scan external service, the app determining unit 56 omits the app called the scan external service. Referring to FIG. 15, (b) illustrates the app view from which the scan external service is omitted from the profile 9.

Here, the available function of the tenant connection range of the tenant information 61 of the user is print and scan. Because there is not a function (OCR between scan and OCR) necessary for a scan OCR, the app determining unit 56 omits the app of scan OCR. Referring to FIG. 15, (c) illustrates the app view from which the scan external service and the scan OCR are omitted from the profile 9. As such, it is possible to limit the use of the app, which the user can not use in another tenant.

Within the above process, it is possible to limit a usable function in a case where the user of another tenant uses the multifunction peripheral 10 of the tenant of oneself and a case where the user of the tenant of oneself uses the multifunction peripheral 10 of another tenant. If only the process of step S220 illustrated in FIG. 14 is performed, it is possible to limit the usable function in a case where the user of the other tenant uses the multifunction peripheral 10 of the tenant of oneself. If only the process of step S230 illustrated in FIG. 14 is performed, it is possible to limit the usable function in a case where the user of the tenant of oneself uses the multifunction peripheral 10 of another tenant.

Use Limitation for Each Detailed Function as an Element of the Function

Within the second embodiment, the use of the app is limited for each function (in a unit of the function). Further, it is possible to limit the use of the app for each detailed function. Said differently, the entire function of the print is not limited but, for example, only a color print can be limited in the print. The detailed function is the function to be the element of realizing the function. Described below is a detailed function.

TABLE 7

| BASIC FUNCTION | DETAILED FUNCTION |
|---|---|
| PRINT | BLACK AND WHITE |
| | COLOR |
| | DUPLEX |
| | SIMPLEX |
| | A4 |
| SCAN | RESOLUTION |
| | COLOR |
| | BLACK AND WHITE |
| | PDF |
| OCR | ENGLISH |
| | JAPANESE |
| EXTERNAL SERVICE CONNECTION | Google (REGISTERED TRADEMARK) office365 (REGISTERED TRADEMARK) |

Table 7 represents an example of detailed functions of each function. For example, the function of the print includes the detailed function s of black and white, color, duplex, simplex, and A4. In a manner similar thereto, each function of scan, OCR, and an external service connection has the detailed functions. These detailed functions can be set to the available function of the tenant open range or the available function of the tenant connection range. In this case, the detailed function is set to the app information for each app.

TABLE 8

| ITEM NAME | SETUP VALUE EXAMPLE |
|---|---|
| TENANT ID | 111 |
| TENANT NAME | TENANT 1 |
| TENANT OPEN RANGE | 222 |
| | 333 |

TABLE 8-continued

| | FUNCTION | DETAILED FUNCTION |
|---|---|---|
| AVAILABLE FUNCTION OF TENANT OPEN RANGE TENANT CONNECTION RANGE | PRINT | BLACK AND WHITE 222 333 444 555 |

| | FUNCTION | DETAILED FUNCTION |
|---|---|---|
| AVAILABLE FUNCTION OF TENANT CONNECTION RANGE | EXTERNAL SERVICE CONNECTION | google |

Table 8 represents an example of the tenant information 61, to which the detailed function is set. The detailed function of the black and white is registered to the function of the print in the available function of the tenant open range. Then, in a case where the user of another tenant logs into the multifunction peripheral 10 of the tenant of oneself, only the detailed function of the black and white in the print can be used. The app determining unit 56 deletes the app requiring the function other than the detailed function from the profile. The multifunction peripheral 10 displays the app using the print. However, only the "black and white" is displayed as an option of the print color. In this case, the app determining unit 56 does not exclude the app of the print but excludes the option other than the black and white inside the app.

Further, in the available function of the tenant connection range represented by Table 8, the detailed function of google ("google" is the registered trademark) is registered in the function of the external service connection. Then, in a case where the user of the tenant of oneself logs into the multifunction peripheral 10 of another tenant, only the detailed function of google ("google" is the registered trademark) can be used as the external service connection. The app determining unit 56 does not omit the app of the scan external service but omits an option other than google ("google" is the registered trademark).

As such, the use limitation is conducted for each detailed function. Therefore, the entire app is not subjected to the use limitation but the detailed use limitation is possible while permitting to use the app.

Third Embodiment

The process of the first embodiment enables the user to use the profile 9 ordinarily used by the user in the multifunction peripheral 10 registered in the tenant, in which the user is not registered. Within the second embodiment, the use of the app can be limited.

However, as explained in the first and second embodiments, the profile 9 used by the user is determined by the cloud server 50 and is sent to the multifunction peripheral 10. Therefore, the performance may become low. Specifically, a long time elapses to send the profile 9, and there is a risk that a waiting time after the user logs into and before the app home screen is displayed becomes long.

Within the third embodiment, in a case where the user of another tenant logs into through the multifunction peripheral 10 of the tenant of oneself, it is possible to prevent the performance of the information processing system 100 from degrading by using the profile 9 cached by the multifunction peripheral 10. This information processing system 100 is described next.

Function

Figure 16:
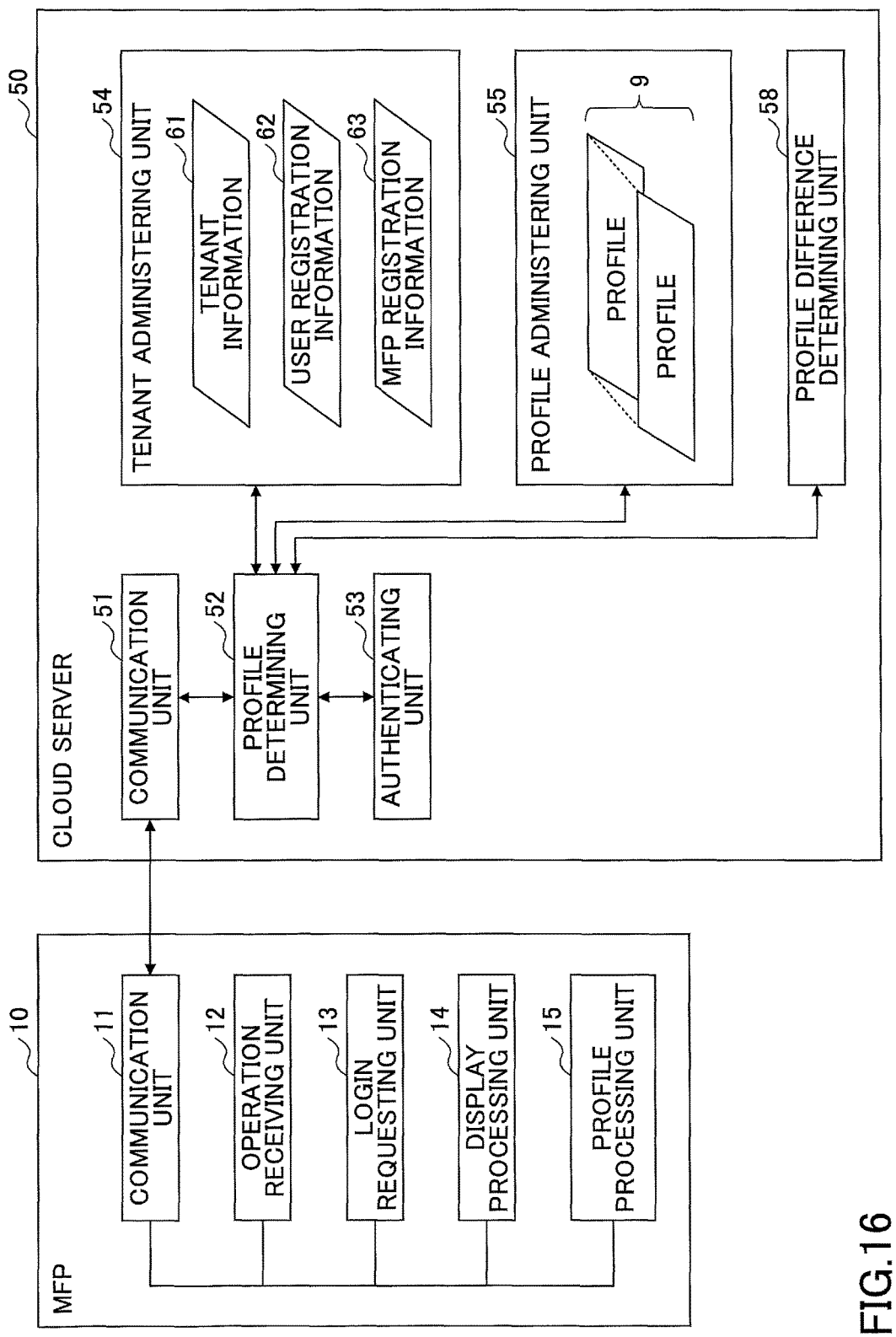
FIG. 16 is an example of a functional block diagram for explaining the function of the information processing system.

FIG. 16 is an example of a functional block diagram for explaining the function of the information processing system 100. Referring to FIG. 16, the structural elements having the same reference symbols as FIG. 7A perform similar functions. Therefore, only major structural elements of the third embodiment may be described.

[[Multifunction Peripheral 10]]

The multifunction peripheral 10 includes a profile processing unit 15 in comparison with FIG. 7A. The profile processing unit 15 is substantialized when the CPU 401 illustrated in FIG. 6 executes a program 408$p$ to administer the profile in the multifunction peripheral 10. Specifically, the profile processing unit 15 performs caching, combining, restoring, and administering in a situation of multiple profiles.

[[Cloud Server 50]]

In comparison with FIG. 7A, the cloud server 50 of the third embodiment includes a profile difference determining unit 58. The profile difference determining unit 58 is substantialized by the CPU 201 (illustrated in FIG. 5) executing the program 209$p$. The profile difference determining unit 58 determines a difference between the profile 9 administered by the tenant of the multifunction peripheral 10 and the profile 9 administered by the tenant of the user and produces a profile difference (difference information of setup information).

Operation Procedure

Figure 17:
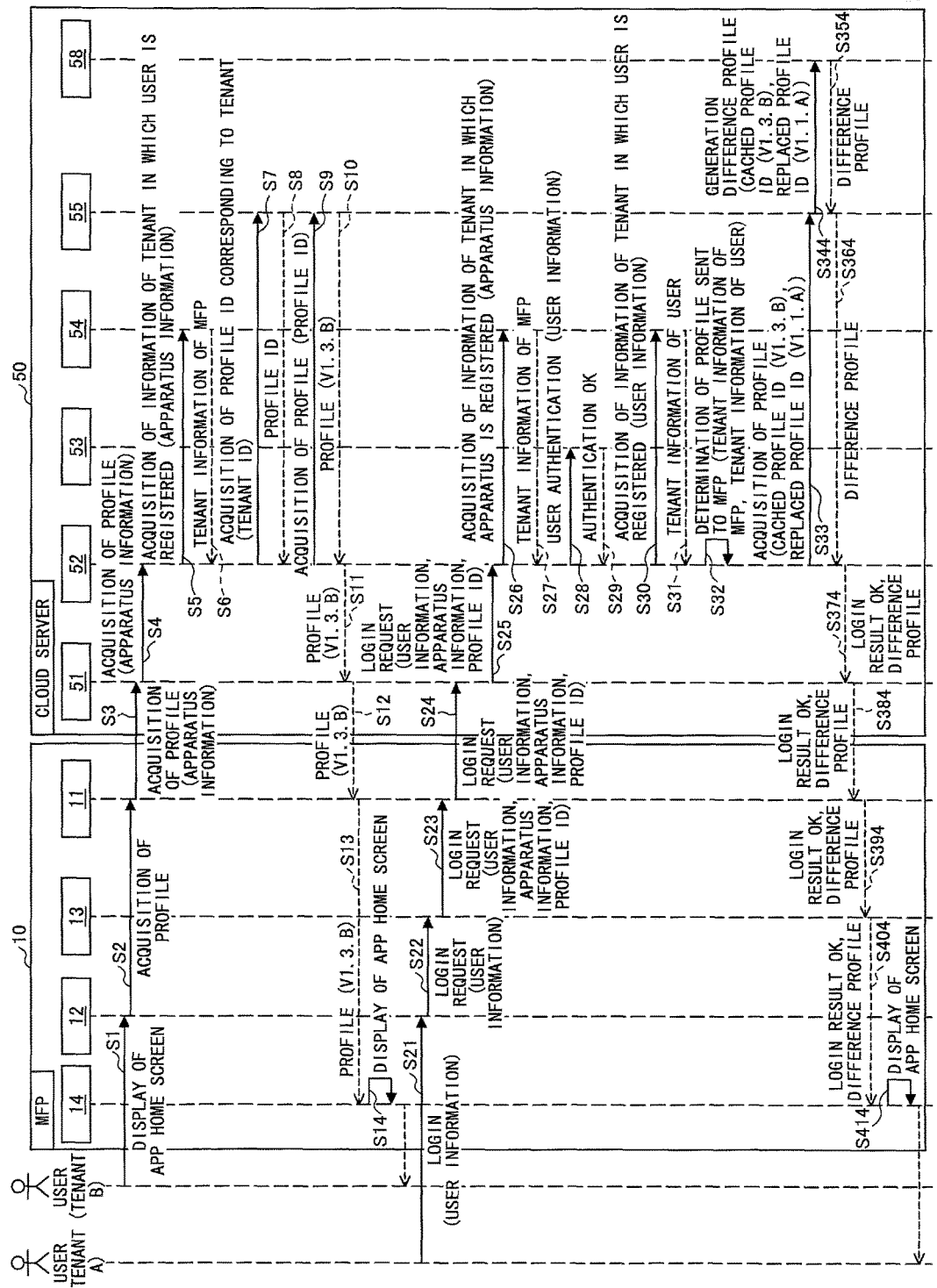
FIG. 17 is an example of the sequence diagram illustrating the login to the cloud server using the MFP of the tenant, in which the oneself is not registered, and the profile of oneself is used in the MFP (Third Embodiment).

FIG. 17 is an example of a sequence diagram illustrating a login to the cloud server 50 using the multifunction peripheral 10 of the tenant, in which oneself is not registered, and the profile 9 of oneself is used in the multifunction peripheral 10. Referring to FIG. 17, a difference from FIG. 8 is mainly described. Here, for convenience of explanation, the multifunction peripheral 10 is registered in the tenant B and the user is registered in the tenant A. Further, the tenant B uses the profile 9 (first setup information) having a profile ID of V1.3.B, and the tenant A uses the profile 9 (step Second setup information) having a profile ID of V1.1.A.

A process of steps S1 to S9 may be similar to those in FIG. 8. The profile administering unit 55 sends out the profile 9 having the profile ID of V1.3.B, which is administered by the tenant B, to the profile determining unit 52 (step S10). Hereinafter, the profile ID is represented by (V1.3.B).

The profile determining unit 52 sends out the acquired profile 9 (V1.3.B) to the communication unit 51 (step S11).

The communication unit 51 of the cloud server 50 sends the profile 9 (V1.3.B) to the multifunction peripheral 10 (step S12).

The communication unit 11 of the multifunction peripheral 10 receives the profile 9 and sends the profile 9 (V1.3.B) to the display processing unit 14 (step S13).

The display processing unit 14 displays an app home screen based on the profile 9 on the operation panel (step S14). The display processing unit 14 caches this profile 9 (V1.3.B) in advance.

Subsequent processes of steps S21 to S22 may be similar to those in FIG. 8. The login requesting unit 13 sends out a login request including a user ID, a password, the apparatus information, and a profile ID to the communication unit 11 (step S23).

The communication unit 11 sends a login request including the user ID, the password, the apparatus information, and the profile ID to the cloud server 50 (step S24).

The communication unit 51 of the cloud server 50 receives the login request and sends out the user ID, the password, the apparatus information, and the profile ID to the profile determining unit 52 (step S25).

Subsequent processes of steps S26 to S32 may be similar to those in FIG. 8. However, in step S27, the profile determining unit 52 acquires the tenant information 61 of the tenant B as the tenant information 61 of the multifunction peripheral 10. Further, in step S31, the profile determining unit 52 acquires the tenant information 61 of the tenant A as the tenant information 61 of the user. In step S32, the profile ID administered by the tenant A is determined to be V1.1.A.

The profile determining unit 52 sends out a profile ID (V1.3.B) cached by the multifunction peripheral 10 and a profile ID (V1.1.A) determined in step 32 together with the acquisition request to acquire the profile ID to the profile administering unit 55 (step S33).

The profile administering unit 55 sends out the profile ID (V1.3.B) cached by the multifunction peripheral 10 and the profile ID (V1.1.A) determined in step 32 together with an acquisition request to acquire a profile ID to the profile difference determining unit 58 (step S344).

The profile difference determining unit 58 generates a difference profile between two profiles 9 and sends out the difference profile to the profile administering unit 55 (step S354). Referring to FIG. 18A to FIG. 18D, a method of producing the difference profile is explained.

The profile administering unit 55 sends out the difference profile to the profile determining unit 52 (step S364).

Steps S374, S384, S394, and S404 become similar to steps S35 to S38 illustrated in FIG. 8. The display processing unit 14 sends out the difference profile and the cached profile 9 (V1.3.B) to the profile processing unit 15, and the profile processing unit 15 combines the difference profile and the cached profile 9 (V1.3.B) to produce the profile 9 (V1.1.A) administered by the tenant A (step S414). Thereafter, an app home screen is produced based on the produced profile 9 (V1.1.A). Further, the produced profile 9 (V1.1.A) is newly cached. In this case, if there is a space in a memory device, the produced profile 9 (V1.1.A) is cached together with the profile 9 (V1.3.B). If the space is not in the memory device, the profile 9 (V1.1.A) is deleted and only the produced profile 9 (V1.1.A) is cached (V1.3.B).

Because the difference profile is sent from the cloud server 50 to the multifunction peripheral 10 as described above, a communication time is shortened so as to improve the performance.

[[Difference Profile]]

Figure 18A:
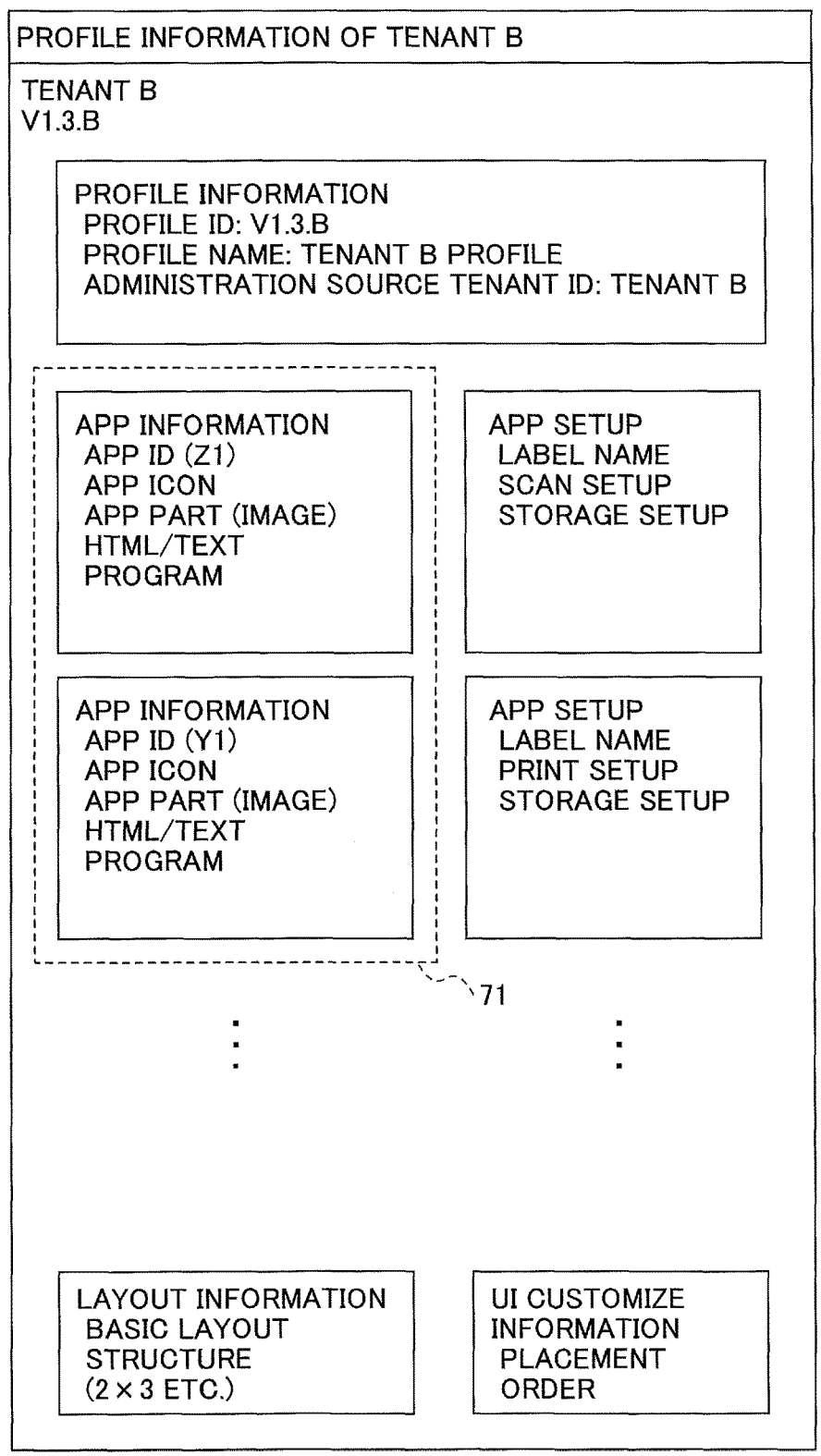
FIGS. 18A to 18D are an example of explaining generation of a profile difference.
Figure 18B:
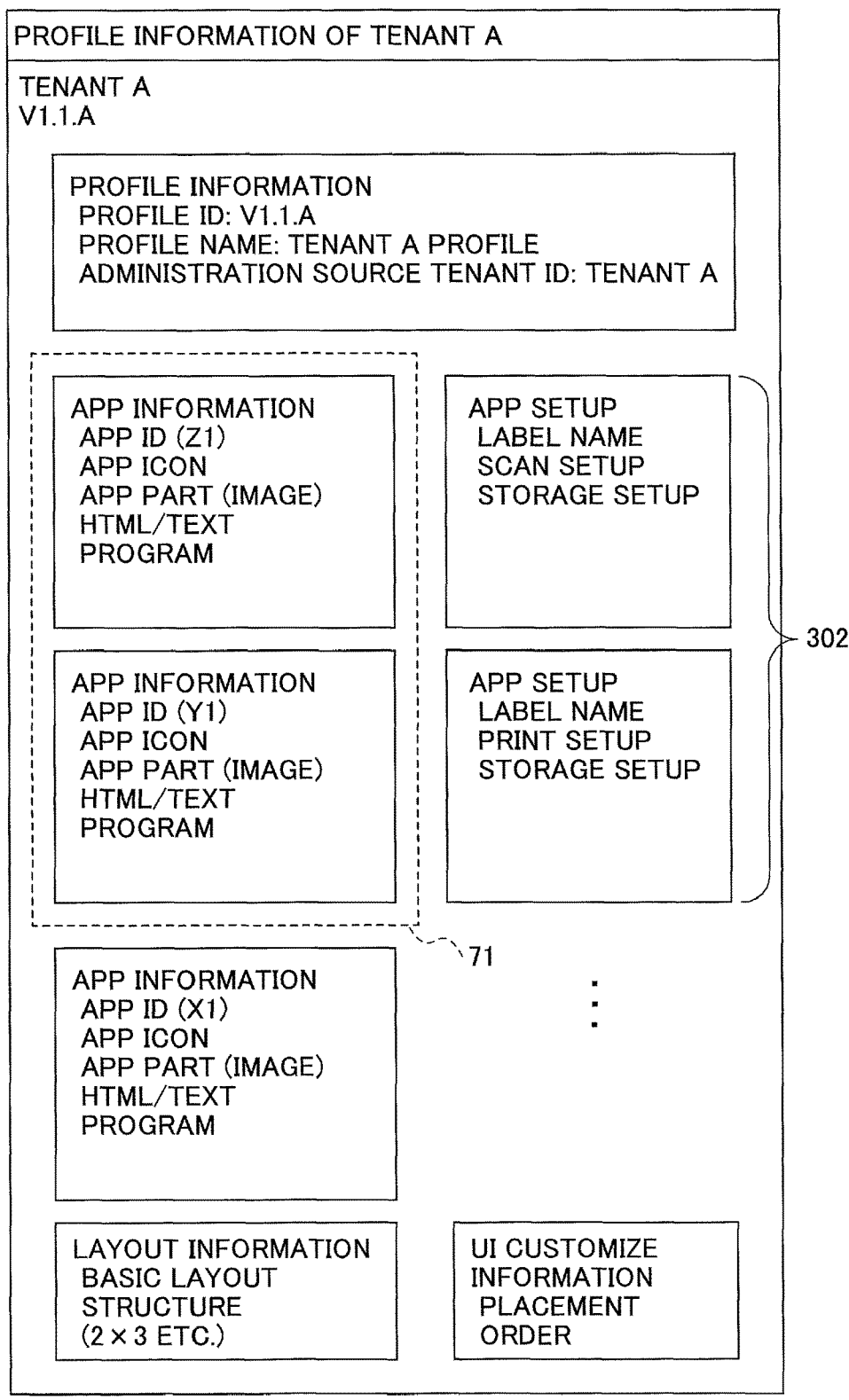
Figure 18C:
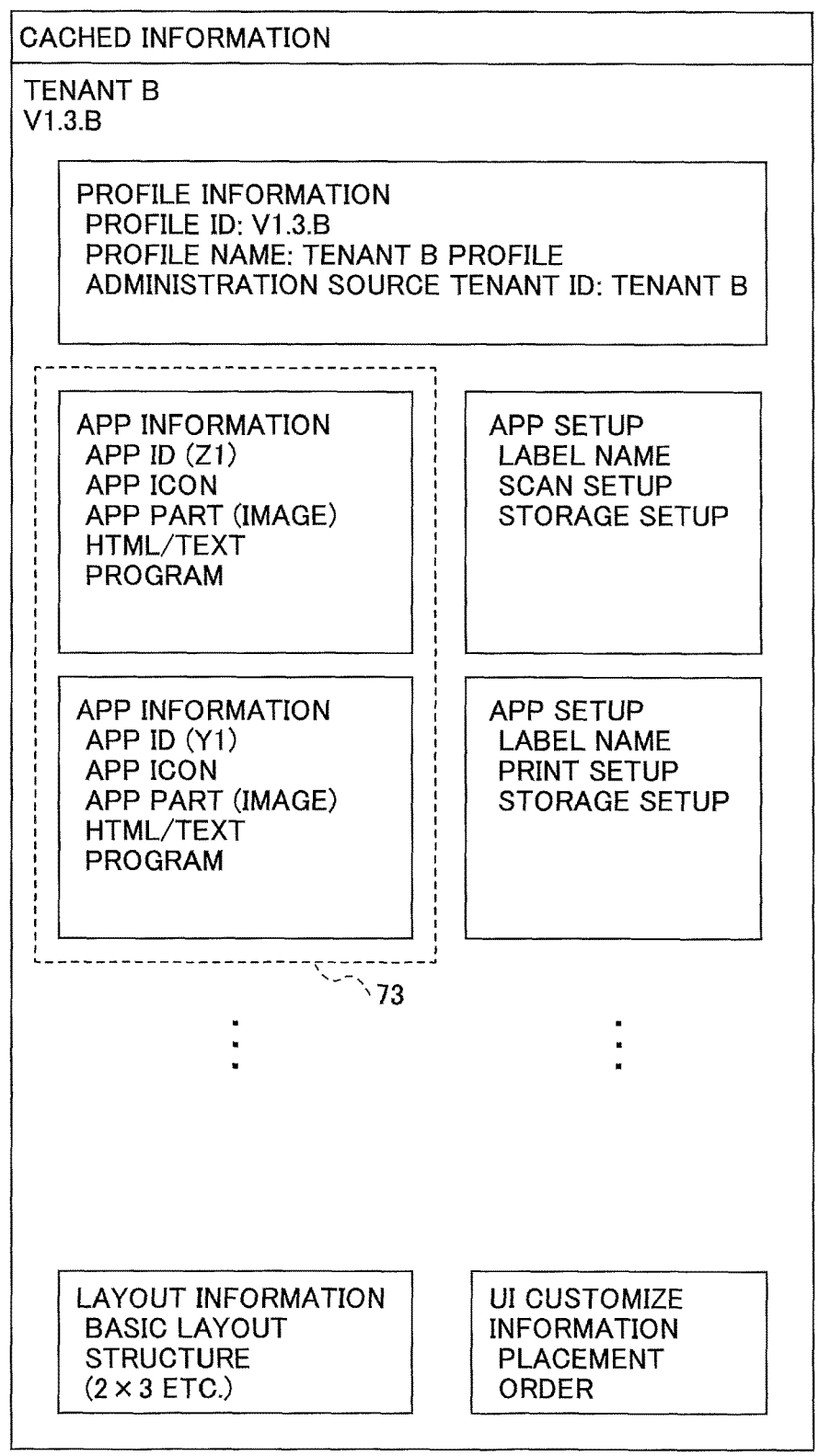
Figure 18D:
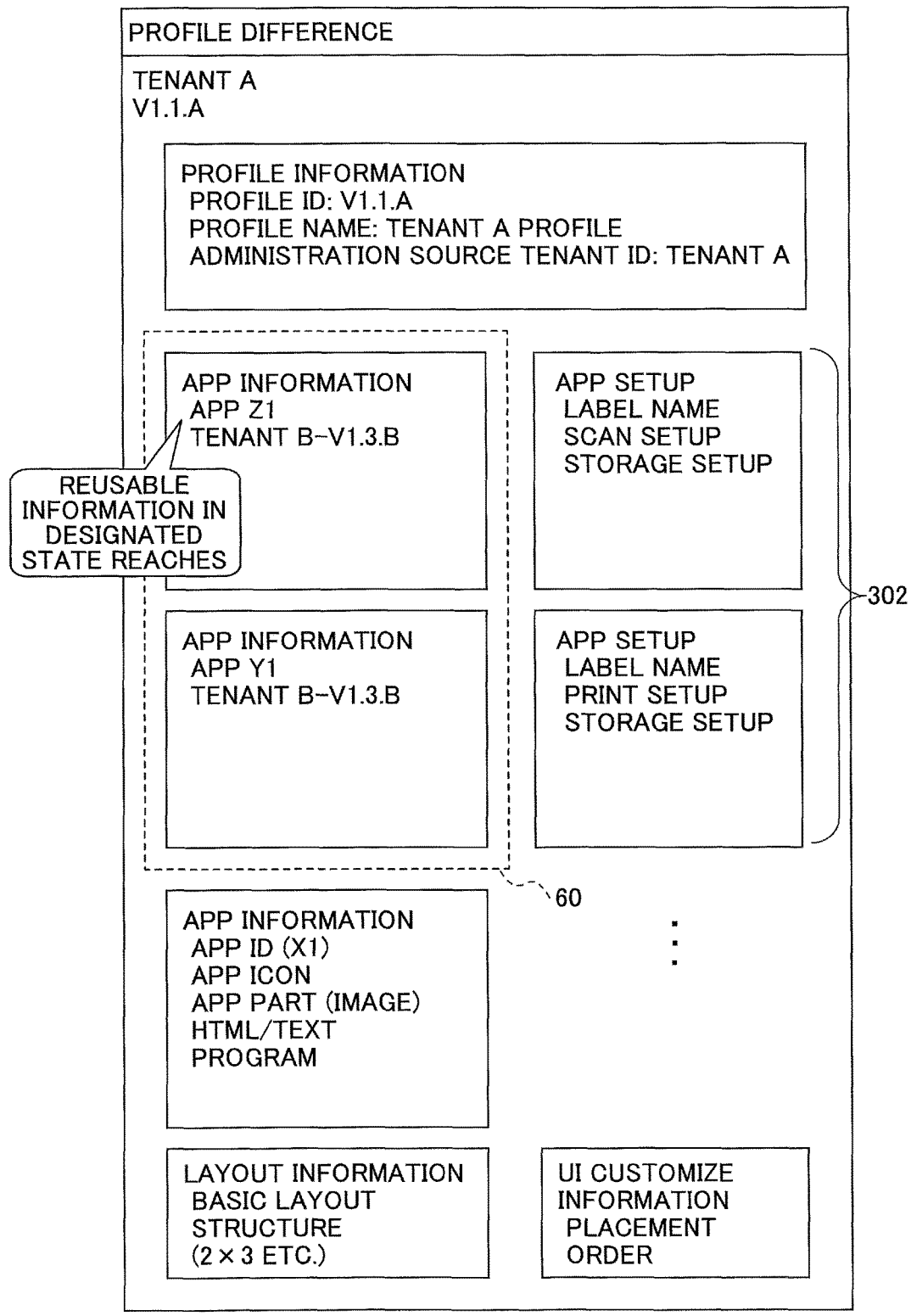

FIG. 18A to FIG. 18D are an example illustrating the production of the difference profile. FIG. 18A illustrates the profile 9 (V1.3.B) administered by the tenant B. FIG. 18B illustrates the profile 9 (V1.1.A) administered by the tenant A. FIG. 18C illustrates the profile 9 (V1.3.B) cached by the multifunction peripheral 10. FIG. 18D illustrates the difference profile.

When the profile difference determining unit 58 compares the profile 9 (V1.3.B) with the profile 9 (V1.1.A), it is known that app information whose app ID is "Z1" overlaps (is the same as) app information whose app ID is "Y1". The app information illustrated in FIGS. 18A to 18D has further detailed information in comparison with the app information illustrated in FIG. 7B. Said differently, the app information includes not only an app part (an image) but also a resource such as an app icon, HTML/TEXT, and a program.

The profile difference determining unit 58 produces a difference profile, in which the app information 71 whose app ID is "Z1" and the app information 71 whose app ID is "Y1" are not included. Although the app information 71 whose app ID is "Z1" and the app information 71 whose app ID is "Y1" become unnecessary, a registration of the app information 71 is recorded into the difference profile. Therefore, in the difference profile, the overlapping app information 71 becomes reference information 60 indicative of profile Information of reference destination. Here, the app information 71 of the apps Z1 and Y1 becomes the reference information 60 referring to the apps Z1 and Y1 of "tenant B-V1.3.B".

An app setup 303 may differ depending on the profile 9. Therefore, the app setup 303 is not omitted in the difference profile. However, on the premise that the user conducts the app setup, the app setup may be omitted.

When the profile 9 (V1.1.A) of the user is combined, the profile processing unit 15 replaces reference information 60 of the difference profile with app information 73 of the profile 9 (V1.3.B). Thus, the profile 9 (V1.1.A) can be obtained by combining the difference profile and the profile 9 (V1.3.B).

Figure 19:
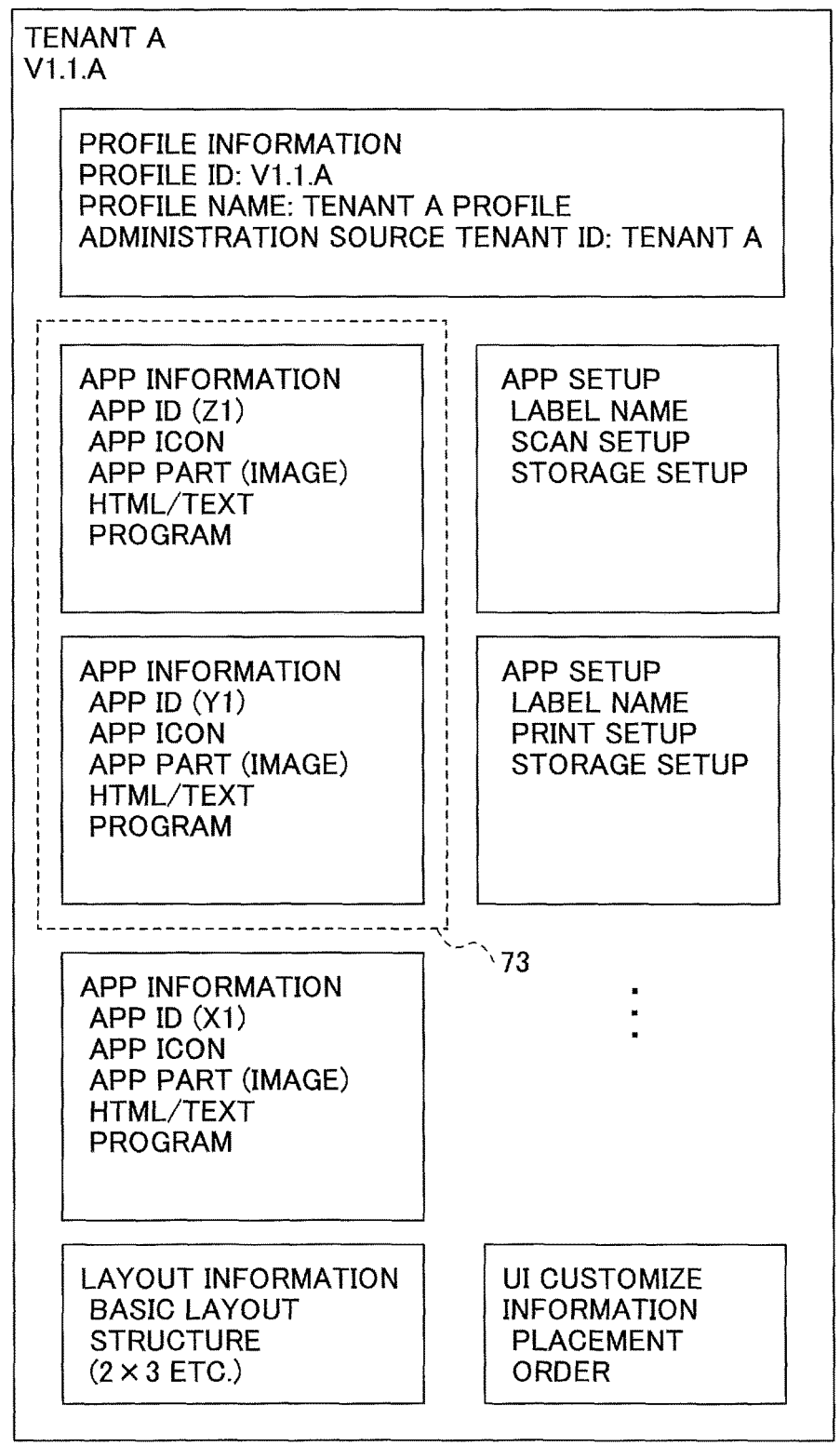
FIG. 19 illustrates an example of a combined profile (V1.1.A).

FIG. 19 illustrates the combined profile 9 (V1.1.A). Thus, the reference information 60 illustrated in FIG. 18D is replaced by the app information 73 illustrated in FIG. 18C. Therefore, it is known that the combined profile 9 (V1.1.A) illustrated in FIG. 19 is the same as the profile 9 (V1.1.A) administered by the tenant A illustrated in FIG. 18B.

As such, in the difference profile, the overlapping app information 71 is replaced by the reference information 60. Therefore, the communication time between the cloud server 50 and the multifunction peripheral 10 can be shortened. Although the communication time for the app information is apt to be long because the app information has a great size due to an inclusion of the image and the program, the difference profile can omit sending of the app information so as to shorten a waiting time for the user. Accordingly, the performance can be improved.

[[Profile 9 Cached after Logout]]

In a case where the multifunction peripheral 10 caches the combined profile 9 (V1.1.A) and also the profile 9 (V1.3.B), the multifunction peripheral 10 deletes the profile 9 (V1.1.A) upon the logout of the user and caches the profile 9 (V1.3.B).

Figure 20:
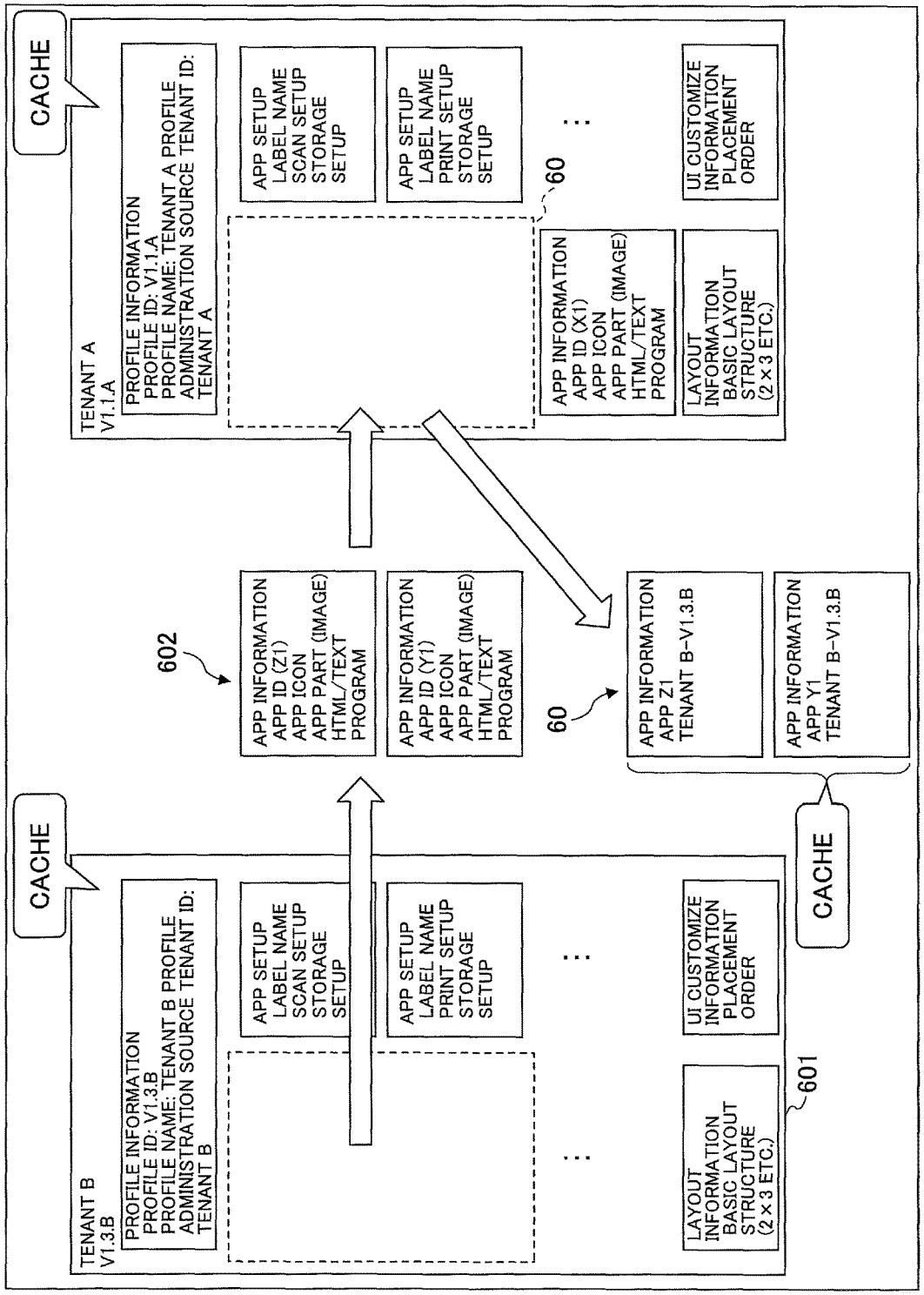
FIG. 20 illustrates an example of explaining a profile after the logout.

On the contrary, in a case where a capacity is saved at a time of caching two profiles 9, the process is as follows. FIG. 20 illustrates an example of explaining the profile after the logout. Firstly, when the profile processing unit 15 combines the cached profile and the difference profile, the profile processing unit 15 caches the profile 9 (601 in FIG. 20, an example of a part information of claims) other than the app information 602 designated by the reference information 60.

The app information 602 referred by the reference information 60 is combined with the difference profile as described above. At this time, the profile processing unit 15 takes out the reference information 60 out of the difference profile and caches the reference information. Thus, without redundantly caching the app information designated by the reference information 60, the profile 9 (V1.3.B) can be restored.

After the user logs out, the app information 602 acquired from the profile 9 (V1.3.B) from among the profile 9 (V1.1.A) can be known using the cached reference information 60. Therefore, the app information 602 is taken out of the profile 9 (V1.1.A) and combined with the cached profile 9 (601). With this, the profile 9 (V1.3.B) cached in the multifunction peripheral 10 can be restored. Therefore, it is not necessary that the multifunction peripheral 10 acquires the profile 9 (V1.3.B) again from the cloud server 50.

Figure 21A:
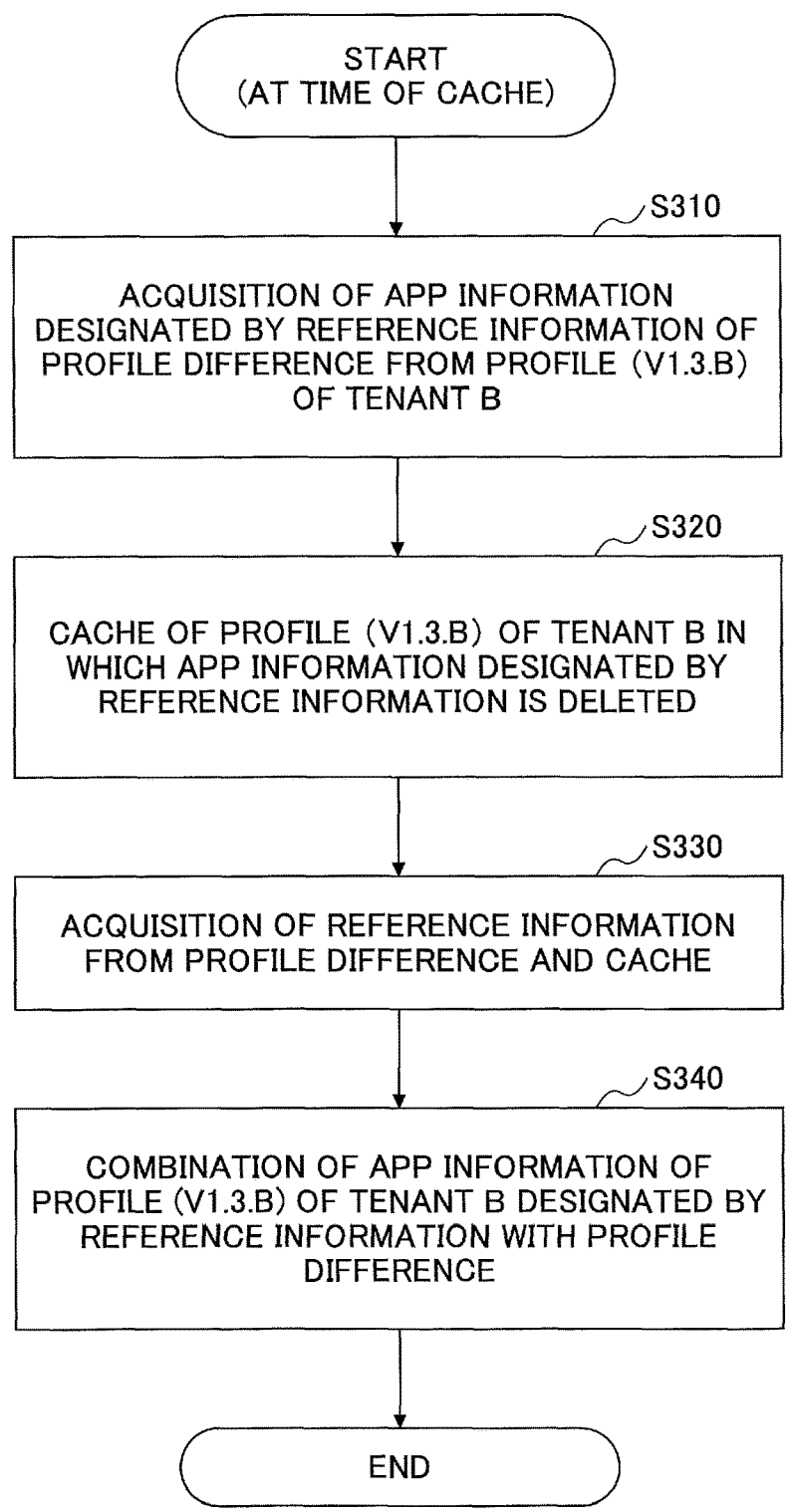
FIGS. 21A and 21B are examples of a flowchart illustrating a procedure that a profile processing unit processes a profile.
Figure 21B:
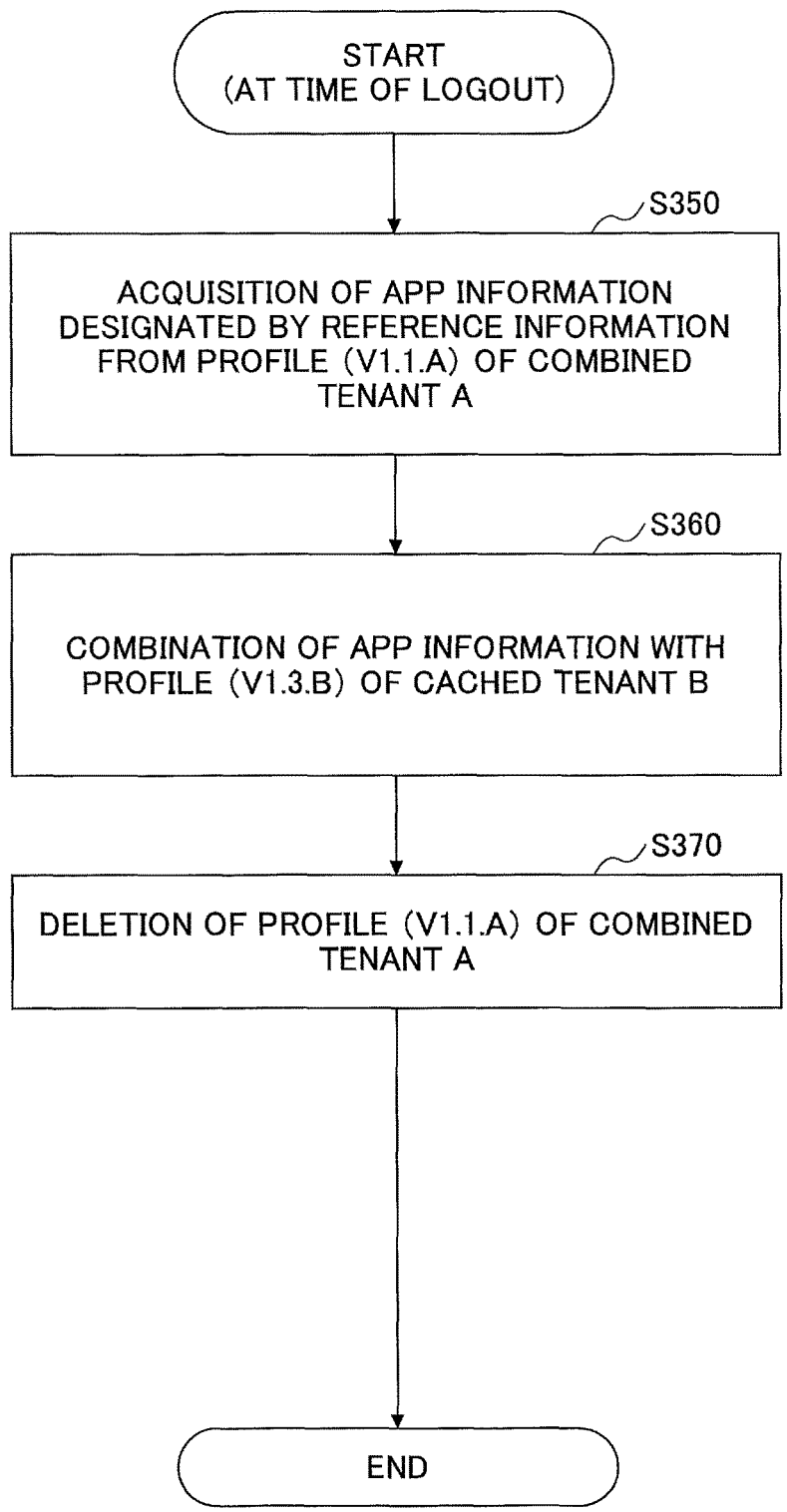

FIG. 21A is an example of a flowchart illustrating a procedure that a profile processing unit 15 processes the profile 9. FIG. 21B is an example of another flowchart illustrating a procedure that the profile processing unit 15 restores the profile 9.

The profile processing unit 15 acquires the app information 602 of the tenant B designated by the reference information 60 of the difference profile from the profile 9 (V1.3.B) of the tenant B (step S310).

Next, the profile processing unit 15 caches the profile 9 (V1.3.B) of the tenant B, from which the app information 602 designated by the reference information 60 is deleted (step S320).

Next, the profile processing unit 15 acquires the reference information 60 from the difference profile and caches the acquired reference information 60 (step S330).

Next, the profile processing unit 15 combines the app information 602 of the profile 9 (V1.3.B) of the tenant B designated by the reference information 60 with the difference profile (step S340). With this, the profile 9 (V1.1.A) of the tenant A is combined.

After the user logs out, the profile processing unit 15 acquires the app information 602 designated by the reference information 60 from the profile 9 (V1.1.A) of the combined tenant A (step S350).

Next, the profile processing unit 15 combines the profile 9 (V1.3.B) of the cached tenant B with the app information 602 (step S360).

Next, the profile processing unit 15 deletes the profile 9 (V1.1.A) of the combined tenant A (step S370). With this, the capacity of the memory device of the multifunction peripheral 10 can be reduced.

As described, because the profile 9 (V1.3.B) of the tenant B is restored, it is possible to reduce a waiting time for the user of the tenant B of using the multifunction peripheral 10. Further, because the profile 9 (V1.1.A) of the tenant A is deleted, the capacity of the memory device is hardly compressed.

[[Another Example of Caching Profile]]

After the user logs out, the profile processing unit 15 may cache profiles of multiple other tenants as long as the multifunction peripheral 10 can hold the profile 9 (V1.1.A) without deleting the profile 9 (V1.1.A) of the tenant A. In this case, after the number of the cached profiles reaches a predetermined number, the oldest profile is deleted. Then, the profile referred to by the multifunction peripheral 10 increases to further improve the performance. In order to shorten the communication time for the profile, the profile processing unit 15 sends the profile ID of the profile. In a case where the profile ID determined to be sent to the multifunction peripheral 10 is cached, it is sufficient that the profile ID is sent to the multifunction peripheral 10. Therefore, the waiting time for the user can be shortened.

Using a structure similar thereto, the profile processing unit 15 may administer the profile based on the expiry date. In this case, the profile having an elapsed expire date is earlier delete. Further, the profiles of a predetermined number or more are deleted so that the profile having the oldest data is earlier deleted.

The profile processing unit 15 can cache all the profiles, in which the designated tenant ID is the administration source tenant ID, within the tenant open range of the tenant information of the tenant, in which the multifunction peripheral 10 is registered. Because the profile, in which the tenant ID designated by the tenant open range is the administration source tenant ID, is highly probably used, the profile can be effectively cached.

In this case, it is preferable that the cloud server 50 detects a change of the setup value of the tenant open range and reports to change to the multifunction peripheral 10. The profile processing unit 15 of the multifunction peripheral 10 can delete the profile, in which the tenant ID no more designated in the tenant open range is the administration source tenant ID. Therefore, it is always possible to cache the profile being highly probably used.

In a case where a priority is set to the tenant of the tenant open range, the cloud server 50 can send the priority to the multifunction peripheral 10 together with the profile. The multifunction peripheral 10 caches the profile in a range permitted by the capacity of the memory device in an order having a higher priority. Even if there is a limit to the profile to be cached, it is possible to cache from the profile having a higher probability to use.

In this case, if the priority of the tenant ID is changed, it is preferable that the cloud server 50 reports the change of the priority of the tenant ID. With this, the profile processing unit 15 of the multifunction peripheral 10 can appropriately change the profile cached in response to the priority.

Fourth Embodiment

Within the first to third embodiments, there is provided the information processing system 100, in which the profile used by oneself can be used by the multifunction peripheral 10 inside the tenant. Even in a case where the tenant, in which the multifunction peripheral 10 is registered, is different from the tenant, in which the user is registered, the user can use the profile always used by the user after the user logs into from the multifunction peripheral 10.

However, in a case where the user selects the application requiring an individual authentication (a login) by pushing and logs into the multifunction peripheral 10 of a tenant different from the tenant, in which the user is registered, there is an inconvenience that the screen returns to the app home screen 501 even though the application has already been selected, and the user should push (step Select) the app to be used again.

Figure 22A:
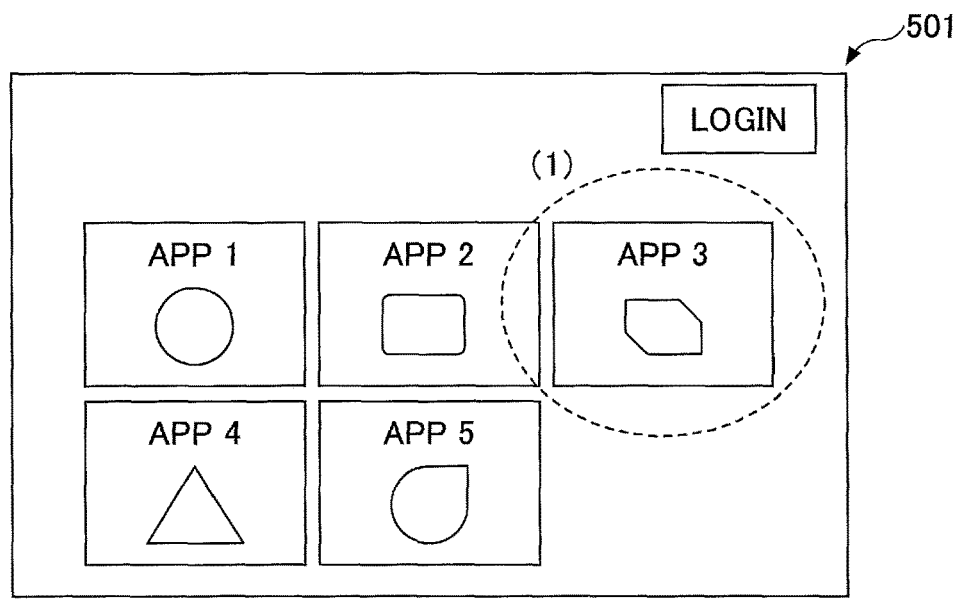
FIGS. 22A to 22C illustrate an example of explaining a screen transition at a time of login.
Figure 22B:
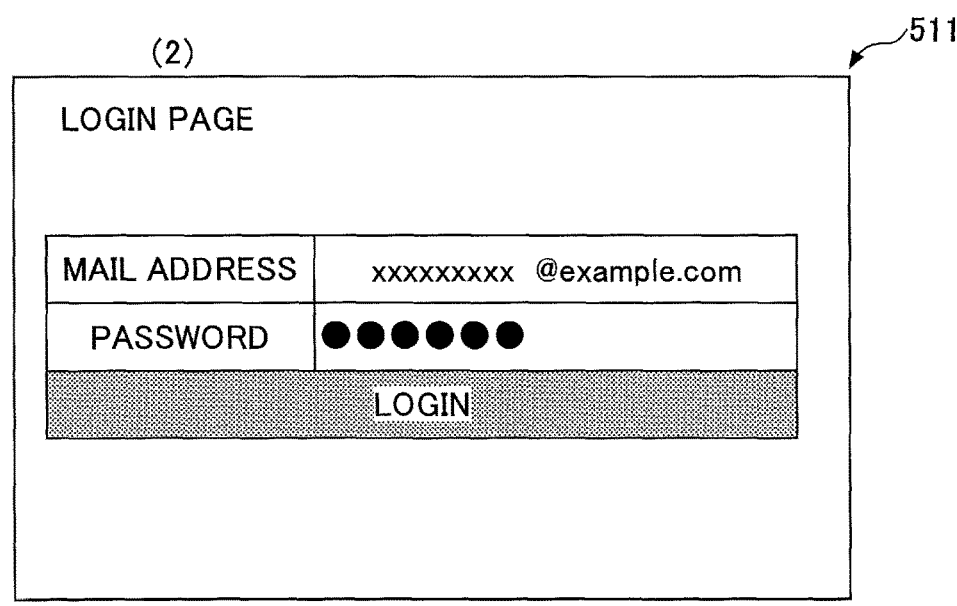
Figure 22C:
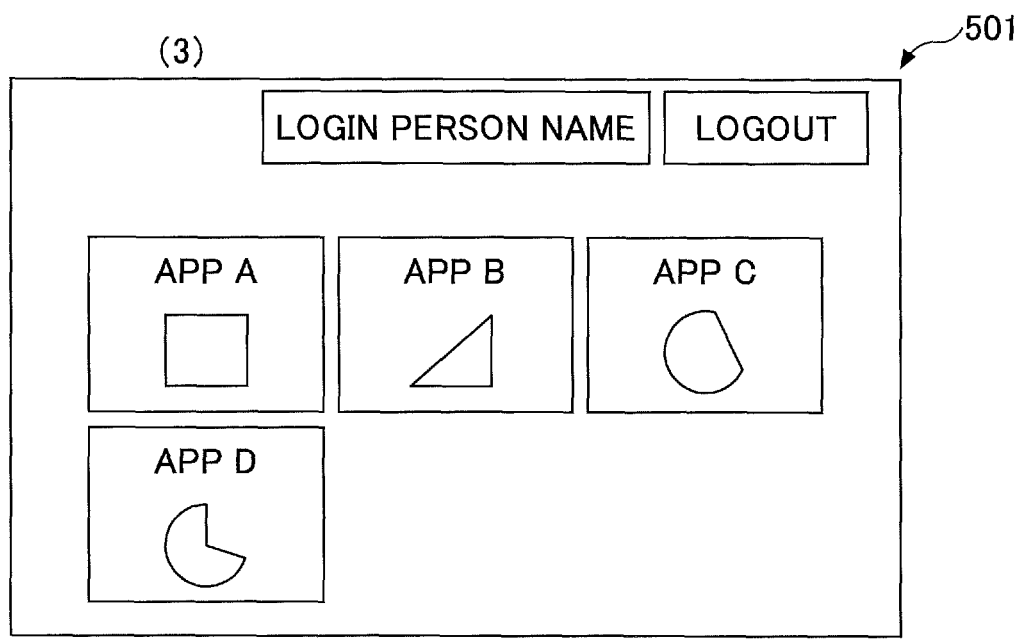

Description is given by referring to FIGS. 22A to 22C. FIGS. 22A to 22C are an example of explaining a screen transition at the time of the login.

(1) An app 3 is pushed by the user on the app home screen 501 (FIG. 22A)

(2) Because the app 3 is an app requiring a login by the user, the multifunction peripheral 10 displays the login screen 511 (FIG. 22B).

The app requiring the login is an app requiring information (the name or the mail address) of the user who logs into or an app using a setup of an individual.

(3) If the login is successful, the profile of the tenant, in which the user is registered, is acquired. However, the type of the app provided by the tenant may probably differ. Therefore, the multifunction peripheral 10 displays the app home screen 501 again based on the acquired profile.

Because of the above screen transition, the user is required to push the app 2 (FIG. 22C illustrates app A, app B, app C, and app D, one of which is the same as app 3) again. Therefore, there is an inconvenience that the operation becomes cumbersome.

Function

Figure 23:
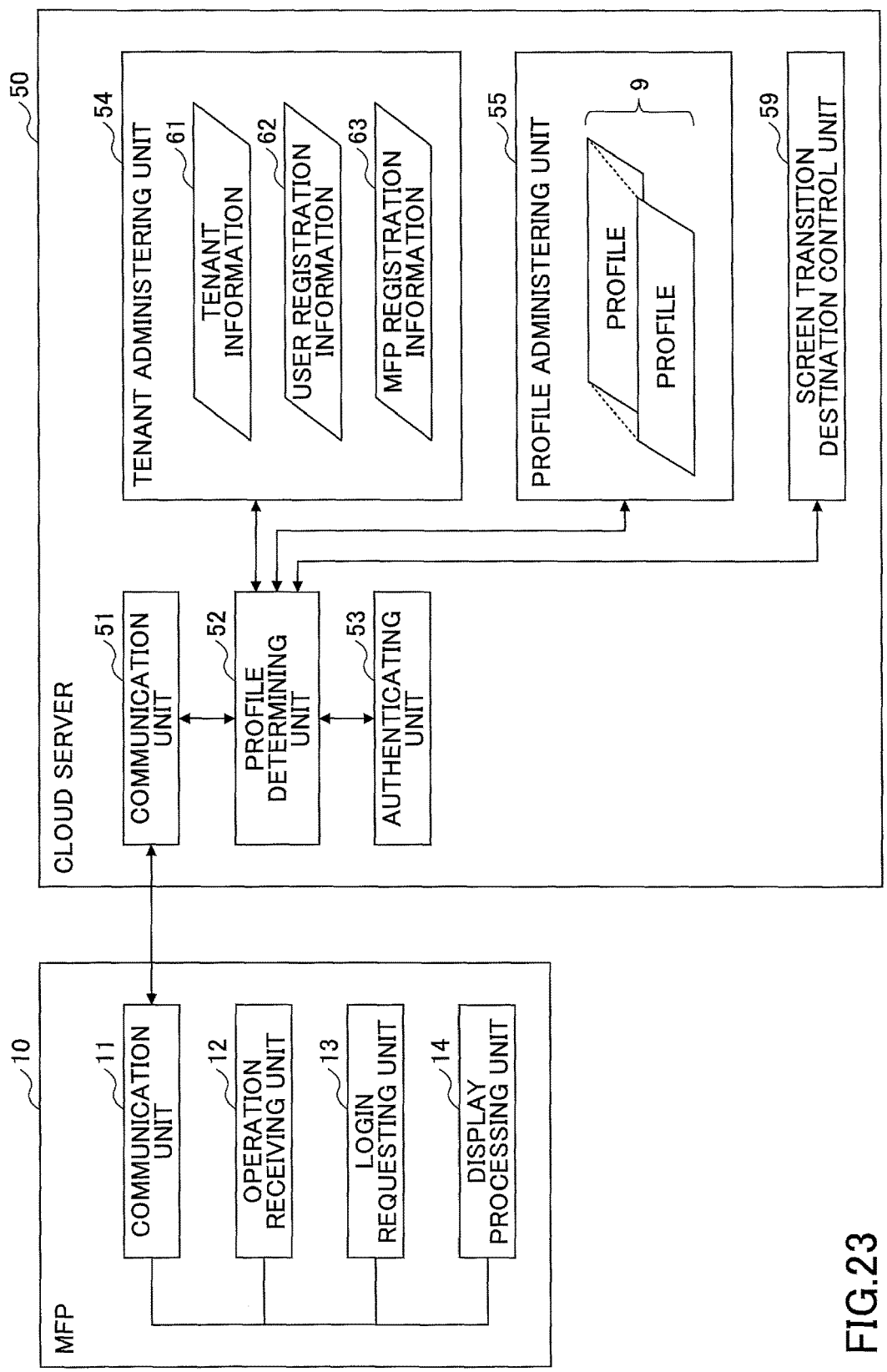
FIG. 23 is an example of a functional block diagram for explaining the function of the information processing system (Fourth Embodiment).

FIG. 23 is an example of a functional block diagram for explaining the function of the information processing system 100. Referring to FIG. 23, the structural elements having the same reference symbols as FIG. 7A perform similar functions. Therefore, only major structural elements of the fourth embodiment may be described.

[[Multifunction Peripheral 10]]

The multifunction peripheral 10 includes a screen transition destination control unit 59 in comparison with FIG. 7A. The screen transition destination control unit 59 is implemented by the CPU 401 illustrated in FIG. 6 executing the program 408p or the like to control a screen displayed after the user logs into the multifunction peripheral 10.

Example of Screen Transition

Figure 24:
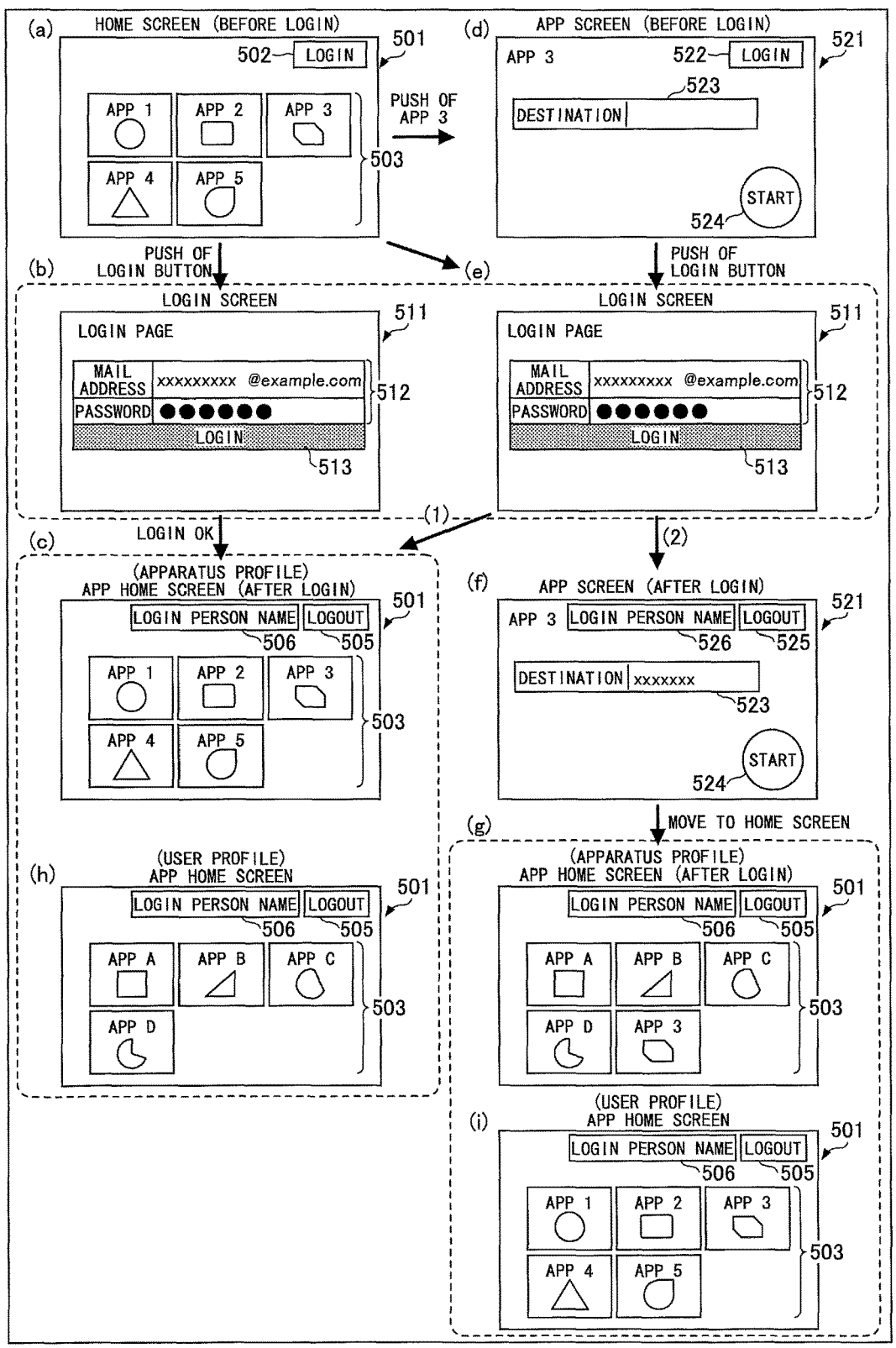
FIG. 24 illustrates an example of a screen transition displayed by the MFP.

FIG. 24 illustrates an example of a screen transition displayed by the multifunction peripheral 10 of the fourth embodiment. Referring to FIG. 24, (a) illustrates an example of the app home screen 501. In one case, the user selects one of several apps, and in another case, the user pushes down the login button 502. Further, in the one case where the user selects one of several apps, the login may be required or may not be required depending on the selected one of the several apps.

When the login button 502 is pushed by the user, the login screen 511 in (b) of FIG. 24 is displayed. The login screen 511 is provided to input a mail address and a password at a time when the user logs into the multifunction peripheral 10 (or the information processing system 100).

In a case where the user selects the app and the app requires the login, the login screen illustrated in (e) of FIG. 24 is displayed. The login screen 511 (a first screen) illustrated in (e) of FIG. 24 and the login screen 511 (the first screen) illustrated in (b) of FIG. 24 are the same.

In a case where the user selects the app (the app 3 is selected as an example) on the app home screen 501 and the app does not require the login, the app screen 521 before the login illustrated in (d) of FIG. 24 is displayed. The app screen 521 includes a destination column 523, a login button 522, and a start button 524. The app 3 is an app of a service of "Scan To Cloud Storage" or "Print From Cloud Storage". The "Scan To Cloud Storage" is the service (an app) of uploading an image read by the multifunction peripheral 10 is uploaded to an individual storage. The "Print From Cloud Storage" is the service (the app) of downloading a file from an individual storage in the cloud and printing in the multifunction peripheral 10. In the "Scan To Cloud Storage", the user inputs an upload destination storage (folder) in the user destination column 523 and pushes down the start button 524.

When the user pushed the login button on the app screen 521 before the login illustrated in (d) of FIG. 24, the login screen 511 illustrated in (e) of FIG. 24 is displayed. In a case where the user selects the app (the app 3 is selected as the example) on the app home screen 501 and the app 3 is used upon the login, the login screen 511 before the login illustrated in (e) of FIG. 24 is displayed.

When the login is permitted on the login screen 511 illustrated in (b) of FIG. 24, the app home screen 501 after the login illustrated in (h) or (c) is displayed. In a case where the profile associated with the multifunction peripheral 10b differs from the profile associated with the user, the app home screen based on the profile associated with the user is used. Therefore, the app home screen 501 ((h) of FIG. 24) different from that before the login is displayed. In a case where the profile associated with the multifunction peripheral 10b is the same as the profile associated with the user, the app home screen 501 before the login illustrated in (c) of FIG. 24 is displayed without a change because the profile as the source of the app home screen does not change.

In (c) and (h) of FIG. 24 after the login, a login person name 506 and a logout button 505 are displayed unlike (a) of FIG. 24. Because the app home screen 501 illustrated in (h) of FIG. 24 is based on the profile of the tenant, in which the user is registered, the app home screen 501 illustrated in (h) differs from that illustrated in (a) of FIG. 24. Because the app home screen 501 illustrated in (c) of FIG. 24 is based on the profile of the tenant, in which the multifunction peripheral 10b is registered, the app home screen 501 illustrated in (c) is the same as that illustrated in (a) of FIG. 24. Further, because the login button is pushed in (a) of FIG. 24, the user does not select the app. Therefore, it is appropriate that the app home screen 501 is displayed again like (c) and (h) of FIG. 24.

In a case where the login is permitted on the login screen 511 of (e) of FIG. 24, two screen transitions occur in response to the following conditions: (1) No same app is present in the tenant of the login destination: (c) and (h) of FIG. 24; and (2) A same app is present in the tenant of the login destination: (f) of FIG. 24.

In case of (1), because no same app is present in the tenant of the login destination, the app home screen 501 is displayed. Is which of (c) and (h) displayed is as described above.

In case of (2), because the same app is present in the tenant of the login destination, the app screen 521 is displayed. The app screen 521 after the login is illustrated in (f) of FIG. 24. In FIG. 24, because (f) is after the login, the login person name 526 and the logout button 525 are displayed unlike (d) of FIG. 24. Because the user selects an app on the app home screen 501, the app needs not to be selected again after the app screen 521 illustrated in (f) of FIG. 24 is displayed.

Further, when the user causes the app home screen 501 to display on the app home screen 501 after the login illustrated in (f) of FIG. 24 (for example, a return button on the operation panel 411 is pushed), the app home screen 501 after the login illustrated in (g) and (i) of FIG. 24 is displayed. In a case where the profile associated with the multifunction peripheral 10b differs from the profile associated with the user, the app home screen based on the profile associated with the user is used. Therefore, the app home screen 501 ((g) of FIG. 24) different from that before the login is displayed. In a case where the profile associated with the multifunction peripheral 10b is the same as the profile associated with the user, the app home screen 501 before the login illustrated in (i) of FIG. 24 is displayed without a change because the profile as the source of the app home screen does not change.

Because the app home screen 501 illustrated in (g) of FIG. 24 is based on the profile of the tenant, in which the user is registered. Because the app home screen 501 illustrated in (i) of FIG. 24 is based on the profile of the tenant, in which the multifunction peripheral 10b is registered, the app home screen 501 illustrated in (i) is the same as that illustrated in (a) of FIG. 24.

As such, the information processing system 100 can change the screen transition according to the login, in which the user pushes down the login button 502 on the app home screen 501 illustrated in (a) of FIG. 24, or the login after selecting the app. Specifically, in a case where the condition of is satisfied, the app screen 521 after the login illustrated in (f) of FIG. 24 is displayed. Therefore, when the user selects the app, it is possible to display the app home screen 501 after the login without returning to the app home screen 501 for the user.

Operation Procedure

[[In a Case where the User of the Tenant A Pushes Down an App Held by the Tenant, in which the Multifunction Peripheral 10 is Registered, to Log in the Tenant A, and the Same App is not Present in the Tenant A]]

Figure 25:
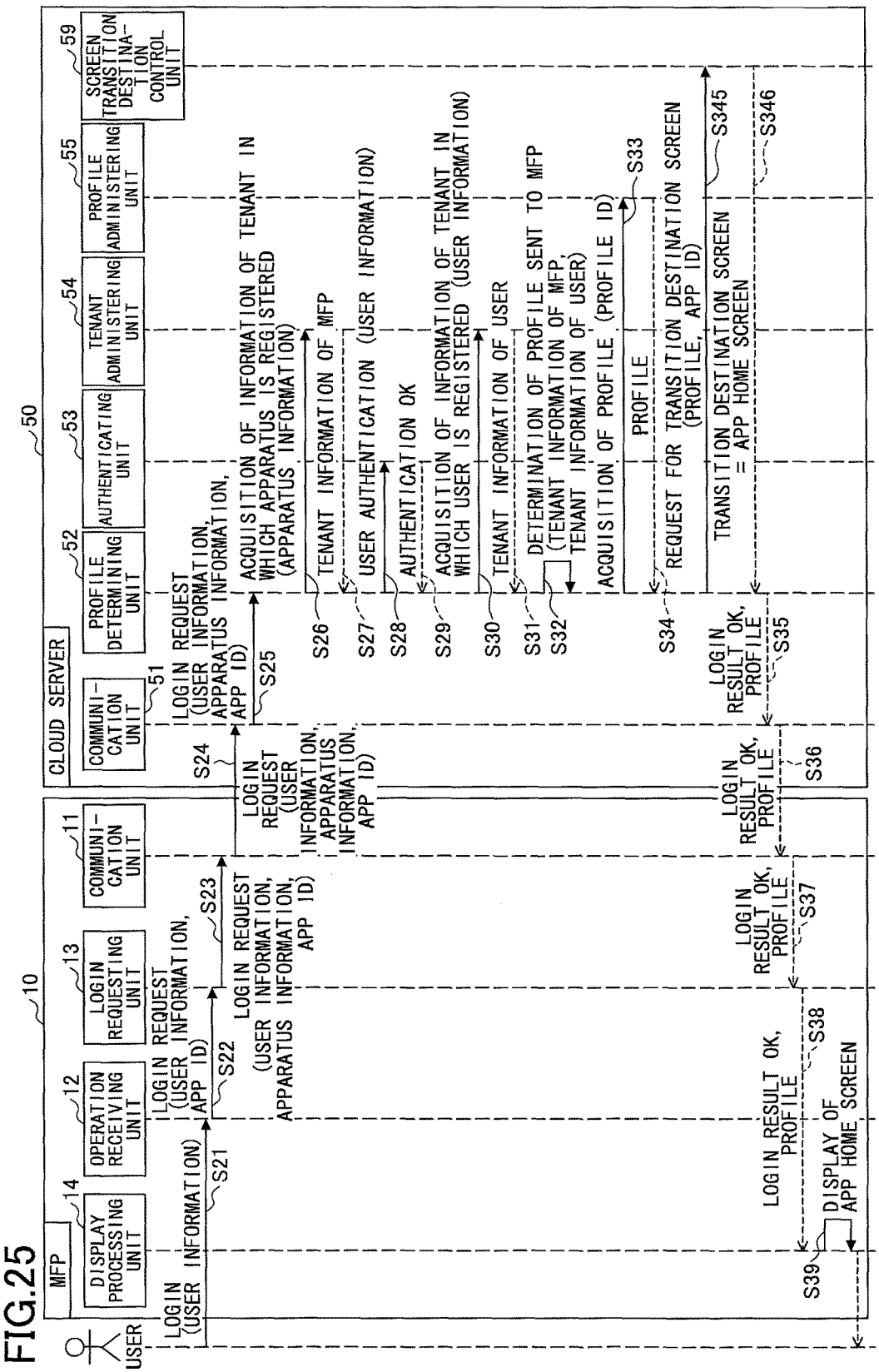
FIG. 25 is an example of the sequence diagram illustrating the login to the cloud server using the MFP of the tenant, in which the oneself is not registered, and the profile of oneself is used in the MFP (there is no same app).

FIG. 25 is an example of a sequence diagram illustrating a login to the cloud server 50 using the multifunction peripheral 10 of the tenant, in which the user is not registered, and the profile 9 of oneself is used in the multifunction peripheral 10. Referring to FIG. 25, a difference from FIG. 8 is mainly described. Here, for convenience of explanation, the multifunction peripheral 10 is registered in the tenant B and the user is registered in the tenant A. Because processes of step S1 to S14 are the same as the processes in FIG. 25, the corresponding processes are omitted from FIG. 25.

The user conducts operations of inputting the user ID and the password to log in using the login screen 511 (step S21). At this time, there are a case where the user logs into from the screen of the app and a case where the user logs into from the app home screen 501.

The multifunction peripheral 10 sends the user information, the apparatus information, and the app ID to the cloud server 50 (step S22 to S24). The app ID is app identification information for specifying the app as described above. This app ID indicates that to which app the app screen 521 before the login screen 511 belongs. As illustrated in (a) of FIG. 24, in a case where the login screen 511 is displayed in the app home screen 501, the app ID indicates NULL (no app) or the app home screen 501. In the explanation of FIG. 25, the app ID of any app may be included.

Subsequent processes of steps S25 to S34 may be similar to those in FIG. 8. When the user logs in, the cloud server 50 determines the profile based on the tenant, in which the multifunction peripheral 10 is registered, and the tenant, in which the user is registered.

The profile determining unit 52 requests to send a transition destination screen to the screen transition destination control unit 59 (S345). This request includes a profile and an app ID. This app ID is the app ID of step S25.

The screen transition destination control unit 59 determines the transition destination screen in the process illustrated in FIG. 27 described below, and sends out the transition destination screen to the profile determining unit 52 (step S346). Referring to FIG. 25, because the app held by the tenant B is not held by the tenant A, the transition destination screen is the app home screen 501 ((c) and (h) of FIG. 24).

Steps S35 to S38 are similar to FIG. 8. The profile of the tenant A, in which the login result and the user are registered, is sent to the multifunction peripheral 10.

The display processing unit 14 of the multifunction peripheral 10 displays the app home screen 501 using the profile (step S39). Because the user operates the app screen 521 to be displayed at the login, the user selects the app again.

[[In a Case where the User of the Tenant A Pushes Down the App Held by the Tenant, in which the Multifunction Peripheral 10 is Registered, to Log in the Tenant A, and the Same App is Present in the Tenant A]]

Figure 26:
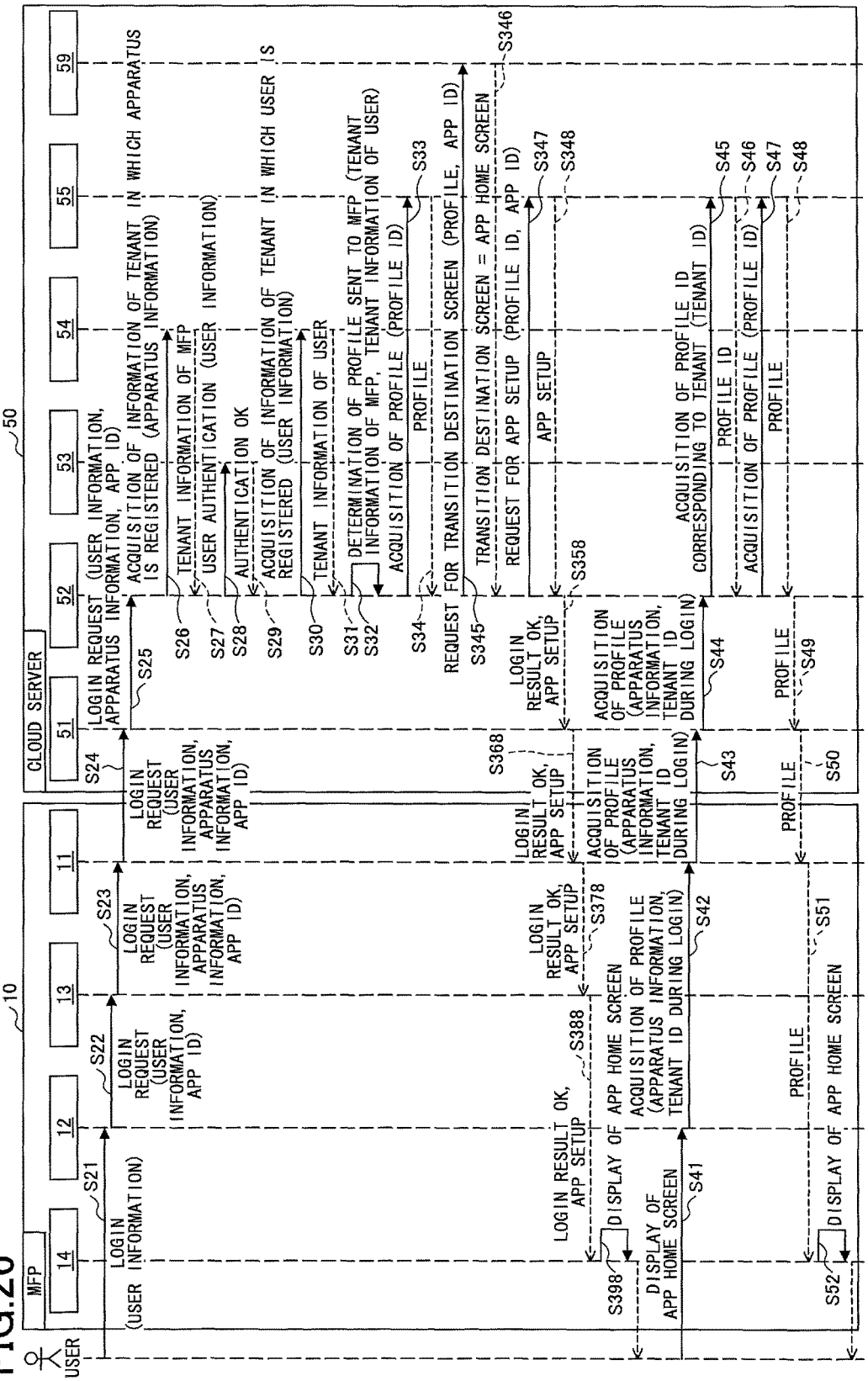
FIG. 26 is an example of the sequence diagram illustrating the login to the cloud server using the MFP of the tenant, in which the oneself is not registered, and the profile of oneself is used in the MFP (there is same app).

FIG. 26 is an example of a sequence diagram illustrating a login to the cloud server 50 using the multifunction peripheral 10 of the tenant, in which oneself is not registered, and the profile 9 of oneself is used in the multifunction peripheral 10. Referring to FIG. 26, a difference from FIG. 25 is mainly described.

The screen transition destination control unit 59 determines the transition destination screen in the process illustrated in FIG. 27 described below, and sends out the transition destination screen to the profile determining unit 52 (step S346). Referring to FIG. 26, because the tenant A holds the app held by the tenant B, the transition destination screen is the app screen 521.

Because the transition destination screen is the app screen 521, the profile determining unit 52 designates the profile ID and the app ID from the profile administering unit 55 and acquires the app setup (step S347). This is because the multifunction peripheral 10 does not display the app home screen 501 and therefore the profile is not yet necessary. Further, it is sufficient that the cloud server 50 sends an app setup of an app selected by the user to the multifunction peripheral 10. Therefore, the transmission time can be decreased.

In a manner similar to FIG. 25, the login result and the app setup are sent to the multifunction peripheral 10 (S358, S368, S378, and S388).

The display processing unit 14 of the multifunction peripheral 10 displays the app screen 521 ((f) of FIG. 24) of the app selected by the user before the login using the app setup (step S398).

Next, the user displays the app home screen 501.

The user conducts an operation of displaying the app home screen 501 on the multifunction peripheral 10 (step S1). The user conducts an operation of displaying the app home screen 501 on the multifunction peripheral 10 (step S1).

When the operation receiving unit 12 receives this operation, the operation receiving unit 12 requests the communication unit 11 to acquire the profile 9 (step S42).

The communication unit 11 of the multifunction peripheral 10 sends the acquisition request to acquire the profile 9 to the cloud server 50 (step S3). The acquisition request includes the apparatus information of the multifunction peripheral 10 and the tenant ID during the login.

When the communication unit 51 of the cloud server 50 receives the acquisition request to acquire the profile 9, the communication unit 51 sends out the acquisition request to acquire the profile 9 to the profile determining unit 52 (step S44).

The profile determining unit 52 designates the tenant ID and requests the profile administering unit 55 to send the profile ID corresponding to the tenant ID.

The profile administering unit 55 sends out the profile ID of the profile designated by the tenant ID to the profile determining unit 52 (step S46).

The profile determining unit 52 sends the profile 9 specified by the profile ID to the profile administering unit 55 (step S47).

The profile administering unit 55 sends out the profile to the profile determining unit 52 (Step S48).

The profile determining unit 52 sends out the acquired profile 9 to the communication unit 51 (step S49).

The communication unit 51 of the cloud server 50 receives the profile 9 and sends the profile 9 to the multifunction peripheral 10 (step S50).

The communication unit 11 of the multifunction peripheral 10 receives the profile 9 and sends out the profile 9 to the display processing unit 14 (step S51).

The display processing unit 14 displays an app home screen 501 ((g) and (i) of FIG. 24) based on the profile 9 on the operation panel (step S52).

The display processing unit 14 may start to acquire the profile 9 after the step S39 without an operation by the user after the step S39 and may cache the acquired profile 9 before the user operates to display the app home screen 501 in the multifunction peripheral 10. The multifunction peripheral 10 acquires the profile from the information processing apparatus during a display of the app screen 521 and caches the acquired profile. In this case, when the user operates to display the app home screen 501, the app home screen 501 can be displayed using the cache so as to decrease a time for displaying the app home screen 501.

[[Determination of Profile]]

FIG. 27 is an example of a flow chart for explaining a procedure that the screen transition destination control unit 59 determines the transition destination screen.

The screen transition destination control unit 59 refers to the app ID to determine whether the user displays the login screen 511 or the app screen 521 is transited to the login screen 511 (step S410). Said differently, in FIG. 24, it is determined whether (a) is transited to (d) or (e). Information whether the login is necessary to use the app information is set in the app information. The screen transition destination control unit 59 specifies the app information 302 using the app ID and determines whether the login is necessary. In a case where the login is necessary, step S410 is determined to be YES.

In a case where step S410 is determined to be NO, the app home screen 501 has been transited to the login screen 511 by the user. Therefore, the screen transition destination control unit 59 determines the transition destination screen after the login to be app home screen 501 illustrated in (c) or (h) of FIG. 24 (step S450).

In a case where step S410 is determined to be YES, the app screen 521 has been transited to the login screen 511 by the user. Therefore, the screen transition destination control unit 59 checks the app included in the profile of the tenant, in which the user is registered (step S420).

The screen transition destination control unit 59 determines whether the app of the app ID sent from the multifunction peripheral 10 is included in the profile of the tenant, in which the user is registered (whether the profile of the tenant, in which the user is registered, has the same app ID) (step S430).

In a case where the determination of step S30 is YES, the multifunction peripheral 10 can display the app screen 521 of the app selected by the user. Therefore, the screen transition destination control unit 59 determines the transition destination screen after the login to be the app screen 521 illustrated in (f) of FIG. 24 (step S440).

In a case where the determination of step S30 is NO, the multifunction peripheral 10 cannot display the app screen 521 of an app the same as the app selected by the user. Therefore, the screen transition destination control unit 59 determines the transition destination screen after the login to be the app home screen 501 illustrated in (c) and (h) of FIG. 24 (step S450).

As described above, in a case where the user selects the app requiring the login in the information processing system, the app home screen 501 is not displayed. Therefore, without pushing (selecting) the app to be used again, the user can use the app.

General Overview

As described above, the information processing system 100 of the fourth embodiment can operate the multifunction peripheral using the profile, which is ordinarily used by the user, even if the multifunction peripheral 10, in which the user is not registered is used. Further, in this case, it is possible to limit the app that the user uses. Further, because the cloud server 50 sends the difference profile, a drop of the performance caused by the transmission can be prevented so as to prevent the performance from lowering.

Other Embodiments

For example, the cloud server 50 has been described to be present in the Internet, the cloud server 50 may be connected to the LAN, with which the multifunction peripheral 10 is connected.

Further, major functions are classified in the structural examples illustrated in FIGS. 7A, 12, and 16 to facilitate understanding if the processes of the multifunction peripheral 10 and the cloud server 50. The present invention is not limited by a way of classifying into a processing unit and/or the name of the processing unit. The processes of the multifunction peripheral 10 and the cloud server 50 can be further classified into more processing units. Further, the one processing unit can be classified so as to include further more processes.

The operation receiving unit 12 is an example of a receiving unit. The communication unit 11 is an example of a first communication unit.

The communication unit 51 is an example of a second communication unit. The profile determining unit 52 is an example of a setup information determining unit. The app determining unit 56 is an example of a function determining unit. The profile difference determining unit 58 is an example of a difference information producing unit. The profile processing unit 15 is an example of a setup information administering unit. The screen transition destination control unit 59 is an example of a transition destination screen control unit. The display processing unit 14 is an example of a display processing unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (step Such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus.

Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or and inferiority of the invention. Although the information processing system has been described in detail, it should be understood that various changes, substitutions, and alterations could be made thereto without departing from the spirit and scope of the invention.

This application is based upon and claims the benefit of priority of the prior Japanese Patent Application No. 2016-205228, filed on Oct. 19, 2016, and the Japanese Patent Application No. 2017-091432, filed on May 1, 2017, the entire contents of which are incorporated herein by reference.

What is claimed is:

1. An information processing system in which setup information related to a setup of an apparatus is sent to the apparatus, the information processing system comprising:
   the apparatus, the apparatus including
      a first processor, and
      a first memory storing first program instructions that cause the first processor to:
         receive user information of a user of the apparatus, the user information including user identification information that specifies the user, and
         send the received user information and apparatus information to an information processing apparatus, the apparatus information including apparatus identification information that specifies the apparatus; and
   the information processing apparatus, the information processing apparatus including
      a second processor, and
      a second memory storing second program instructions that cause the second processor to:
         receive the user information and the apparatus information, and
         determine the setup information of the apparatus to be sent to the apparatus used by the user, based on the received apparatus information and the user information, and
      send the determined setup information to the apparatus, wherein
      the second memory further stores
         the apparatus information in association with group identification information that specifies a group using a resource of the information processing system, and
         the user information in association with the group identification information that specifies the group to which the user belongs, and
      the second processor
         refers to the second memory to determine whether the group identification information associated with the apparatus information is the same as the group identification information associated with the user information, wherein
            in a case where the group specified by the group identification information associated with the apparatus information is the same as the group specified by the group identification information associated with the user information, the second processor sends the setup information specified by the group identification information associated with the user information, and
            in a case where the group specified by the group identification information associated with the apparatus information is different from the group specified by the group identification information associated with the user information, the second processor further
               refers to first request permission information, in which the group identification information of one or more permitted groups from among other groups different from the group, the group identification information of the permitted groups being permitted to request information related to the group being registered in association with the group identification information associated with the apparatus,
               determines whether the group specified by the group identification information associated with the user information is included among the one or more permitted groups associated with the group specified by the group identification information associated with the apparatus, and
            sends the setup information specified by the group identification information associated with the user to the apparatus in a case where the first request permission information indicates that the group specified in the group identification information associated with the user is included among the permitted groups associated with the group specified by the group identification information associated with the apparatus information.

2. The information processing system according to claim 1, wherein, in a case where the group specified by the group identification information associated with the apparatus information is different from the group specified by the group identification information associated with the user information, the second processor
   refers to the first request permission information to determine whether the group specified by the group identification information associated with the user information in included among the permitted groups associated with the group specified by the group identification information associated with the apparatus information, such that
      in a case where the second processor determines that the group specified by the group identification information associated with the user information is not included among the permitted groups, the second processor determines that the setup information specified by the group identification information associated with the apparatus information is to be sent to the apparatus, and
      in a case where the second processor determines that the group specified by the group identification information associated with the user information is included among the permitted groups second processor then further
         refers to second request permission information in which the group identification information of the another group, to which the group can provide the information in association with the group identification information, determines whether the group specified by the group identification information associated with the user information is included among the permitted groups, and sends the setup information specified by the group identification information associated with the user information in the case where the group specified by the group identification information associated with the user information is included among the permitted groups.

3. The information processing system according to claim 1, wherein the second program instructions further cause the second processor to:

determine that the setup information specified by the group identification information associated with the user information is to be sent to the apparatus regardless of whether the group specified by the group identification information associated with the apparatus information is the same as the group specified by the group identification information associated with the user information.

4. The information processing system according to claim 1, wherein, the second program instructions further cause the second processor to:

determine a function of the apparatus included in the setup information sent to the apparatus based on whether the group specified by the group identification information associated with the apparatus information is the same as the group specified by the group identification information associated with the user information.

5. The information processing system according to claim 4, wherein the second memory further stores first permission function information that indicates the function of the apparatus permitted by the group specified by the group information associated with the apparatus information, and the second program instructions further cause the second processor to:

refer to the first permission function information, and
omit any function other than the permitted function indicated by the first permission function information in a case where the group specified by the group identification information associated with the apparatus information is different from the group specified by the group identification information associated with the user information.

6. The information processing system according to claim 4, wherein the second memory further stores second permission function information that indicates the function of the apparatus permitted by the group specified by the group information associated with the user information, and the second program instructions further cause the second processor to:

refer to the second permission function information, and
omit any function other than the permitted function indicated by the second permission function information in a case where the group specified by the group identification information associated with the apparatus information is different from the group specified by the group identification information associated with the user information.

7. The information processing system according to claim 4, wherein, the second memory further stores
first permission function information that indicates the function of the apparatus permitted by the group specified by the group information associated with the apparatus information, and
second permission function information that indicates the function of the apparatus permitted by the group specified by the group information associated with the user information; and the second program instructions further cause the second processor to:

refer to the first permission function information,
refer to the second permission function information, and
omit any function other than the permitted functions indicated by the first permission function information and the second permission function information in a case where the group specified by the group identification information associated with the apparatus information is different from the group specified by the group identification information associated with the user information.

8. The information processing system according to claim 5, wherein the group identification information associated with the apparatus information and the group identification information associated with the user information further include detailed function permission information indicating a detailed function, which is necessary for providing detailed function is predetermined for each function of the apparatus, permitted by the group specified by the group identification information associated with the apparatus information and by the group specified by the group identification information associated with the user information, respectively, and the second processor omits any function requiring any detailed function other than the detailed function indicated by the detailed function permission information included in the group identification information associated with the apparatus information and in the group identification information associated with the user information.

9. The information processing system according to claim 5, wherein the second processor, in a case where the group specified by the group identification information associated with the apparatus information and the group specified by the group identification information associated with the user information is the same, omits the function other than the detailed function permitted by the group specified by the group identification information associated with the apparatus information from the setup information.

10. The information processing system according to claim 1, wherein the second program instructions further cause the second processor to:

generate the setup information specified by the group identification information associated with the apparatus information and difference information of the setup information specified by the group identification information associated with the user information, and send the generated difference information in place of the setup information.

11. The information processing system according to claim 10, wherein the first processor:
receives the difference information, and
combines first setup information of the group, in which the apparatus previously held is registered, with the difference information to generate second setup information of the group, in which the user is registered.

12. The information processing system according to claim 11, wherein the first program instructions further cause the first processor to:
operate the apparatus using the second setup information while holding the first setup information, and
operate the apparatus using the first setup information, in a case where the user logs out.

13. The information processing system according to claim 11, wherein first program instructions further cause the first processor to:
hold partial information of the first setup information and the difference information, the partial information being not used in the second setup information, and
acquire the partial information of the first setup information used by the second setup information from the second setup information based on the difference information and combine the partial information of the first setup information with the held first setup information to restore the first setup information.

14. The information processing system according to claim 12, wherein first program instructions further cause the first processor to:
delete the second setup information upon the user logging out.

15. The information processing system according to claim 12, wherein first program instructions further cause the first processor to:
refrain from deleting the second setup information until a number of logouts of the user reaches a predetermined number, and
delete older second setup information in a case where the number of logouts of the user reaches the predetermined number.

16. The information processing system according to claim 12, wherein first program instructions further cause the first processor to:
refrain from deleting the second setup information of the group permitted to access by the group, in which the apparatus is registered, and holds in the case where the user logs out.

17. An information processing apparatus that sends setup information related to a setup of an apparatus to the apparatus, the information processing apparatus comprising:
a first processor, and
a first memory storing first program instructions that cause the first processor to:
receive user information of the apparatus and apparatus information related to the apparatus, the user information including user identification information that specifies the user, and the apparatus information including apparatus identification information that specifies the apparatus;
determine the setup information of the apparatus to be sent to the apparatus used by the user, based on the received apparatus information and the user information, and
send the determined setup information to the apparatus, wherein
the memory further stores
the apparatus information in association with group identification information that specifies a group using a resource of the information processing system, and
the user information in association with the group identification information that specifies the group to which the user belongs, and
the processor
refers to the memory to determine whether the group identification information associated with the apparatus information is the same as the group identification information associated with the user information, wherein
in a case where the group specified by the group identification information associated with the apparatus information is the same as the group specified by the group identification information associated with the user information, the processor sends the setup information specified by the group identification information associated with the user information, and
in a case where the group specified by the group identification information associated with the apparatus information is different from the group specified by the group identification information associated with the user information, the processor further
refers to first request permission information, in which the group identification information of one or more permitted groups from among other groups different from the group, the group identification information of the permitted groups being permitted to request information related to the group being registered in association with the group identification information associated with the apparatus,
determines whether the group specified by the group identification information associated with the user information is included among the one or more permitted groups associated with the group specified by the group identification information associated with the apparatus, and
sends the setup information specified by the group identification information associated with the user to the apparatus in a case where the first request permission information indicates that the group specified in the group identification information associated with the user is included among the permitted groups associated with the group specified by the group identification information associated with the apparatus information.

18. A non-transitory computer-readable storage medium storing a program for causing a computer to implement an information processing apparatus sending setup information related to a setup of an apparatus to the apparatus, information processing apparatus comprising:
a first processor, and
a first memory storing first program instructions that cause the first processor to:
receive user information of the apparatus and apparatus information related to the apparatus, the user information including user identification information that specifies the user, and the apparatus information including apparatus identification information that specifies the apparatus;
determine the setup information of the apparatus to be sent to the apparatus used by the user, based on the received apparatus information and the user information, and send the determined setup information to the apparatus, wherein the memory further stores the apparatus information in association with group identification information that specifies a group using a resource of the information processing system, and the user information in association with the group identification information that specifies the group to which the user belongs, and the processor refers to the memory to determine whether the group identification information associated with the apparatus information is the same as the group identification information associated with the user information, wherein in a case where the group specified by the group identification information associated with the apparatus information is the same as the group specified by the group identification information associated with the user information, the processor sends the setup information specified by the group identification information associated with the user information, and in a case where the group specified by the group identification information associated with the apparatus information is different from the group specified by the group identification information associated with the user information, the processor further refers to first request permission information, in which the group identification information of one or more permitted groups from among other groups different from the group, the group identification information of the permitted groups being permitted to request information related to the group being registered in association with the group identification information associated with the apparatus, determines whether the group specified by the group identification information associated with the user information is included among the one or more permitted groups associated with the group specified by the group identification information associated with the apparatus, and sends the setup information specified by the group identification information associated with the user to the apparatus in a case where the first request permission information indicates that the group specified in the group identification information associated with the user is included among the permitted groups associated with the group specified by the group identification information associated with the apparatus information.

* * * * *